(12) United States Patent
Katta et al.

(10) Patent No.: US 6,972,796 B2
(45) Date of Patent: Dec. 6, 2005

(54) IMAGE PICKUP SYSTEM AND VEHICLE-MOUNTED-TYPE SENSOR SYSTEM

(75) Inventors: Noboru Katta, Itami (JP); Hirotsugu Kawata, Sakai (JP); Susumu Ibaraki, Sakai (JP); Takahisa Sakai, Amagasaki (JP); Toshiaki Mori, Mino (JP); Akihiro Yamamoto, Osaka (JP); Toshihiko Kurosaki, Kobe (JP); Yuji Mizuguchi, Hirakata (JP)

(73) Assignee: Matsushita Electric Industrial Co., Ltd., Osaka-Fu (JP)

(*) Notice: Subject to any disclaimer, the term of this patent is extended or adjusted under 35 U.S.C. 154(b) by 686 days.

(21) Appl. No.: 09/793,491

(22) Filed: Feb. 27, 2001

(65) Prior Publication Data

US 2001/0019363 A1  Sep. 6, 2001

(30) Foreign Application Priority Data

Feb. 29, 2000  (JP) ............................. 2000-053015
Feb. 29, 2000  (JP) ............................. 2000-053019

(51) Int. Cl.[7] ........................ H04N 5/222; H04N 5/232
(52) U.S. Cl. ............. 348/333.01; 348/36; 348/211.99; 348/207.1; 382/284; 382/154
(58) Field of Search .............................. 348/333.01, 36, 348/37, 38, 39, 207.1, 207.11, 211.99, 211.3, 348/211.6, 211.9, 211.13, 118, 148, 115, 348/120, 584, 218.1; 382/284, 154

(56) References Cited

U.S. PATENT DOCUMENTS

| | | | |
|---|---|---|---|
| 5,650,814 A * | 7/1997 | Florent et al. ................. 348/36 |
| 5,734,743 A * | 3/1998 | Matsugu et al. ............. 382/154 |
| 6,005,987 A * | 12/1999 | Nakamura et al. .......... 382/154 |
| 6,239,833 B1 * | 5/2001 | Ozaki et al. ................. 348/159 |
| 6,529,640 B1 * | 3/2003 | Utagawa et al. ............. 382/284 |
| 6,549,650 B1 * | 4/2003 | Ishikawa et al. ............ 382/154 |
| 6,640,004 B2 * | 10/2003 | Katayama et al. ............. 348/47 |
| 6,744,931 B2 * | 6/2004 | Komiya et al. .............. 382/284 |
| 2001/0005218 A1 * | 6/2001 | Gloudemans et al. ........ 348/157 |
| 2001/0033701 A1 * | 10/2001 | Okisu et al. ................. 382/284 |
| 2002/0126890 A1 * | 9/2002 | Katayama et al. .......... 382/284 |
| 2003/0122930 A1 * | 7/2003 | Schofield et al. ........... 348/148 |

FOREIGN PATENT DOCUMENTS

| | | |
|---|---|---|
| GB | 2 338 363 | 12/1999 |
| WO | 96/31067 | 10/1996 |
| WO | 96/38319 | 12/1996 |

* cited by examiner

*Primary Examiner*—Aung Moe
(74) *Attorney, Agent, or Firm*—Wenderoth, Lind & Ponack, L.L.P.

(57) ABSTRACT

A control device determines whether an image generated by merging several concurrently picked-up images has consistent image quality on a display device. If determined No, image quality parameters set in each image pickup device are so controlled as to make the image quality of the merged image consistent. Therefore, the merged image can assuredly have consistent image quality. Further, a signal processing device detects, based on positions of nodes and attributes of cameras, a connection indicating which node is connected to which camera and with what attribute. The signal processing device in advance stores every detectable connection and a plurality of image processing programs corresponding to each connection, and selects and carries out one of the image processing programs corresponding to the detected connection.

20 Claims, 35 Drawing Sheets

F I G. 1
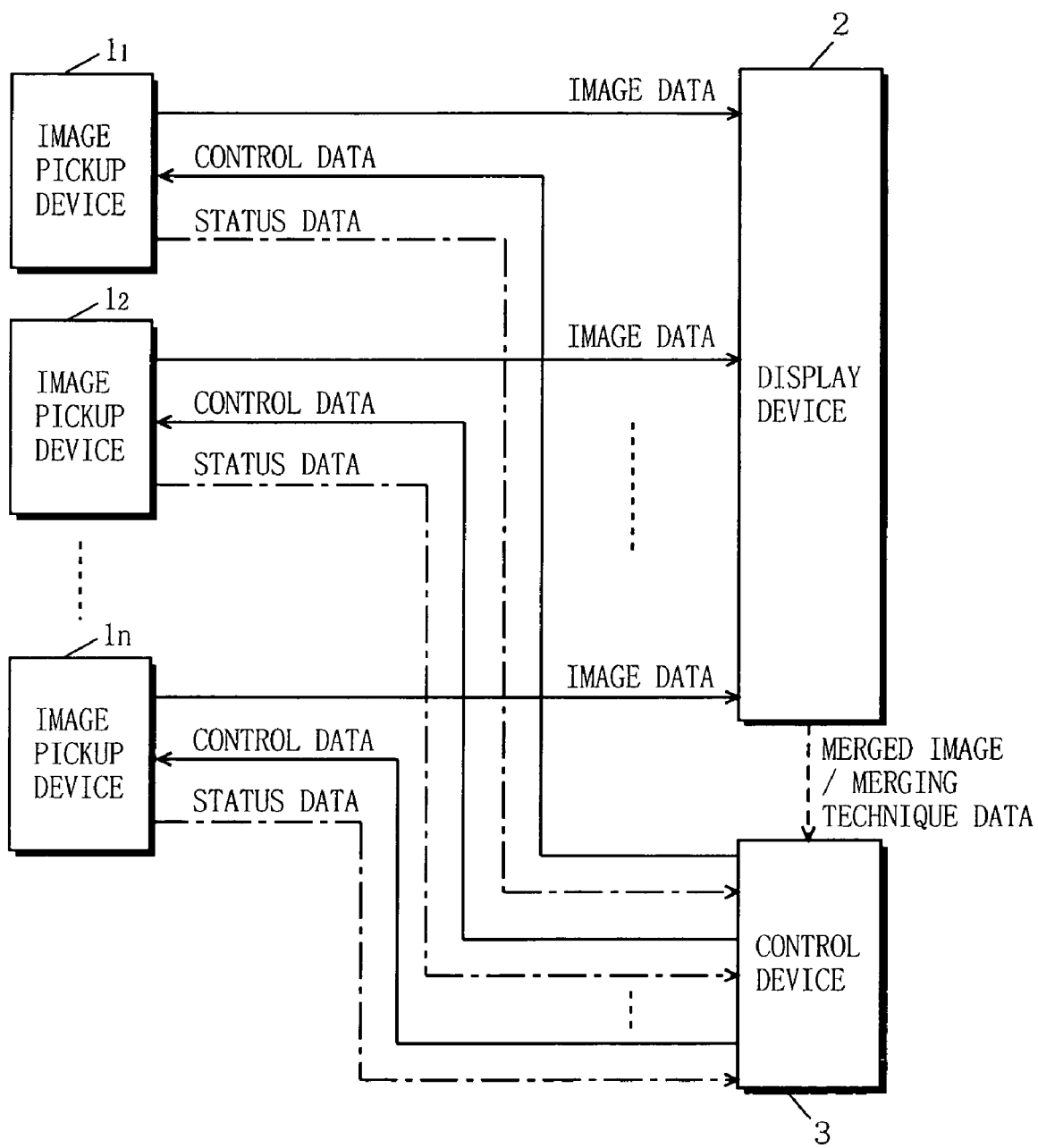

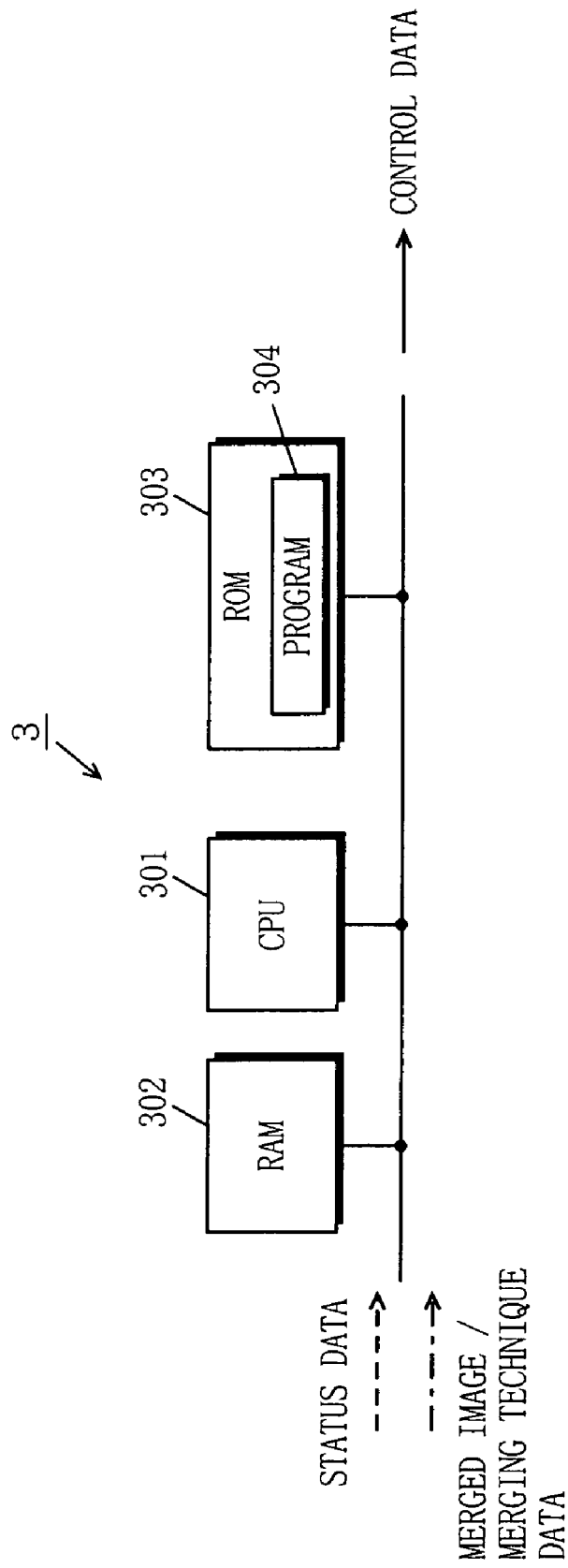

FIG. 19

TABLE

| VEHICLE'S STATE | IMAGE QUALITY PARAMETER |
|---|---|
| LIGHT ON | EVERY IMAGE PICKUP DEVICE IS HIGH IN SENSITIVITY |
| WINDSHIELD WIPER ON | EVERY IMAGE PICKUP DEVICE IS HIGH IN SENSITIVITY |
| LEFT TURN | IMAGE PICKUP DEVICES ON THE LEFT ARE HIGH IN RESOLUTION<br>IMAGE PICKUP DEVICES ON THE RIGHT ARE LOW IN RESOLUTION |
| RIGHT TURN | IMAGE PICKUP DEVICES ON THE LEFT ARE LOW IN RESOLUTION<br>IMAGE PICKUP DEVICES ON THE RIGHT ARE HIGH IN RESOLUTION |

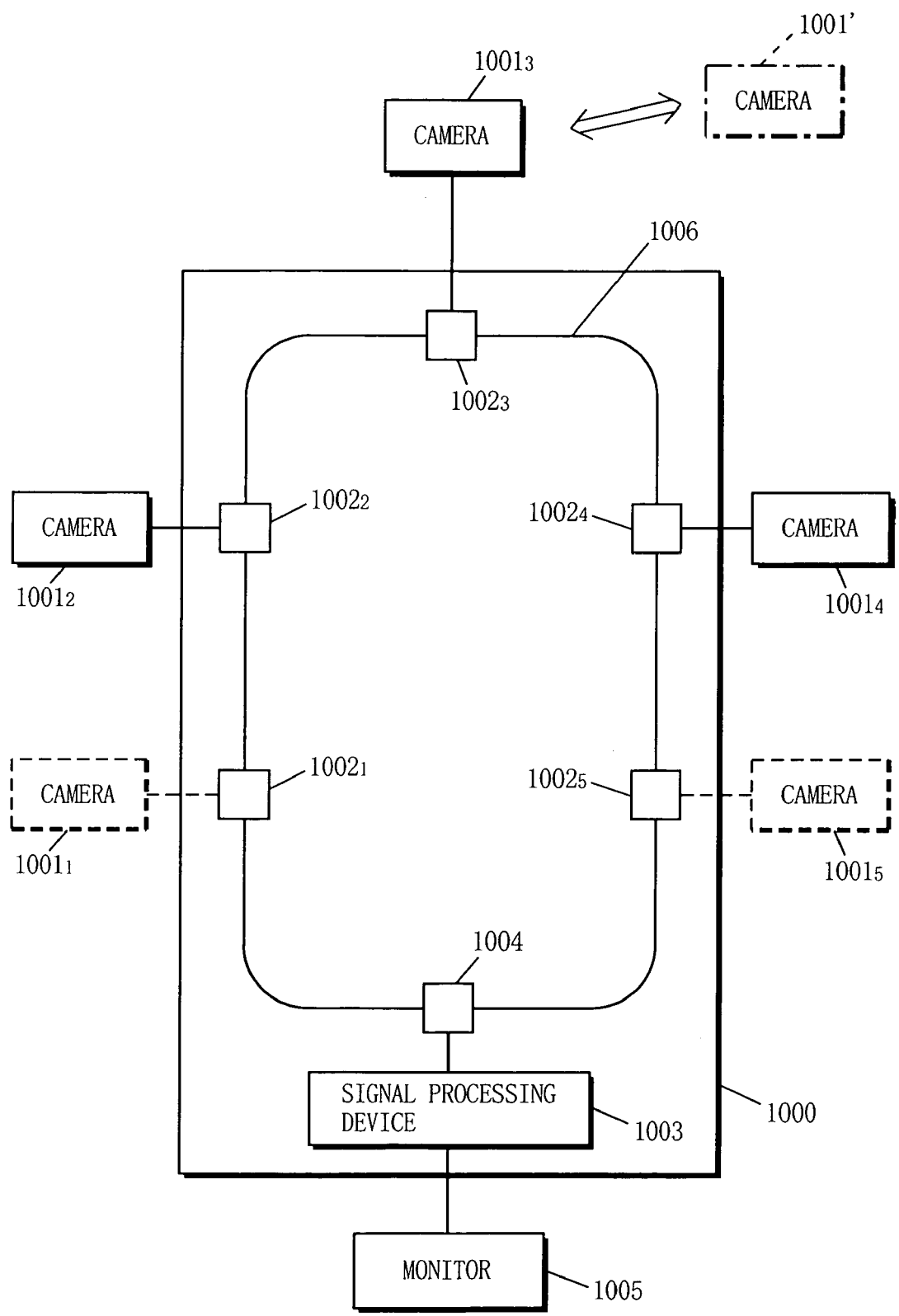

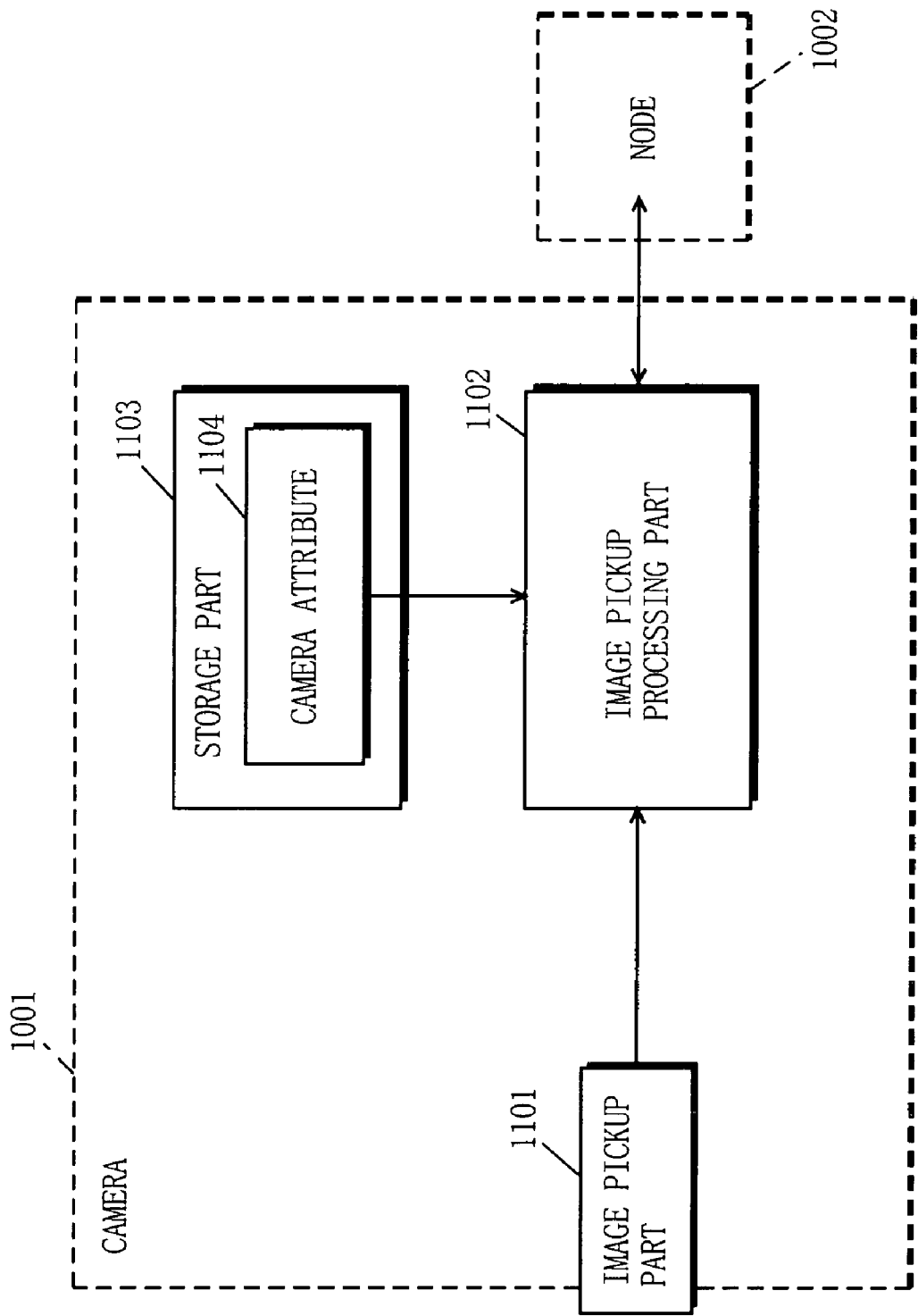

F I G. 3 8 PRIOR ART
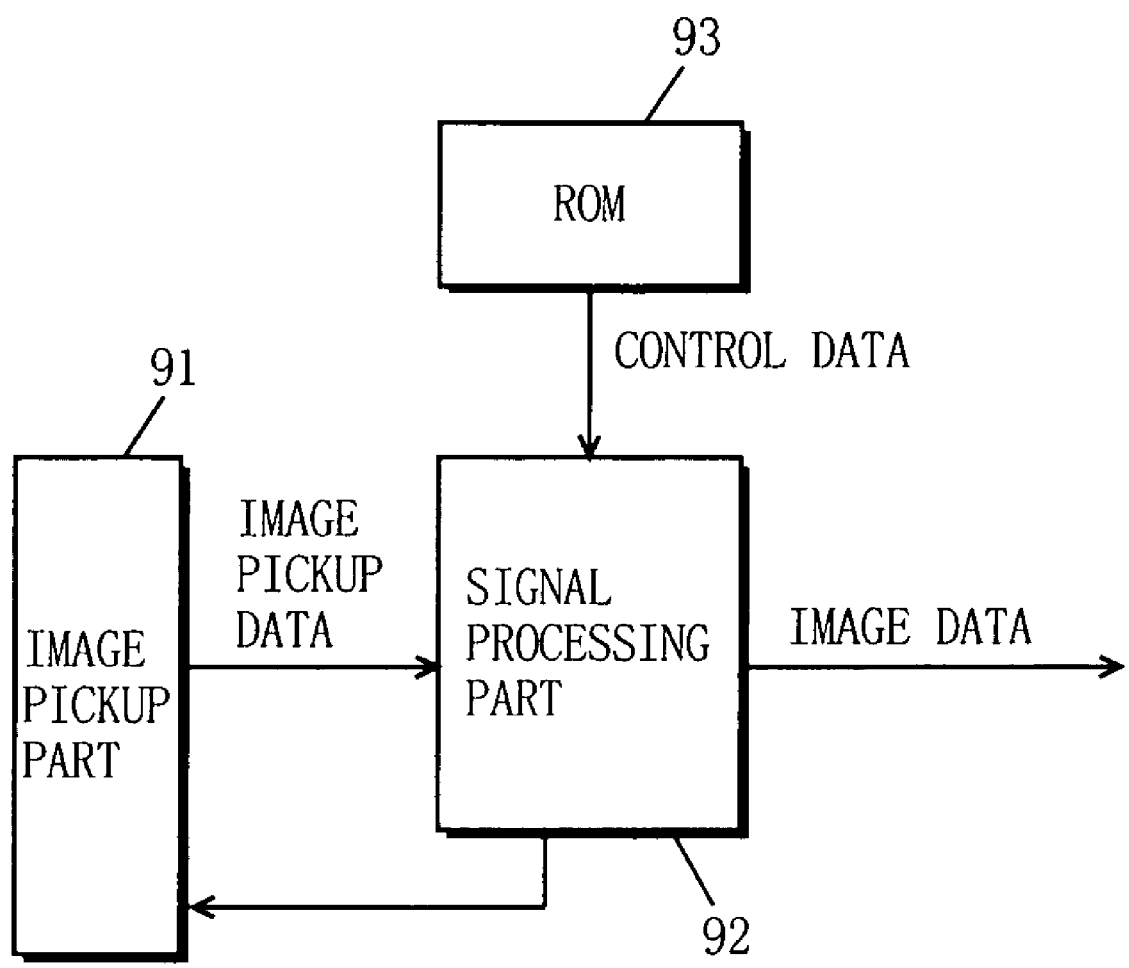

IMAGE PICKUP SYSTEM AND VEHICLE-MOUNTED-TYPE SENSOR SYSTEM

BACKGROUND OF THE INVENTION

1. Field of the Invention

The present invention relates to image pickup systems and, more specifically, to an image pickup system for concurrently picking up several images and merging those into one for display. The present invention also relates to sensor systems and, more specifically, to a vehicle-mounted-type sensor system for sensing and advising a driver of a vehicle, as a safeguard, in what environmental state a specific range around the vehicle is.

2. Description of the Background Art (First Background Art)

FIG. 38 shows an exemplary structure of a conventional image pickup device. In FIG. 38, the conventional image pickup device includes an image pickup part 91, a signal processing part 92, and ROM 93.

The image pickup part 91 includes a CCD, for example, and an optically picked up image is converted into an electrical signal therein for output as image pickup data. The image pickup data is then forwarded to the signal processing part 92 for processing such as amplification and filtering, resulting in image data.

The ROM 93 stores in advance control data, which is forwarded to the signal processing part 92. According to the control data, the signal processing part 92 adjusts an amplification ratio and a filtering coefficient during such processing as amplification and filtering. With such adjustment, the image data provided by the conventional image pickup device can make the resultant image in a desired image quality (e.g., brightness, contrast).

(Second Background Art)

There have been provided vehicle-mounted-type sensor systems of a type sensing and advising a driver of a vehicle, as a safeguard, in what environmental state a specific range around the vehicle is. A conventional type of sensor includes a camera which picks up images in a specific range, and an ultrasonic detector for detecting any obstacle in a predetermined range with ultrasonic waves, for example.

In such conventional vehicle-mounted-type sensor system, a camera or a detector is positioned so as to cover the driver's blind spots, for example, any area lower than the driver's line of sight. As such, the driver knows if there is any obstacle around his/her vehicle through a monitor displaying images picked up by the camera, and if any, the driver is warned by a warning screen or beep tones according to a signal from the detector.

(First Problem)

Considered here is a case of merging, for display, several images concurrently picked up by several conventional image pickup devices as described in the first background art. Possible techniques therefor are, for example, merging those images in a manner for panoramic display (such technique is referred to as panoramic image merging technique), and arranging the picked up images (changing those in size, if necessary) in one image for display (this technique is referred to as multi image merging technique).

The issue here is, the image pickup devices each differently adjust amplification ratio and filtering coefficient. Accordingly, if the resultant image data from each of the image pickup devices are merged together, an image after merging generally lacks consistency of image quality. Especially as for a panoramic image, parts where the images are merged look conspicuous.

(Second Problem)

As described in the second background art, with the conventional vehicle-mounted-type sensor system, the driver is well informed about blind spots around his/her vehicle. Therefore, the driver can easily avoid hitting against an obstacle while looking at images displayed on the monitor. There have been developed various types of such vehicle-mounted-type sensor systems by many manufacturers.

As for a sensor, its performance has been continuously enhanced, and by taking a camera as an example, new products keep appearing in the market with higher resolution and sensitivity.

The problem is, however, the sensor equipped in the system is a dedicated type specifically for the system. Therefore, exchange of such sensor is not that simple, for example, with other manufacturer's sensor or any higher-performance sensor. After exchange, the driver is bothered by the sensor's setting change, resolution and sensitivity adjustment, and positioning, and that may need extensive knowledge.

SUMMARY OF THE INVENTION

Therefore, a first object of the present invention is to provide an image pickup system for concurrently picking up several images, and merging those into one image with an assured consistent image quality on a display.

A second object of the present invention is to provide a vehicle-mounted-type sensor system for sensing and advising a driver of a vehicle, as a safeguard, in what environmental state a specific range around the vehicle is, and a sensor equipped therein is easy to exchange with some other sensor having different resolution, for example.

The present invention has such features as a first to twenty-sixth aspects below to attain the first object above, and to attain the second object above, a twenty-seventh to fortieth aspects below are provided.

A first aspect of the present invention is directed to an image pickup system for concurrently picking up several images and merging those into one for display, the system comprising:

a plurality of image pickup devices for each performing image pickup according to an image quality parameter set therein to define image quality of a merged image;

a display device for receiving image data from each of the image pickup devices, and merging those for display; and a control device for controlling each of the image pickup devices, wherein the control device comprises:

a determination part for determining whether the image quality of the merged image is consistent on the display device; and an image quality control part for controlling, when the determination part determines no, the image quality parameter set in each of the image pickup devices so that the image quality of the merged image becomes consistent on the display device.

As described above, in the first aspect (or eighteenth, twenty-first, and twenty-fourth aspects below), a merged image which is generated by merging concurrently picked up several image data can have an assured consistent image quality on a display.

Here, to see whether the image quality of the merged image is consistent, image quality parameters set in each of the image pickup devices are compared with one. In an alternative manner, the merged image may be examined if the image quality thereof is consistent.

According to a second aspect, in the first aspect, the image quality control part previously stores a predetermined common image quality parameter, and changes the image quality parameter set in each of the image pickup devices to agree with the common image quality parameter (FIG. 7).

As described above, in the second aspect, a common image quality parameter is previously stored, and the image quality parameter already set in each of the image pickup devices is changed to agree with the common image quality parameter. Therefore, a resultant merged image can have the consistent image quality.

As such, according to the second aspect, the image quality of a merged image becomes consistent only through a simple control processing. However, the image quality parameters in each of the image pickup devices are forced to agree with the common image quality parameter fixed in value. As a result, the image quality may not be at a desired level for some cases. For example, if the image quality parameter is a brightness parameter (e.g., sensitivity, aperture, and amplification ratio), the image pickup devices are all controlled to be in a predetermined value for its brightness parameter. In this manner, surely the brightness of the resultant merged image becomes consistent, but the tone thereof may be inadequate for some brightness level around the vehicle.

Therefore, in a third aspect below, a common image quality parameter is determined based on the image quality parameters set in each of the image pickup devices.

Preferably, in a fourth aspect below, an average for the image quality parameters is calculated. Thus calculated average value or an approximate value thereof is determined as a common image quality parameter. In one embodiment below, several common image quality parameters are in advance stored as potentials, and among from those, a value closest to the average is determined as a common image quality parameter.

According to a third aspect, in the first aspect, the control device determines a common image quality parameter based on the image quality parameter set in each of the image pickup devices, and changes the image quality parameter to agree with the common image quality parameter (FIG. 8).

As described above, in the third aspect, the value change of the image quality parameters can be reduced. Similarly, if the image pickup devices are each equipped with a function of automatically adjusting its image quality parameter according to the environmental change therearound, the resultant merged image becomes always optimal in its image quality.

According to a fourth aspect, in the third aspect, the image quality control part calculates an average value of the image quality parameter set in each of the image pickup devices, and determines the average value or an approximate value thereof as the common image quality parameter (FIG. 8).

As described above, in the fourth aspect, the value change of the image quality parameters can be minimized. Similarly, if the image pickup devices are each equipped with a function of automatically adjusting its image quality parameter according to the environmental change therearound, the resultant merged image always becomes optimal in its image quality.

According to a fifth aspect, in the first aspect, each of the image pickup devices is capable of performing image pickup according to the image quality parameter set therein for every pixel or block being composed of several pixels, and the image quality control part controls the image quality parameter set in each of the image pickup devices on a pixel or a block basis (FIG. 5).

As described above, in the fifth aspect, the image quality parameters set in each of the image pickup devices are controlled on a pixel or a block basis, whereby the image quality can be adjusted in an image. As an example, in an image, the image quality of a right part is left as it is, but that of a left part is increased, and the image quality in a section therebetween can be linearly changed.

According to a sixth aspect, in the first aspect, each of the image pickup devices is capable of performing image pickup according to the image quality parameter set therein for every pixel or block being composed of several pixels, and the display device merges image data from each of the image pickup devices to generate a panoramic image, and the image quality control part receives the panoramic image from the display device, and controls the image quality parameter set in each of the image pickup devices on a pixel or a block basis in such manner as to make the image quality of a boundary in the panoramic image consistent (FIG. 9).

As described above, in the sixth aspect, for a case to generate a panoramic image by merging image data provided by each of the image pickup devices, the image quality is so controlled as to make a boundary where two image data are merged look inconspicuous.

According to a seventh aspect, in the sixth aspect, the image quality control part compares the image quality of a pair of pixels or blocks having a boundary in between, and based on a result obtained thereby, determines an image quality parameter for those pixels or blocks; and along a straight line or a gradual curve which passes through thus determined image quality parameter for the boundary and an image quality parameter similarly determined for a next boundary, and determines image quality parameters for pixels and blocks located between those two boundaries.

As described above, in the seventh aspect, the image quality around every boundary is first determined, and then the image quality for a section between two boundaries is determined. In this manner, the section between those two boundaries changes in image quality linearly (or gradually).

According to an eighth aspect, in the first aspect, the image pickup system further comprises a sensor for sensing around the image pickup devices, and the image quality control part performing image quality parameter control based on a result sensed by the sensor.

As described above, in the eighth aspect, the sensor senses around the image pickup devices (e.g., brightness), and based on a result sensed thereby, the image quality parameters (e.g., brightness parameter) of each of the image pickup devices are controlled.

According to a ninth aspect, in the eighth aspect, the sensor senses around the image pickup devices for brightness, the image quality parameter includes a brightness parameter for defining brightness of an image, and the image quality control part increases, when the sensor senses the brightness as being not high enough, the brightness parameter of each of the image pickup devices.

Here, when the brightness parameter is exemplarily sensitivity, increasing the brightness parameter means a processing of increasing the sensitivity. Similarly, with aperture, an optical system is set larger in its aperture (smaller in F-number), and with amplification ratio, the amplification ratio is increased.

According to a tenth aspect, in the first aspect, each of the image pickup devices is mounted in a vehicle, and the image quality control part detects in which state the vehicle is, and based thereon, performs image quality parameter control (FIG. 12).

As described above, in the tenth aspect, the image pickup devices are mounted in a vehicle, and image quality parameters are controlled by sensing in what state the vehicle is. For example, as tenth and eleventh aspects below, if a light or a windshield wiper of the vehicle is ON, brightness parameters of the image pickup devices are increased. As twelfth and thirteenth aspects below, if the vehicle is turning left (right), any image pickup devices mounted on the right (left) side of the vehicle is lowered in resolution.

According to an eleventh aspect, in the tenth aspect, the vehicle is provided with a light, the image quality parameter includes a brightness parameter for defining brightness of an image, and the image quality control part increases, when sensed the light as being ON, the brightness parameter of each of the image pickup devices (FIG. 13A).

As described above, in the eleventh (or twelfth) aspect, even if the image pickup devices are located in the dark, the tone of a resultant merged image can be properly adjusted. Although this effects may sound similar to that achieved in the ninth aspect, there is no need to include any sensor since the brightness parameters of the image pickup devices are increased when the light or windshield wiper is turned ON. Therefore, the system can be simplified in structure compared with the one in the ninth aspect.

According to a twelfth aspect, in the tenth aspect, the vehicle is provided with a windshield wiper, the image quality parameter includes a brightness parameter for defining brightness of an image, and the image quality control part increases, when sensed the windshield wiper as being ON, the brightness parameter of each of the image pickup devices (FIG. 13B).

According to a thirteenth aspect, in the tenth aspect, the image pickup devices are mounted in the vehicle on the front, rear, right, and left, the image quality parameter includes resolution, and the image quality control part lowers, when sensed the vehicle as making a left turn, the resolution of the image pickup device mounted on the right the of the vehicle (FIG. 13C).

According to a fourteenth aspect, in the tenth aspect, the image pickup devices are mounted in the vehicle on the front, rear, right, and left, the image quality parameter includes resolution, and the image quality control part lowers, when sensed the vehicle as making a right turn, the resolution of the image pickup device mounted on the left the of the vehicle (FIG. 13C).

As described above, in the thirteenth and fourteenth aspects, a resolution level of the image pickup devices on the opposite side to the vehicle's turning direction are lowered. Accordingly, the amount of image data transmitted from the image pickup devices to the display device can be reduced. If there is no need to reduce the amount of image data for transmission, the image pick up devices on the same side of the vehicle's turning direction may be increased by the same resolution level lowered for those on the opposite side.

A fifteenth aspect of the present invention is directed to an image pickup system for concurrently picking up several images and merging those into one for display, the system comprising:

a plurality of image pickup devices for each performing image pickup, and cutting out resultant image data only for a predetermined area for output;

a display device switchable among several merging techniques receives the image data from each of the image pickup devices, and merging those for display with any possible merging technique; and a control device for controlling each of the image pickup devices, wherein the control device comprises:

a detection part for detecting which merging technique has been applied in the display device; and a cutout area control part for controlling, depending on a result detected by the detection part, an image cutout area set in each of the image pickup devices.

As described above, in the fifteenth (or a nineteenth, twenty-second, or twenty-fifth) aspect, several images are concurrently picked up, and resultant image data is each cut out only for a predetermined area for image merging. The predetermined area is changeable depending on which merging technique is applied.

For example, as in a sixteenth aspect below, when a multi image merging technique is applied, the image pickup devices each output its image data in its entirety, and with a panoramic image merging technique, outputted is only a required area.

According to a sixteenth aspect, in the fifteenth aspect, the display device is switchable between a multi image merging technique for arranging image data for display, and a panoramic image merging technique for merging areas which are each cut out from the image data to generate a panoramic image, and the cutout area control part makes each of the image pickup devices output the image data in its entirety when the detection part detects the multi image merging technique, and cut out and output only a required area when the detection part detects the panoramic image merging technique.

As described above, in the sixteenth aspect, transmitted from the image pickup devices to the display device is only a required area of image data corresponding to a merging technique currently applied. Therefore, any unwanted image data is prevented from being transmitted.

A seventeenth aspect of the present invention is directed to an image pickup system for concurrently picking up several images and merging those into one for display, the system comprising:

a plurality of image pickup devices for each performing image pickup;

a display device switchable among several merging techniques receives image data from each of the image pickup devices, and merging those for display; and a control device for controlling each of the image pickup devices, wherein the control device comprises:
   a detection part for detecting which of the image pickup devices is required for a merging technique currently applied in the display device; and
   an ON/OFF control part for ON/OFF controlling, based on a result detected by the detection part, a power supply of each of the image pickup devices.

As described above, in the seventeenth (or twentieth, twenty-third, or twenty-sixth) aspect, the image pickup devices each turn ON/OFF its power supply according to the merging technique currently applied, thereby cutting down power by turning OFF any unwanted image pickup device.

An eighteenth aspect of the present invention is directed to a control device for controlling a plurality of image pickup devices provided in an image pickup system in which several images are concurrently picked up and a display device merges those into one for display, wherein
   each of the image pickup devices is provided with a function of performing image pickup according to an image quality parameter set therein to define image quality of an image, and
   the control device comprises:
   a determination part for determining whether image quality of a merged image is consistent on the display device; and
   an image quality control part for controlling, when the determination part determines no, the image quality parameter set in each of the image pickup devices so that the image quality of the merged image becomes consistent on the display device.

A nineteenth aspect of the present invention is directed to a control device for controlling a plurality of image pickup devices provided in an image pickup system in which several images are concurrently picked up and a display device merges those into one for display, wherein
   each of the image pickup devices is provided with a function of cutting out resultant image data only for a predetermined area for output,
   the display device is switchable among several techniques, and is provided with a function of merging the image data from each of the image pickup devices with any possible merging technique for display, and
   the control device comprises:
   a detection part for detecting which merging technique has been applied in the display device; and
   a cutout area control part for controlling an image cutout area set in each of the image pickup devices based on a result detected by the detection part.

A twentieth aspect of the present invention is directed to a control device for controlling a plurality of image pickup devices provided in an image pickup system in which several images are concurrently picked up and a display device merges those into one for display, wherein
   the display device is switchable among several merging techniques, and provided with a function of merging image data from each of the image pickup devices with any one of the merging techniques, and
   the control device comprises:
   a detection part for detecting which of the image pickup devices is required for a merging technique currently applied in the display device; and
   an ON/OFF control part for ON/OFF controlling, based on a result detected by the detection part, a power supply of each of the image pickup devices.

A twenty-first aspect of the present invention is directed to a control method for controlling a plurality of image pickup devices provided in an image pickup system in which several images are concurrently picked up and a display device merges those into one for display, wherein
   each of the image pickup devices is provided with a function of performing image pickup according to an image quality parameter set therein to define image quality of an image, and
   the control device comprises:
   a determination step of determining whether image quality of a merged image is consistent on the display device; and
   an image quality control step of controlling, when the determination part determines no, the image quality parameter set in each of the image pickup devices so that the image quality of the merged image becomes consistent on the display device.

A twenty-second aspect of the present invention is directed to a control method for controlling a plurality of image pickup devices provided in an image pickup system in which several images are concurrently picked up and a display device merges those into one for display, wherein
   each of the image pickup devices is provided with a function of cutting out resultant image data only for a predetermined area for output,
   the display device is switchable among several techniques, and is provided with a function of merging the image data from each of the image pickup devices with any possible merging technique for display, and
   the control device comprises:
   a detection step of detecting which merging technique has been applied in the display device; and
   a cutout area control step of controlling an image cutout area set in each of the image pickup devices based on a result detected by the detection part.

A twenty-third aspect of the present invention is directed to a control device for controlling a plurality of image pickup devices provided in an image pickup system in which several images are concurrently picked up and a display device merges those into one for display, wherein
   the display device is switchable among several merging techniques, and provided with a function of merging image data from each of the image pickup devices with any one of the merging techniques, and
   the control device comprises:
   a detection step of detecting which of the image pickup devices is required for a merging technique currently applied in the display device; and
   an ON/OFF control step of ON/OFF controlling, based on a result detected by the detection part, a power supply of each of the image pickup devices.

A twenty-fourth aspect of the present invention is directed to a program run by a computer included in a control device for controlling a plurality of image pickup devices in an image pickup system in which several images are concurrently picked up and a display device merges those into one for display, wherein
   each of the image pickup devices is provided with a function of performing image pickup according to an image quality parameter set therein to define image quality of an image, and
   the program comprises:
   a determination step of determining whether image quality of a merged image is consistent on the display device; and
   an image quality control step of controlling, when the determination part determines no, the image quality parameter set in each of the image pickup devices so that the image quality of the merged image becomes consistent on the display device.

A twenty-fifth aspect of the present invention is directed to a program run by a computer included in a control device for controlling a plurality of image pickup devices in an image pickup system in which several images are concurrently picked up and a display device merges those into one for display, wherein each of the image pickup devices is provided with a function of cutting out resultant image data only for a predetermined area for output, the display device is switchable among several techniques, and is provided with a function of merging the image data from each of the image pickup devices with any possible merging technique for display, and the program comprises:
a detection step of detecting which merging technique has been applied in the display device; and
a cutout area control step of controlling an image cutout area set in each of the image pickup devices based on a result detected by the detection part.

A twenty-sixth aspect of the present invention is directed to a program run by a computer included in a control device for controlling a plurality of image pickup devices in an image pickup system in which several images are concurrently picked up and a display device merges those into one for display, wherein the display device is switchable among several merging techniques, and provided with a function of merging image data from each of the image pickup devices with any one of the merging techniques, and the program comprises:
a detection step of detecting which of the image pickup devices is required for a merging technique currently applied in the display device; and
an ON/OFF control step of ON/OFF controlling, based on a result detected by the detection part, a power supply of each of the image pickup devices.

A twenty-seventh aspect of the present invention is directed to a vehicle-mounted-type sensor system for sensing and advising a driver of a vehicle in what environmental state a predetermined range around the vehicle is, the system comprising:

one or more sensors for sensing any obstacle in the predetermined range around the vehicle, a plurality of nodes each provided in a predetermined position in the vehicle for detachable connection with the sensors, and a processing device for processing a result sensed by each of the sensors for notification to the driver, wherein
the sensors each stores an attribute thereof,
the nodes each stores a position thereof, and
the processing device comprises:
a connection detection part for detecting, based on the positions of the nodes and the attributes of the sensors, which node is connected to which sensor with what attribute;
a storage part for previously storing every detectable connection and a plurality of processing programs each corresponding to the connection; and
a processing part for processing the result sensed by the sensors by selecting and carrying out one of the processing programs stored in the storage part which corresponds to the connection detected by the connection detection part.

As described above, in the twenty-seventh (or thirty-ninth or fortieth) aspect, every detectable connection and a plurality of processing programs each corresponding to the connection are stored in advance. Then, based on positions of nodes and attributed of sensors, the current connection is detected, and then one of the processing programs corresponding to the detected connection is selected and carried out. In this manner, the driver becomes free from setting change after his/her sensor is exchanged, and accordingly sensor exchange to another having a different attribute becomes easier.

Although the sensor is typically a camera or a detector as in a thirty-third and thirty-sixth aspects below, this is not restrictive and may be anything as long as any obstacle observed in a predetermined range is detectable therewith. In the case that the sensor is a camera, as in a thirty-fourth and thirty-sixth aspects below, the attribute thereof includes resolution and frame rate, and the like.

Typically, all of the sensors are cameras or all of those are detectors, this is not restrictive, and as in an thirty-seventh aspect below, some of the sensors may be cameras and the rest detectors. As such, in the case that both cameras and detectors are observed in the system, the attributes of sensors need to include information indicating whether the sensor is the camera or the sensor.

Further, the positions and attributes for detection of the current connection are provided to the processing device in a manner as in a twenty-eighth aspect below. In detail, each of the nodes acquires the attribute of the sensor connected thereto, and transmits thus acquired attribute together with its own position to the processing device. Or in an alternative manner, as in the thirtieth aspect below, each of the sensors acquires the position of the node connected therewith, and then transmits thus acquired position together with its own attribute. Here, in view of enhancement of the sensors' versatility, the manner in the twenty-eighth aspect is preferable.

According to a twenty-eighth aspect, in the twenty-seventh aspect, each of the nodes acquires the attribute from the sensor connected thereto, and transmits the acquired attribute together with the position thereof to the processing device (FIG. 23).

As described above, in the twenty-eighth aspect, since the nodes perform transmission of positions and attributes, the sensors only need to store their own attributes.

According to a twenty-ninth aspect, in the twenty-eighth aspect, each of the nodes stores an identifier as the position thereof, the storage part additionally stores a position table which shows an interrelation between the identifier and the position of every node, and the connection detection part receives the identifiers and the attributes from the nodes, and based thereon and the position table, detects the connection.

As described above, in the twenty-ninth aspect, the nodes each store its own identifier as the position thereof, and the processing device stores a position table which shows the interrelation between the identifier and the position of every node. The nodes each transmit its own identifier and the attribute of the sensor connected thereto to the processing device, and in response, the processing device detects the current connection based on those and the position table. With such structure that the positions of the nodes are managed in the table on the processing device side, positional change of the nodes can be easily dealt by simply updating the position table.

According to a thirtieth aspect, in the twenty-seventh aspect, each of the sensors acquires the position of the node connected thereto, and transmits the acquired position together with the attribute thereof to the processing device (FIG. 33).

As described above, in the thirtieth aspect, since the sensors perform transmission of positions and attributes, the nodes only need to store their own positions.

According to a thirty-first aspect, in the thirtieth aspect, each of the nodes stores an identification as the position thereof, the storage part additionally stores a position table which shows an interrelation between the identifier and the position of every node, and the connection detection part receives the identifiers and the attributes from the sensors, and based thereon and the position table, detects the connection.

As described above, in the thirty-first aspect, the nodes each store its own identifier as the position thereof, and the processing device stores a position table which shows the interrelation between the identifier and the position of every node. The sensors each transmit the position of the nodes connected thereto and its own attribute to the processing device, and in response, the processing device receives the identifiers and the attributes from each of the nodes and detects the current connection based on those and the position table. With such structure that the positions of the nodes are managed in the table on the processing device side, positional change of the nodes can be easily dealt with by simply updating the position table.

According to a thirty-second aspect, in the twenty-seventh aspect.

each of the sensors includes a drive part for changing an orientation thereof, the storage part previously stores a plurality of orientation control programs each corresponding to the connection, and when processing the result sensed by each of the sensors, the processing part moves a sensing area for each of the sensors by selecting and carrying out one of the orientation control program stored in the storage part corresponding to the connection detected by the connection detection part.

As described above, in the thirty-second aspect, a plurality of orientation control programs each corresponding to the connection may be previously stored. If so, once the current connection is detected, both of the processing program and the orientation control program are carried out. Accordingly, the driver becomes also free from sensor orientation adjustment, rendering sensor exchange easier to a greater degree.

According to a thirty-third aspect, in the twenty-seventh aspect, each of the sensors is a camera which covers a predetermined area around the vehicle.

According to a thirty-fourth aspect, in the thirty-third aspect, the attribute of each of the cameras at least includes a resolution.

According to a thirty-fifth aspect, in the thirty-third aspect, the attribute of each of the cameras at least includes a frame rate.

According to a thirty-sixth aspect, in the twenty-seventh aspect, each of the sensors is a detector which detects any obstacle in a predetermined area around the vehicle.

According to a thirty-seventh aspect, in the twenty-seventh aspect, each of the sensors is a camera covering a predetermined area or a detector detecting any obstacle in the predetermined area around the vehicle, and the attribute of each of the sensors at least includes information indicating whether the sensor is the camera or the detector.

A thirty-eighth aspect of the present invention is directed to a vehicle-mounted-type sensor system for sensing and advising a driver of a vehicle in what environmental state a predetermined range around the vehicle is, the system comprising:

a plurality of nodes each provided in a predetermined position in the vehicle for detachable connection with one or more sensors for sensing an environmental state of the predetermined range around the vehicle, and a processing device for processing a result sensed by each of the sensors for notification to the driver, wherein the sensors each stores an attribute thereof, the nodes each stores a position thereof, and the processing device comprises:

a connection detection part for detecting, based on the positions of the nodes and the attributes of the sensors, which node is connected to which sensor with what attribute;

a storage part for previously storing every detectable connection and a plurality of processing programs each corresponding to the connection; and a processing part for processing the result sensed by the sensor by selecting and carrying out one of the processing programs stored in the storage part which corresponds to the connection detected by the connection detection part.

The thirty-eighth aspect is differed from the twenty-seventh aspect in only a respect that no sensor is included.

A thirty-ninth aspect of the present invention is directed to a method for controlling a vehicle-mounted-type sensor system for sensing and advising a driver of a vehicle in what environmental state a predetermined range around the vehicle is, the vehicle-mounted-type sensor system comprising:

one or more sensors for sensing an environmental state of the predetermined range around the vehicle, and a plurality of nodes each provided in a predetermined position in the vehicle for detachable connection with the sensors, wherein the sensors each stores an attribute thereof, the nodes each stores a position thereof, and the method comprises:

a connection detection step of detecting, based on the positions of the nodes and the attributes of the sensors, which node is connected to which sensor with what attribute;

a storage step of previously storing every detectable connection and a plurality of processing programs each corresponding to the connection; and a step of processing the result sensed by the sensor by selecting and carrying out one of the processing programs stored in the storage part which corresponds to the connection detected by the connection detection part.

A fortieth aspect of the present invention is directed to a control program run by a computer controlling a vehicle-mounted-type sensor system for sensing and advising a driver of a vehicle in what environmental state a predetermined range around the vehicle is, the vehicle-mounted-type sensor system comprising:

one or more sensors for sensing an environmental state of the predetermined range around the vehicle, and a plurality of nodes each provided in a predetermined position in the vehicle for detachable connection with the sensors, wherein the sensors each stores an attribute thereof, the nodes each stores a position thereof, and the control program comprises:

a connection detection step of detecting, based on the positions of the nodes and the attributes of the sensors, which node is connected to which sensor with what attribute;

a storage step of previously storing every detectable connection and a plurality of processing programs each corresponding to the connection; and a step of processing the result sensed by the sensor by selecting and carrying out one of the processing programs stored in the storage part which corresponds to the connection detected by the connection detection part.

These and other objects, features, aspects and advantages of the present invention will become more apparent from the following detailed description of the present invention when taken in conjunction with the accompanying drawings.

BRIEF DESCRIPTION OF THE DRAWINGS

FIG. 1 is a block diagram showing an exemplary structure of an image pickup system according to a first embodiment of the present invention;

FIG. 3 is a block diagram showing an exemplary structure of a control device 3 of FIG. 1;

FIG. 19 shows an exemplary table stored in the control device 3 of FIG. 1 in the seventh embodiment;

FIG. 20 is a block diagram showing the structure of a vehicle-mounted-type camera system according to an eighth embodiment of the present invention;

FIG. 21 is a block diagram showing an exemplary structure of a camera 1001 (or 1001') of FIG. 20;

FIG. 38 is a block diagram showing an exemplary structure of a conventional image pickup device.

DESCRIPTION OF THE PREFERRED EMBODIMENTS

With reference to the accompanying drawings, embodiments of the present invention are now described.

(First Embodiment)

FIG. 1 is a block diagram showing the structure of an image pickup system according to a first embodiment of the present invention. In FIG. 1, the image pickup system includes a plurality of image pickup devices 1 (denoted by $1_1$ to $1_n$, where n is an arbitrary integer of two or more), a display device 2, and a control device 3. The image pickup devices 1 are each connected to the display device 2 via a transmission line for image data, and to the control device 3 via both a transmission line for control data and that for status data.

The control device 3 is connected to the display device 2 via a transmission line for merged image/merging technique data.

Note herein that, such connection is not always necessary, and it will do as long as the image pickup devices 1 are each connected to the display device 2 via the transmission line for image data, and to the control device 3 via the transmission line for control data (details are left for later description). Here, the above described transmission line specifically includes a cable, optical fiber, circuitry wiring. IC wiring, and the like. This is not surely restrictive, and any line works just fine as long as a digital signal can be transmitted therethrough.

Figure 2:
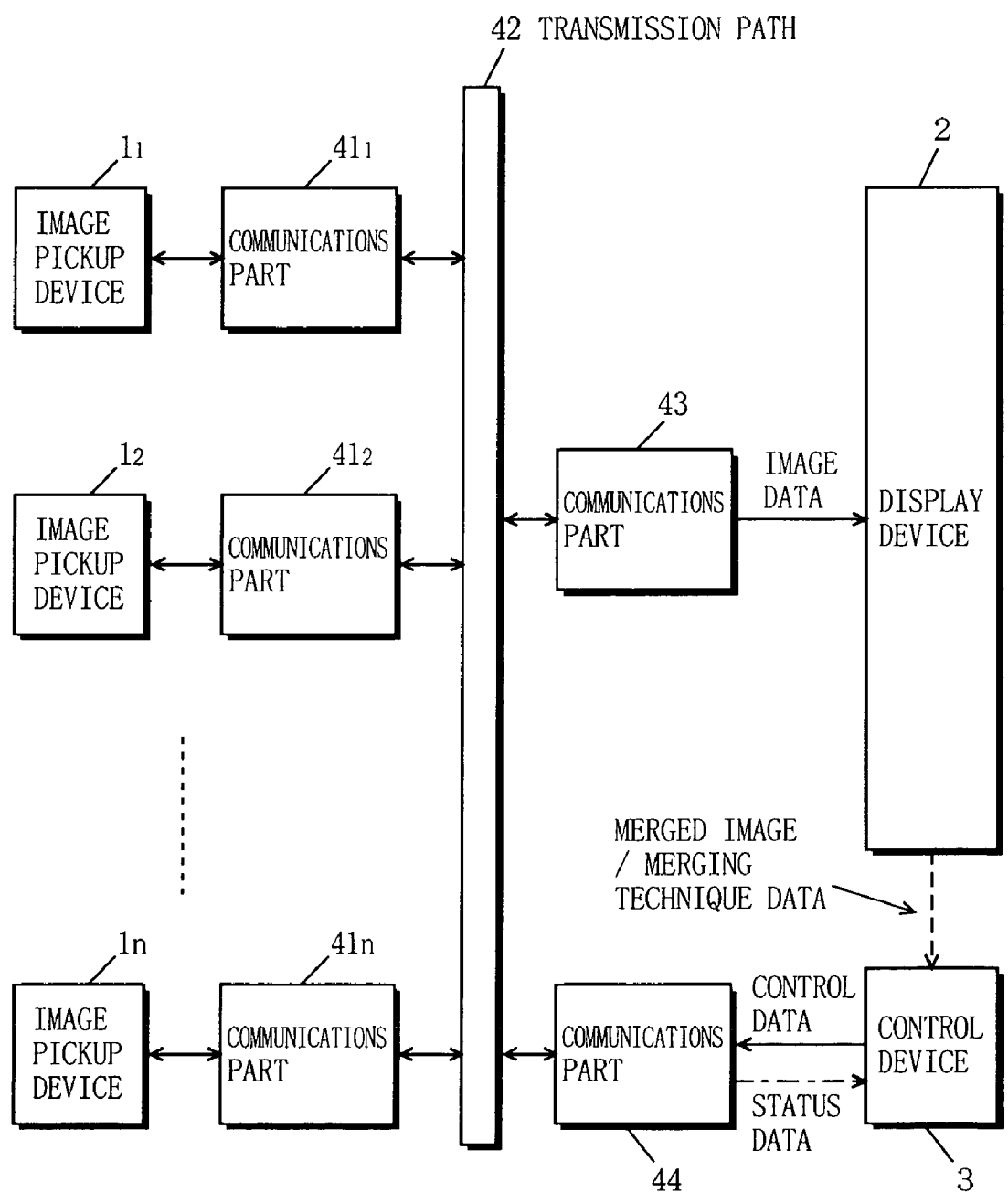
FIG. 2 is a block diagram exemplarily showing a modified structure of the image pickup system of the first embodiment.

As for the image pickup system of this embodiment, such structure as shown in FIG. 1 is not restrictive, and FIG. 2 shows an modified example thereof. The image pickup system of FIG. 2 includes the plurality of image pickup devices 1, the display device 2, the control device 3, a communications part 41 provided to each of the image pickup devices 1, a transmission path 42, a communications part 43 provided in combination with the display device 2, and a communications part 44 provided in combination with the control device 3.

Each of the image pickup devices land the display device 2 are connected to each other via each corresponding communications part 41, the transmission path 42, and the communications part 43 for multiplex transmission of image data from the image pickup device 1 to the display device 2. Also, each of the image pickup devices 1 and the control device 3 are connected to each other via each corresponding communications part 41, the transmission path 42, and the communications part 44 for multiplex transmission of status data and control data. Here, the status data is transmitted from the image pickup device 1 to the control device 3, while the control data from the control device 3 to the image pickup device 1. The transmission path 42 is exemplified for a communications circuit or the Internet. The display device 2 is connected to the control device 3 via a transmission line for merged image/merging technique data.

The image pickup devices 1, the display device 2, and the control device 3 in FIG. 2 operate similar to those under the same reference numerals in FIG. 1, and the flow of data in the system of FIG. 2 is also the same as that of FIG. 1. An only difference between those two systems of FIGS. 1 and 2 is the connection among the image pickup devices 1, the display device 2, and the control device 3. That is, the connection in the system of FIG. 1 is direct via the transmission line, while that in the system of FIG. 2 is communications connection via the transmission path 42. Thus, hereinafter, FIG. 1 is referred to for the structure of the image pickup system of this embodiment.

The operation of the image pickup system in such structure is described below.

In FIG. 1, the image pickup device 1 optically picks up an image, converts the image into an electrical signal, and A/D converts the signal (compresses, if necessary) for output as image data. The image pickup device 1 also sets image quality parameters for the image data based on the control data coming from the control device 3 via the transmission line.

Here, the image quality parameters are used to define the image quality of the image data, and include, for example, those set in an optical system 10 (see FIG. 4; described later) for focal distance, aperture, zoom magnification, and the like, those in an image pickup part 11 for sensibility, the number of pixels, and the like, and those in a signal processing part 12 for image cutout size, compression ratio, amplification ratio (gain), color tint, and the like. Hereinafter, such image quality parameters are collectively referred to in the singular, but may plurally include those image quality parameters exemplified in the above.

The image pickup device 1 outputs, to the control device 3, status data which indicates an image quality parameter which has already been set therein. Here, depending on which control technique the control device 3 applies, the image pickup device 1 does not necessarily have such function of outputting the status data.

The display device 2 merges the image data outputted from each of the image pickup devices 1 (to generate a panoramic image, for example) for display. From the display device 2, two types of data are outputted to the control device 3; one is the resultant image data after image merging (hereinafter, merged image data), and the other is data indicating which merging technique has been applied (hereinafter, merging technique data). Here, depending on which control technique the control device 3 applies, the display device 2 does not necessarily have such function of outputting the merged image/merging technique data.

The control device 3 determines whether the image quality of the merged image is consistent on the display device 2. If determined No, the control device 3 outputs control data each corresponding to the image pickup devices 1. With the control data, the control device 3 controls the image quality parameter on the image pickup device 1 basis so as to make the image quality of the resultant image after merging consistent. For a case to generate a panoramic image, the image quality parameters are each so controlled as to make a boundary where two image data are merged (hereinafter, simply referred to as boundary) look inconspicuous.

Here, to see whether the image quality of the merged image is consistent, the control device 3 compares the image quality parameters with one another on the image pickup device 1 basis. In an alternative manner, the merged image may be examined if the image quality thereof is consistent.

To control the image quality parameter, a first control technique is the simplest of all three discussed here. In the first technique, the control device 3 controls the image pickup devices 1 for shared use of a common image quality parameter (fixed value), which is previously stored in the control device 3.

In the first technique, however, the image quality parameters in each of the image pickup devices 1 are forced to agree with the common image quality parameter fixed in value. As a result, surely the image quality of the resultant merged image becomes consistent, but the image quality may not be at a desired level.

For betterment, in a second control technique, the common image quality parameter is not previously stored in the control device 3, but determined by the control device 3 based on the status data comes from each of the image pickup devices 1. As described above, the status data is the one indicating the already-set image quality parameter. Thus determined common image quality parameter is set in the image pickup devices 1 for shared use thereamong. Typically, the control device 3 calculates an average for the image quality parameters set in each of the image pickup devices 1, and controls the image pickup devices 1 for shared use of the average value (or approximate value) as the image quality parameter.

In a third control technique, the image quality parameters in the image pickup devices 1 are so controlled as to make the image quality consistent around boundaries in the merged image. This control is done based on the merged image data provided from the display device 2 to the control device 3.

In detail, the image quality parameters for the image pickup devices $1_1$ and $1_2$ are so determined as to make the image quality consistent around a boundary (first boundary) between image data from the image pickup device $1_1$ and that from the image pickup device $1_2$. Similarly, the image quality parameters for the image pickup devices $1_2$ and $1_3$ are so determined as to make the image quality consistent around a boundary (second boundary) between image data from the image pickup device $1_2$ and that from the image pickup device $1_3$. The same is applicable to a boundary ((n−1)th boundary) between image data from the image pickup device $1_{(n-1)}$ and that from the image pickup device $1_n$.

Then, based on the image quality around the first boundary and that around the second boundary, determined is the image quality of the section between those two boundaries. Typically, the image quality of the section is so determined as to change linearly. Thus determined image quality parameters, which are functions representing value in each part of one image, are set to each of the image pickup devices 1 so as to make the image quality of the resultant merged image consistent.

To control the image quality parameter with the first control technique, the control device 3 only needs to store a fixed value in ROM, for example. The status data is not necessarily forwarded from the image pickup devices 1 to the control device 3, and the merged image data is not necessarily forwarded from the display device 2 to the control device 3.

With the second technique, the status data is forwarded from each of the image pickup devices 1 to the control device 3. Here, the display device 2 does not necessarily forward the merged image data to the control device 3.

With the third technique, the merged image data is provided from the display device 2 to the control device 3. Here, the status data is not necessarily forwarded from the image pickup devices 1 to the control data 3.

The image pickup system of FIG. 1 operates as such. Described next is the operation of each component in the image pickup system of FIG. 1.

FIG. 3 is a block diagram showing an exemplary structure of the control device 3. In FIG. 3, the control device 3 includes a CPU 301, RAM 302, and ROM 303. The ROM 303 stores a program 304 for the CPU 301 to operate. The CPU 301 executes the program 304 stored in the ROM 303 while using the RAM 302 as a working area, allowing the control device 3 to the image pickup devices 1, for example, to make the image quality of the merged image consistent on the display device 2 (first to third control techniques). The control processing carried out by the control device 3 is described in detail in the second embodiment and thereafter.

Next below, with reference to FIGS. 4A and 4B, the operation of the image pickup device 1 is described in detail.

Figure 4A:
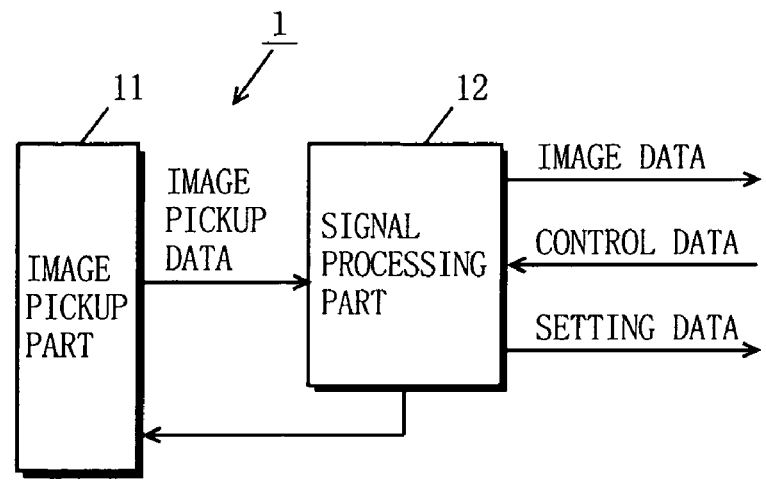
FIGS. 4A and 4B are block diagrams exemplarily showing two types of structure of an image pickup device 1 of FIG. 1.
Figure 4B:
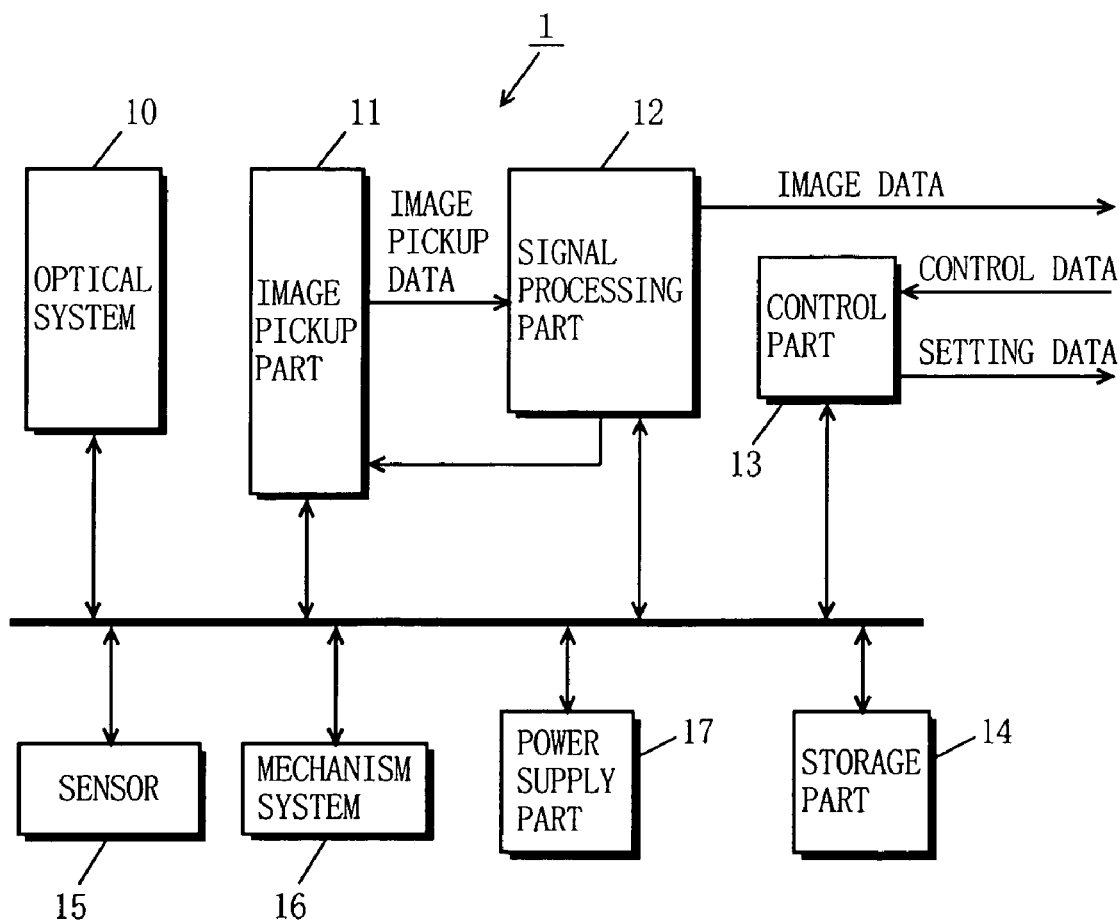

FIGS. 4A and 4B are block diagrams each showing an exemplary structure of the image pickup device 1 of FIG. 1.

The image pickup device 1 of FIG. 4A includes the image pickup part 11 and the signal processing part 12. The image pickup part 11 is implemented by a CCD and a CMOS sensor, for example. Therein, an optically picked-up image is converted into an electrical signal, and then the signal is A/D converted to be outputted as image pickup data.

In FIG. 4A, the signal processing part 12 processes the image pickup data based on the image quality parameter (according to the control data from the control device 3), and outputs image data. In the case that the image quality parameter is for gain value, filter coefficient, charge storage time, compression ratio, for example, the signal processing part 12 accordingly performs gain control, color filtering, digital filtering, and controls the charge storage time and the compression ratio of data in the image pickup part 11.

In another case that the image quality parameter is for that relating to A/D conversion such as sampling rate, quantization scale, quantization bit number, for example, the signal processing part 12 controls the image pickup part 11.

Note that, the image pickup part 11 may be implemented by also a pickup tube for outputting an analog image signal or an infrared sensor. If this is the case, the signal processing part 12 is the one which performs A/D conversion with respect to the analog image signal from the image pickup part 11.

Further, based on the control data from the control device 3, the signal processing part 12 can set a new image quality parameter and reset the already-set image quality parameter.

Herein, the control data is presumed to be the image quality parameter to be set, that is, the control device 3 specifies an image quality parameter to be set in each image pickup device 1. This is not restrictive, and the control data may be intermediate information for determining the image quality parameter (e.g., information for specifying brightness, color tint, sharpness, ON/OFF of noise filter), an instruction as to increase or decrease of the image quality parameter and intermediate information, or a combination of those.

Further, the image quality parameters controllable by the control device 3 are not limited to those above, and any arbitrary image quality parameter relevant to the image quality will do.

The image pickup device 1 of FIG. 4B includes the optical system 10, the image pickup part 11, the signal processing part 12, a control part 13, a storage part 14, a sensor 15, a mechanism system 16, and a power supply part 17. Herein, the image pickup system 11 and the signal processing part 12 operate similar to those above except that the image quality parameter is provided via the control part 13, and thus are not described here again.

The optical system 10 is exemplified for a lens and a driving part thereof, and changes itself in focal distance, zoom magnification, aperture, and the like, according to optical parameters set by the control part 13. The sensor 15 senses around the image pick up devices 1 for the brightness, back-light or not, and the like, and then outputs the result to the control part 13. The power supply part 17 supplies power to the image pickup devices 1, and is ON/OFF switchable under the control of the control part 13. The mechanism system 16 orients the image pickup devices under the control of the control part 13.

The control part 13 controls, based on the control data from the control device 3, the signal processing part 12, the optical system 10, the mechanism system 16, the power supply part 17, and the like.

The control data includes, for example, image quality parameter, cutout area parameter, direction parameter, and power ON/OFF instruction, and the control part 13 accordingly controls the above components.

Here, among those image quality parameters, any parameter to define the brightness of the image, such as sensitivity, amplification ratio, aperture, is now referred to as "brightness parameter". Next below, although the brightness parameter is taken as an example to describe a control procedure therefor, other types of parameters are controlled similarly.

Note that, the control part 13 may control several components only by one control data. For example, both the signal processing part 12 and the optical system 10 are controlled by the control data indicating the brightness parameter. As an example, to increase brightness according to the control data, the signal processing part 12 is increased in its sensitivity, and the optical system 10 is set larger in its aperture (smaller in F-number).

In addition to the data described in FIG. 4A, the control part 13 also outputs, as setting data, the information sensed by the sensor 15, ON/OFF of the power supply part 17, and the like. Here, the setting data is forwarded to the control device 3, and based thereon, the control device 3 controls the image quality parameter.

With such structure as FIG. 4B, the image pickup devices 1 becomes adjustable in direction for image pickup, and switchable with the power supply. In the image pickup system having such pickup device 1 equipped, the control device 3 can also orient the image pickup device 1 in a desired direction and optionally turns ON whichever image pickup device 1.

Figure 5:
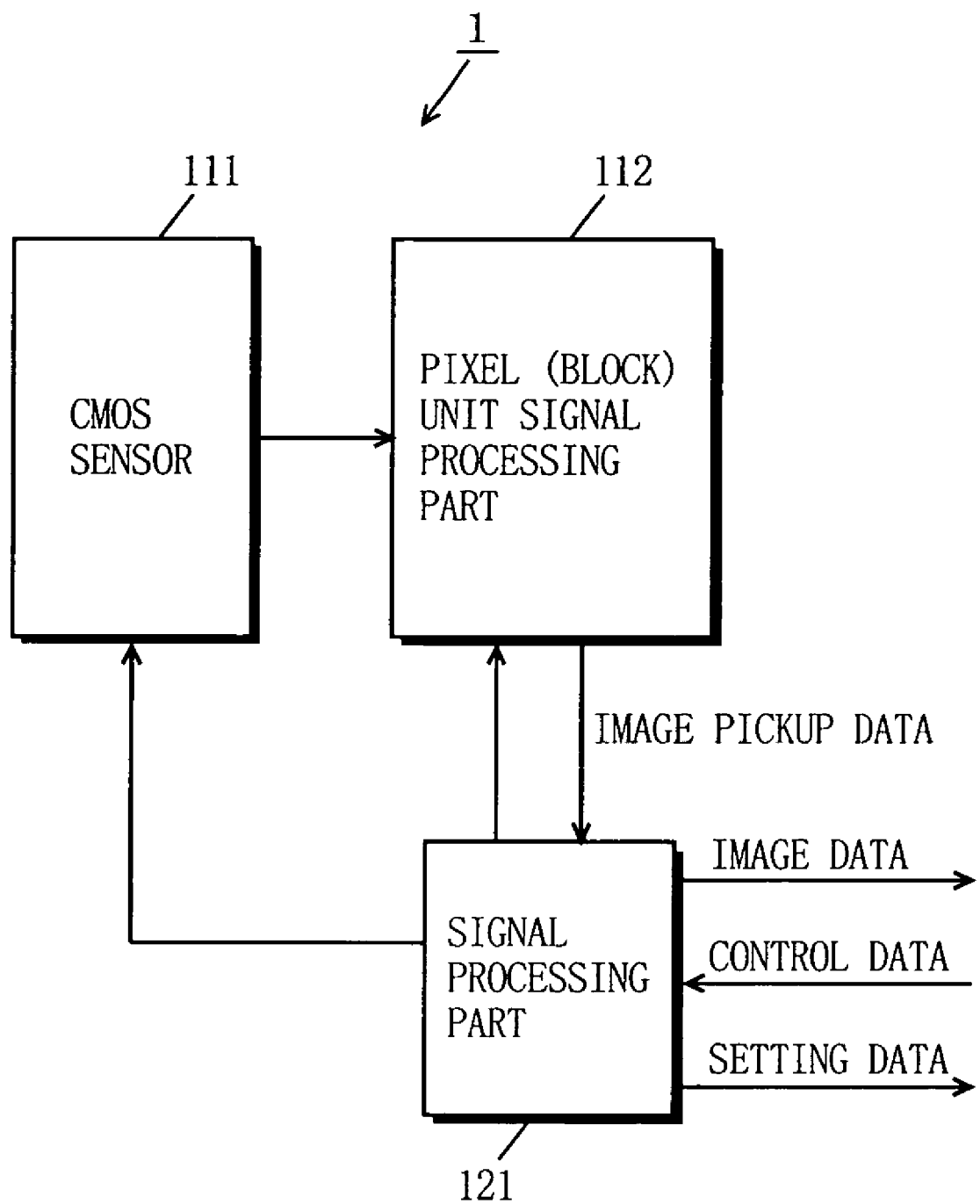
FIG. 5 is a block diagram exemplarily showing another type of structure of the image pickup device 1 of FIG. 1.

FIG. 5 is a block diagram showing another exemplary structure of the image pickup device 1 of FIG. 1. The image pickup device 1 of FIG. 5 includes a CMOS sensor 111, a pixel unit signal processing part 112, and a signal processing part 121. The CMOS sensor 111 and the pixel unit signal processing part 112 correspond to the image pickup part 11 of FIG. 4.

In such structured image pickup device 1, the CMOS sensor 111 is the one which converts an image into an electrical signal. The electrical signal is then forwarded to the pixel unit signal processing part 112 to be processed on a pixel basis, and then outputted as image pickup data.

The image pickup data is provided to the signal processing part 121 together with the control data from the control device 3. Based on the control data, the signal processing part 121 controls the image quality parameter (e.g., sensitivity, storage time, gain) set in the CMOS sensor 111 and the pixel unit signal processing part 112. Here, the control data provided to the signal processing part 121 is the one which controls the image quality parameter not on an image basis but on a pixel basis. Thus, the image quality parameter can be controlled for every pixel included in the image.

Note that, in the image pickup device 1 of FIG. 5, the image quality parameter is controlled on a pixel basis. This is not restrictive, and the image quality parameter may be controlled on a block basis. Here, the block is composed of several pixels, for example, 8 by 8 pixels, and accordingly the control data is reduced, and so is processing load of the signal processing part 121.

Described in detail next is the operation of the display device 2.

Figure 6A:
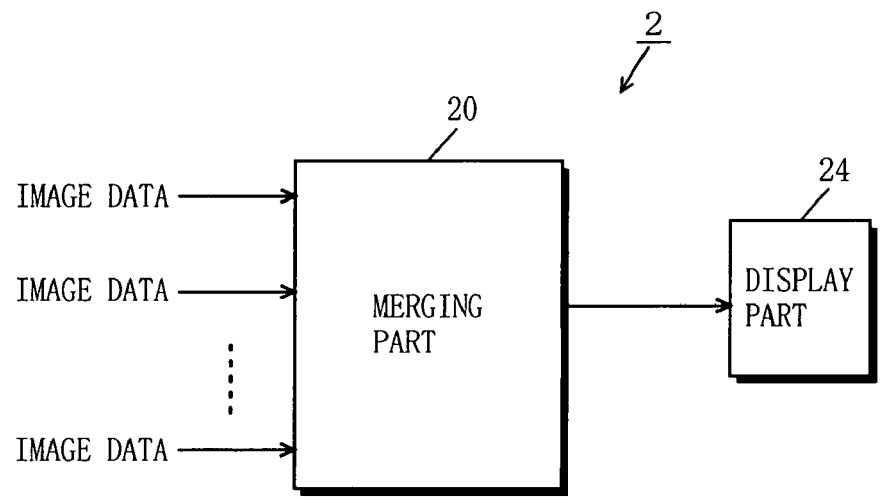
FIGS. 6A and 6B are block diagrams exemplarily showing two types of structure of a display device 2 of FIG. 1.
Figure 6B:
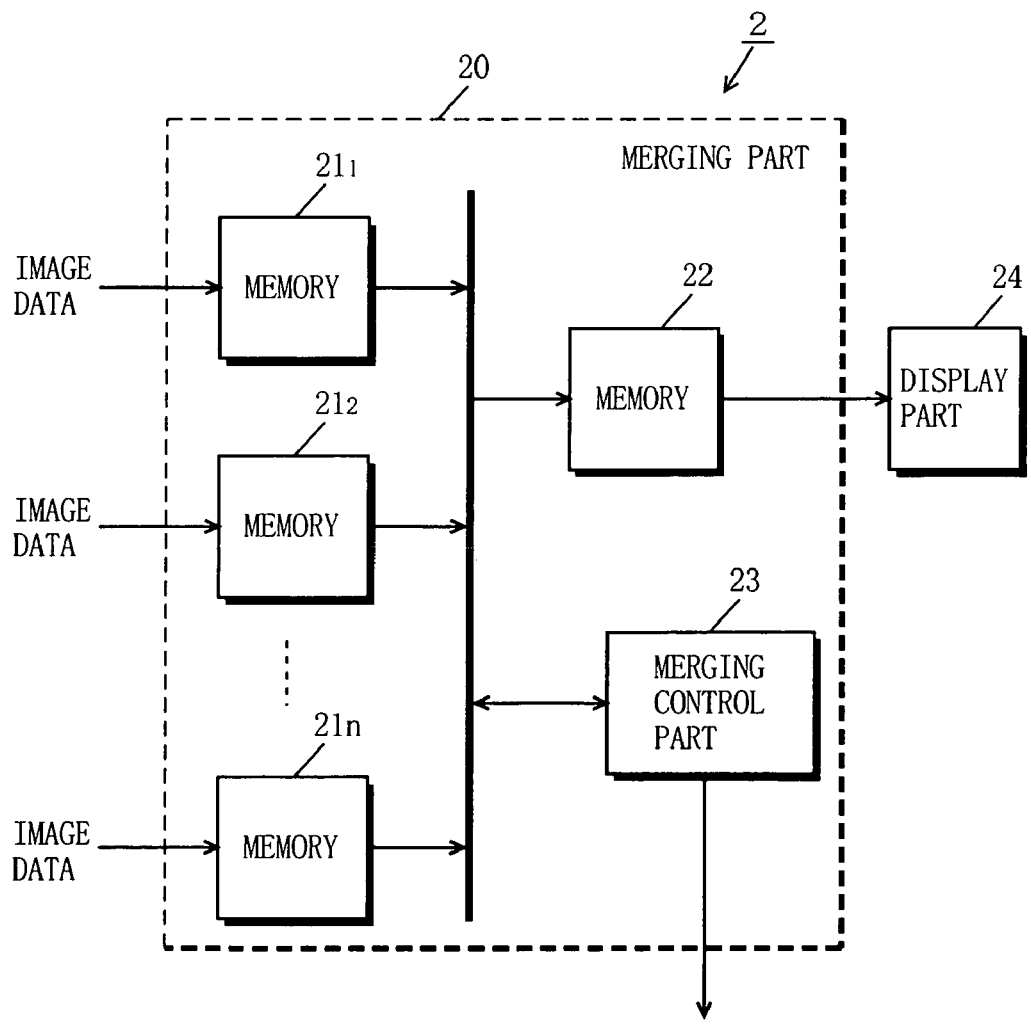

FIGS. 6A and 6B are block diagrams each showing an exemplary structure of the display device 2 of FIG. 1. The display device 2 of FIG. 6A includes a merging part 20, and a display part 24. The merging part 20 merges the image data coming from several image pickup devices 1 for output as one image data. For merging, applied may be the panoramic image merging technique and the multi image merging technique. A technique for switching several image data with the passage of time on a display, or a combination of those above techniques such as downsizing panoramic images to make those fit in one image maybe also a possibility. These techniques are only exemplary, and the merging part 20 surely can optionally apply any other possible technique to generate one image data from several.

The display part 24 receives the resultant merged image data from the merging part 20, and displays a merged image. The display part 24 typically displays moving pictures thereon, such as CRT, liquid crystal display, and plasma display. This is not restrictive, and a printer which prints still pictures on a paper will do as long as images become visible thereby.

The merged image data outputted from the merging part 20 is fed back to the control device 3, if required. If fed back, the control device 3 generates new control data for making the image quality of the merged image consistent.

The display device 2 of FIG. 6B is provided with memories $21_1$ to $21_n$ for storing image data coming from each corresponding image pickup devices $1_1$ to $1_n$, a memory 22 for storing merged image data, a merging control part 23 for performing image data merging while controlling the memories 21 and 22, and the display part 24. In FIG. 6B, the display part 24 operates similarly to that of FIG. 6A.

The memories 21 and 22, and the merging control part 23 structure the merging part 20. The merging part 20 corresponds to the merging part 20 of FIG. 6A. In the merging part 20 of FIG. 6B, the image data is first stored in the corresponding memories $21_1$ to $21_n$. Then, the image data is read by the merging control part 23 therefrom to be written into the memory 22. At this time, the merging control part 23 specifies both a read address for reading the image data from the memories 21 and a writing address for writing thus read image data into the memory 22. Thus, the merge image data is generated in the memory 22.

Before writing the image data read from the memory 21 into the memory 22, the merging control part 23 carries out signal processing so as to interpolate the image data and merge image data provided by the memories 21 together.

As such, with such signal processing and address control executed by the merging control part 23, the display part 24 can easily displays the merged image thereon.

The merging control part 23 also outputs, if necessary, merging technique data (indicating what technique has been applied, for example, the panoramic image merging technique, or the multi image merging technique), image quality information about the respective image data in the merged image data, and the like. Such data and information is fed back to the control device 3. If the image quality information is fed back, the control device 3 accordingly generates new control data for achieving the consistent image quality. With the merging technique data fed back, the control device 3 controls the image pickup devices 1 for the image cutout area.

Herein, although the display device 2 here is presumed to simply display the merged image data, this is not restrictive.

The display device 2 may perform a predetermined image processing based on the merged image data. If so, by taking FIG. 6A as an example, the display part 24 is replaced by an image processing part (not shown) to perform the predetermined image processing.

The image processing part may, for example, statistically process the merged image data, or analyze the merged image data to detect any object or acknowledge the movement thereof in a resultant image. Also, any 3D shape data may be extracted from the merged image data.

When displayed is a merged image, the above described control for consistent image quality is effective to make boundaries look inconspicuous. In the image processing as above, the control for consistent image quality is also effective to improve, in accuracy, the statistical processing, object detection, object movement acknowledgement, 3D data extraction, and the like.

As is known from the above, according to the first embodiment, an image generated by merging concurrently picked-up several images can surely have consistent image quality on a display. Further, depending on which merging technique has been applied, an image quality parameter can be controlled on a cutout area basis. Still further, in the image pickup system, the image pickup devices 1 are independently ON/OFF switchable.

(Second Embodiment)

In a second embodiment, described is an image pickup system which applies the first control technique described in the first embodiment. In the first control technique, the control device 3 controls the image pickup devices 1 for shared use of a common image quality parameter, which is previously stored in the control device 3.

The image pickup system of the second embodiment is similar to that of FIG. 1 (or FIG. 2). Further, the image pickup device 1, the display device 2, and the control device 3 of FIG. 1 (or FIG. 2) are similar to those of FIGS. 3 to 6B.

The second embodiment is provided for describing the operation of the control device 3 to a further degree, and other components already appeared in the first embodiment are considered operationally the same, and not described unless otherwise specified.

FIG. 3 shows the structure of the control device 3. In FIG. 3, the CPU 301 operates according to the program 304 stored in the ROM 303 while using the RAM 302 as a working area, allowing the control device 3 to execute such control processing as shown in a flowchart of FIG. 7.

Figure 7:
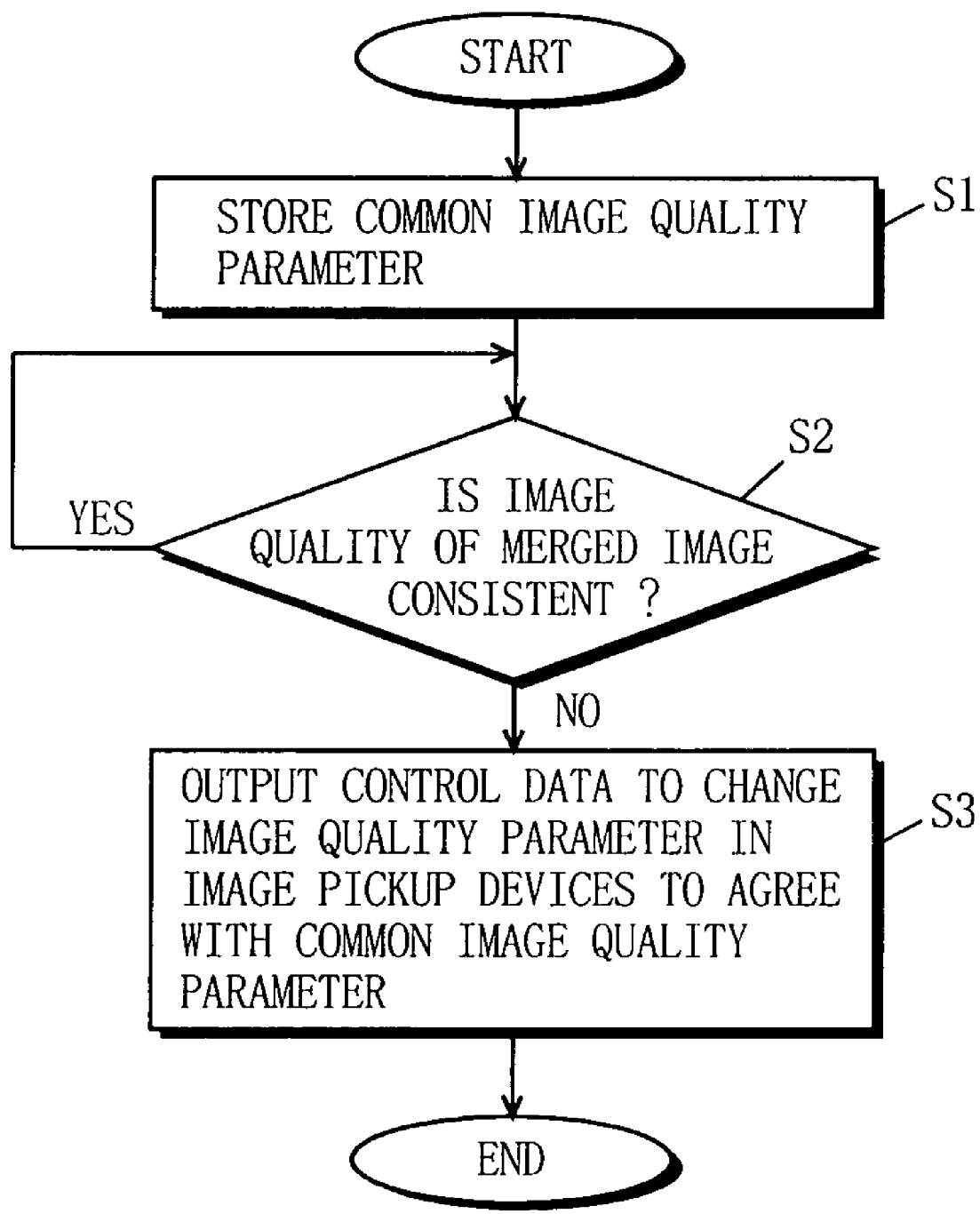
FIG. 7 is a flowchart showing the operation of the control device 3 of FIG. 1 in a second embodiment.

FIG. 7 is a flowchart showing the operation of the control device 3. In FIG. 7, the control device 3 stores, in advance, a common image quality parameter in the ROM 303, for example (step S1). The control device 3 first determines whether the image quality of a merged image consistent on the display device 2 (step S2). If determined Yes, the control device 3 is now on standby.

Here, to see whether the image quality of the merged image is consistent, the control device 3 compares image quality parameters with one another. The image quality parameter is the one already set in each image pickup device 1, and transmitted therefrom as status data. Determination factor here is whether those image quality parameters are equal to one another, or a difference thereamong is a threshold value or smaller. In an alternative manner, the control device 3 may receive the merged image data from the display device 2 to examine the resultant merged image whether the image quality thereof is consistent. If this is the case, the display device 2 needs to notify the control device 3 which part of the merged image is a boundary.

On the other hand, if determined No in step S2, the control device 3 generates control data for output to each of the image pickup devices 1 (step S3). The new control data is for making the already-set image quality parameters in the image pickup devices 1 agree with the common image quality parameter.

With the control data from the control device 3, the common image quality parameter is set in the image pickup devices 1 for shared use thereamong, thereby rendering the image quality of the merged image consistent on the display device 2. For example, when displayed is an image generated by the multi image merging technique, the image quality, for example brightness, becomes consistent. For an image generated by the panoramic image merging technique, boundaries therein look inconspicuous.

Here, as for the common image quality parameter, stored in the control device 3 may be only one or several. The case that the control device 3 stores only one common image quality parameter is described in the foregoing. If stored several, a user may elect which by directing the control device 3, or the control device 3 may select which at its discretion.

Figure 15:
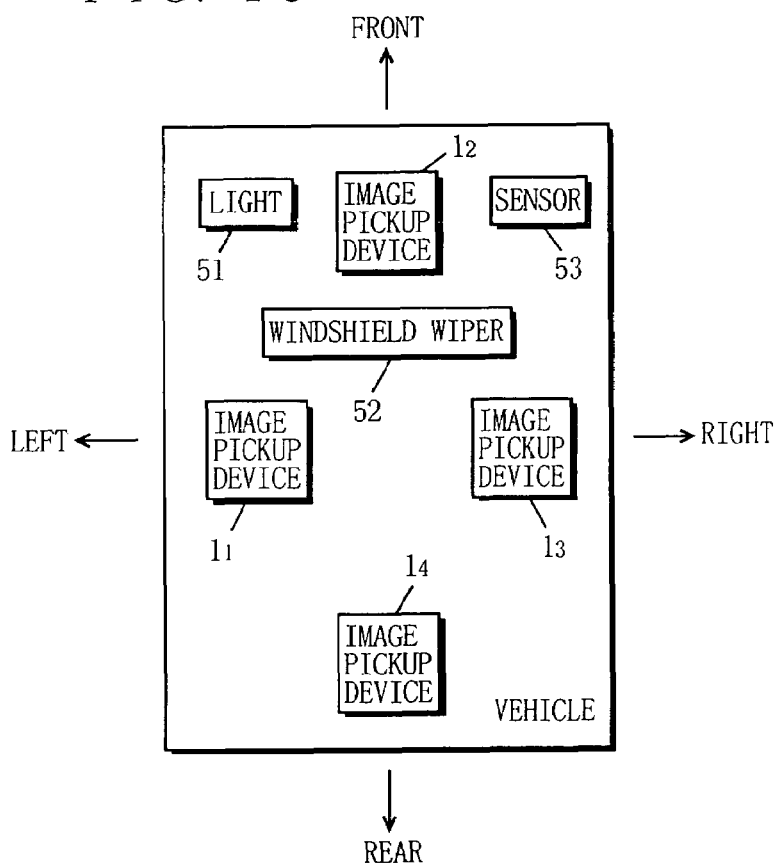
FIG. 15 is a diagram showing the image pickup devices ($1_1$ to $1_4$) of FIG. 1 mounted in a vehicle.

Such case is described in detail next. Here, assuming that the image pickup system is a vehicle-mounted type, and the image pickup device 1 is placed on the front, rear, right, and left as shown in FIG. 15. These four image pickup devices $1_1$ to $1_4$ each forward image data to the display device 2 for image merging therein. Then, displayed on the display device 2 is such image as shown in FIGS. 16, 17A and 17B.

Figure 16:
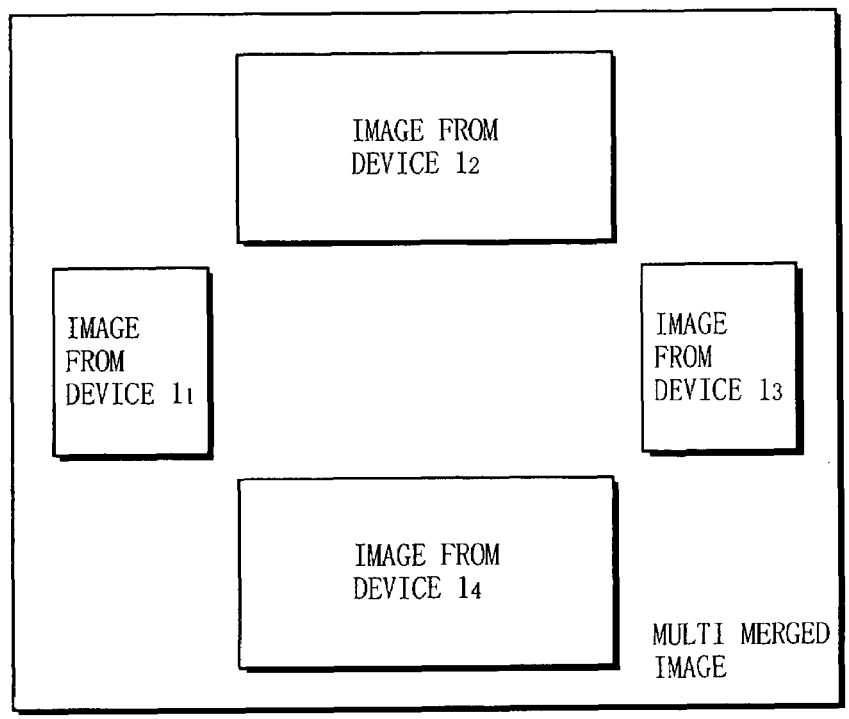
FIG. 16 shows an exemplary multi image after image merging displayed by the display device 2 of FIG. 1.
Figure 17A:
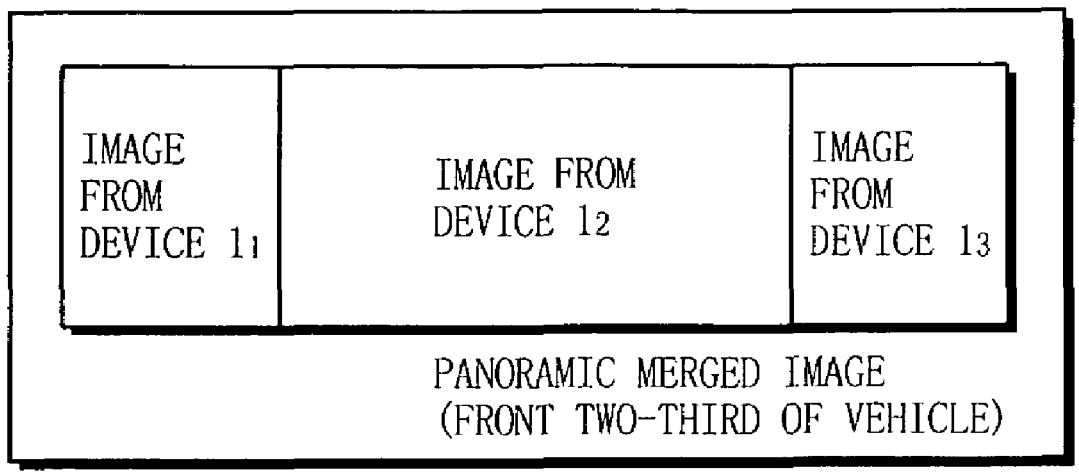
FIGS. 17A and 17B each show a panoramic image after image merging displayed by the display device 2 of FIG. 1.
Figure 17B:
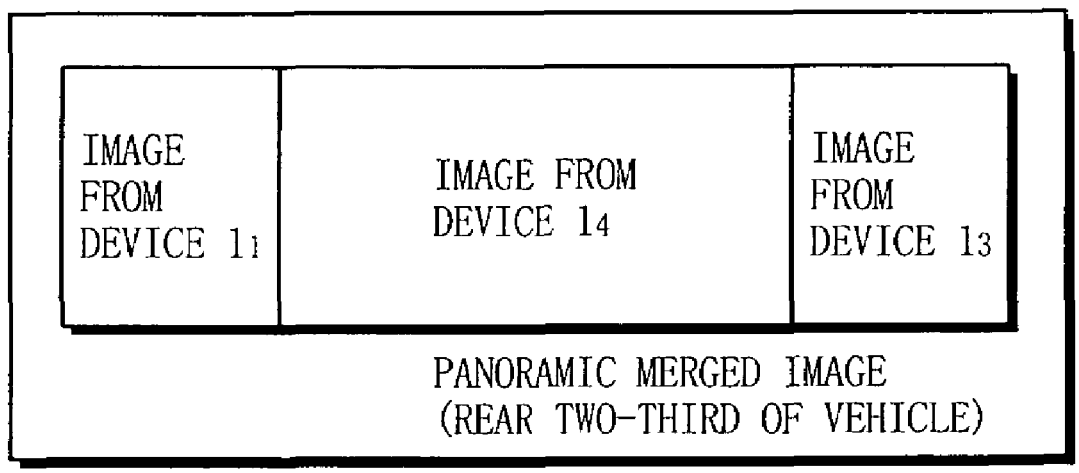

The image of FIG. 16 is the one generated by the multi image merging technique, while the images of FIGS. 17A and 17B are both images generated by the panoramic image merging technique. Specifically, the image of FIG. 17A covers the front two-third of the vehicle (that is, corresponds to the image pickup devices $1_1$ to $1_3$), and the image of FIG. 17B covers the rear two-third thereof (that is, corresponds to the image pickup devices $1_1$, $1_3$, and $1_4$).

If displayed is such type of merged image, an image quality parameter needs to respond to environmental change around the vehicle observed as the vehicle moves and time passes. Typically, a brightness parameter (e.g., brightness, aperture, amplification ratio) plays an important role in such case. As an example, if the control device 3 stores only one common image quality parameter with consideration only for daytime, image pickup at nighttime is unlikely (even if carried out, resulting in a dark image).

Therefore, the control device 3 here stores two common image quality parameters for daytime and nighttime, respectively. In this case, the user specifies which, and the control device 3 accordingly selects the specified common image quality parameter.

Alternatively, as shown in FIG. 15, the vehicle may be equipped with a sensor 53 for sensing the brightness therearound. The sensor 53 is connected to the control device 3. If equipped, based on the result obtained thereby, the control device 3 itself can make a selection which common image quality parameter.

As is known from the above, according to the second embodiment, the image quality parameters in each image pickup device 1 are forcefully changed to agree with the common image quality parameter. Thus, the image quality of a merged image becomes consistent through a simple control processing.

(Third Embodiment)

In a third embodiment, described is an image pickup system which applies the second control technique described in the first embodiment. In the second control technique, a common image quality parameter is determined by the control device 3 based on the already-set image quality parameters transmitted from the respective image pickup devices 1. Thus determined common image quality parameter is set in the image pickup devices 1 for shared use thereamong.

The image pickup system of the third embodiment is similar to that of FIG. 1 (or FIG. 2). Further, the image pickup device 1, the display device 2, and the control device 3 of FIG. 1 (or FIG. 2) are similar to those of FIGS. 3 to 6B.

The third embodiment is provided for describing the operation of the control device 3 to a still further degree, and other components already appeared in the first embodiment are considered operationally the same, and not described unless otherwise specified.

Figure 8:
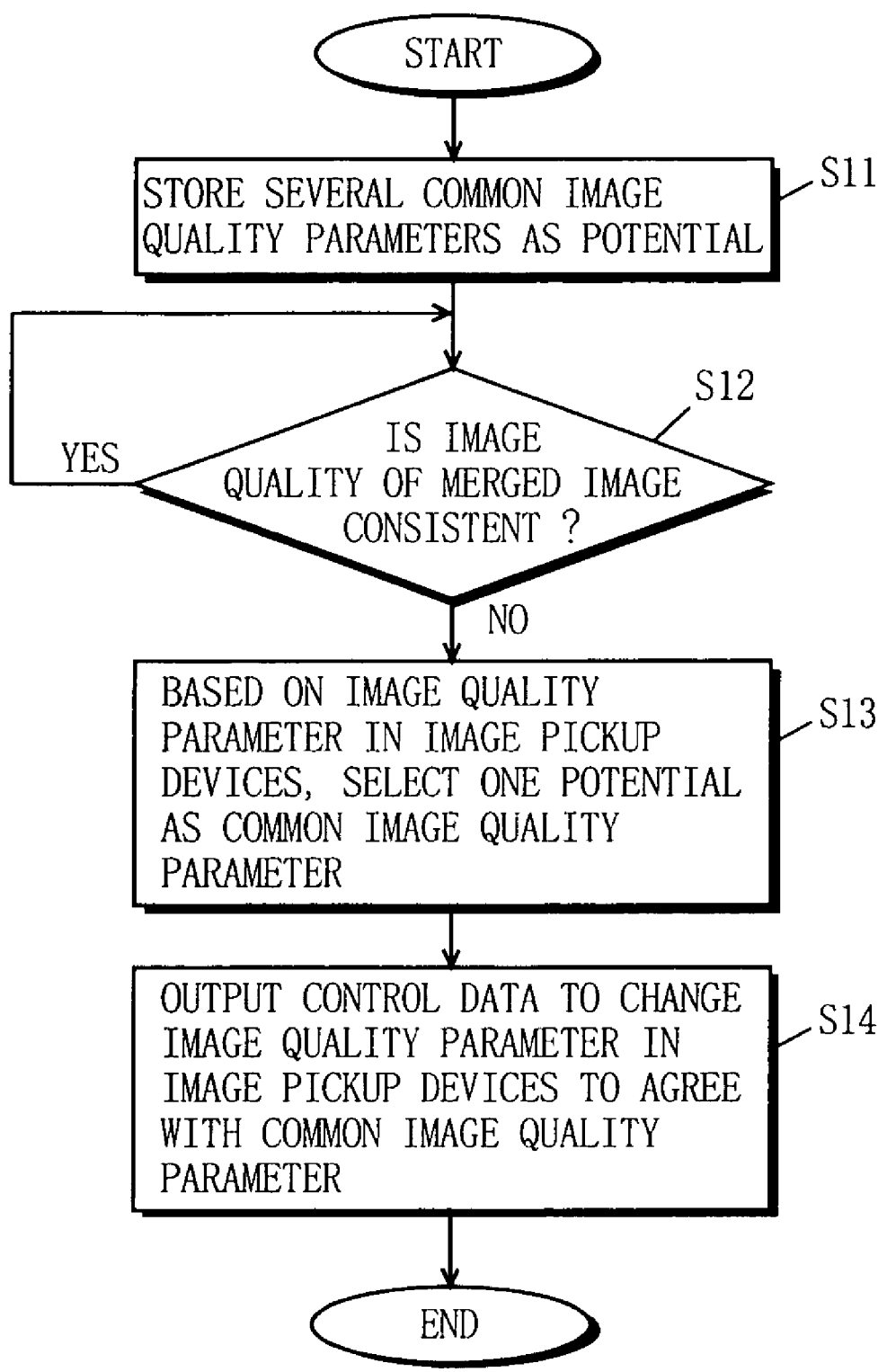
FIG. 8 is a flowchart showing the operation of the control device 3 of FIG. 1 in a third embodiment.

FIG. 8 is a flowchart showing the operation of the control device 3. In FIG. 8, the control device 3 stores, in advance, several common image quality parameters as potentials, for example (step S11). The control device 3 first determines whether the image quality of a merged image is consistent on the display device 2 (step S12). If determined Yes, the control device 3 is now on standby. See the second embodiment about how to make this determination.

Here, the control device 3 has so far received, as status data, the image quality parameters already set in each of the image pickup devices 1. If determined No in step S12, based on the status data, the control device 3 selects any one common image quality parameter out of those several potentials (step S13).

To be more specific, in step S13, the control device 3 first calculates an average of those already-set image quality parameters. Then, the calculated average is compared with those several potentials to find which common image quality parameter is closest. Thus found is determined as the common image quality parameter.

Next, the control device 3 generates control data, for output to each of the image pickup devices 1, so as to make the already-set image quality parameters therein agree with thus determined common image quality parameter (step S14).

In response to the control data, the image pickup devices 1 each accordingly change its image quality parameter. This successfully brings about the consistent image quality of an image after merging.

In this manner, in addition to the effects achieved in the second embodiment, the value change of the image quality parameters in the image pickup devices 1 can be minimized thanks to the average value calculated for comparison with several potentials common image quality parameters. For example, the brightness of the merged image can be consistent with less variation in brightness. Similarly, if the image pickup devices 1 are each equipped with a function of automatically adjusting their image quality parameter according to the environmental change therearound (e.g., brightness), the resultant merged image always becomes always optimal in its image quality (brightness).

In the above, the control device 3 previously stores several common image quality parameters as potentials for comparison with an average value to be calculated. This is not restrictive, and the average value may be simply determined as a common image quality parameter. Or the control device 3 may search the already-set image quality parameters of the image pickup devices 1 for the closest in value to the average, and determine thus found as a common image quality parameter.

Herein, as for a more general manner to make the change of image quality parameters minimized, a common image quality parameter may be determined by simply considering what values the already-set image quality parameters show.

Further, the status data forwarded from each of the image pickup devices 1 to the control device 3 is not limited to the already-set image quality parameter. Any data will do as long as the data indicates the status of the image pickup devices 1. For example, if the image pickup device 1 is equipped with the sensor 15 for sensing the brightness therearound, and if an image quality parameter (e.g., sensitivity) therein is automatically set based on the sensed brightness, notified from the image pickup device 1 to the control device 3 may not its image quality parameter but the brightness sensed by the sensor 15. If this is the case, the control device 3 calculates an average of the brightness, and out of those potentials stored therein, determines which shows the closest value to the average.

(Fourth Embodiment)

In a fourth embodiment, described is an image pickup system which applies the third control technique described in the first embodiment. The third control technique is specifically applied to generate a panoramic image. In detail, the image quality parameters in the image pickup devices 1 are so controlled as to make the image quality consistent around boundaries in the merged image. This control is done based on the merged image data or image quality information provided from the display device 2 to the control device 3.

The image pickup system of the fourth embodiment is similar to that of FIG. 1 (or FIG. 2). Further, the image pickup device 1, the display device 2, and the control device 3 of FIG. 1 (or FIG. 2) are similar to those of FIGS. 3 to 6B.

The fourth embodiment is provided for describing the operation of the control device 3 to a further degree, and other components already appeared in the first embodiment are considered operationally the same, and not described unless otherwise specified.

FIG. 3 shows the structure of the control device 3. Herein, the program 304 stored in the ROM 303 is different from the one in the first embodiment, and so is the operation of the control device as shown in FIG. 9.

Herein, the image quality parameter is set on a pixel (or a block, composed of several pixels) basis unlike the second and third embodiments on an image basis. Also, the image quality parameter is not changed to agree with the common image quality parameter, but is changed in such manner as to make boundaries in a merged image look inconspicuous.

In detail, the image quality of the merged image is considered entirely consistent in the second and third embodiments. On the other hand, in the fourth embodiment, the image quality is consistent only around boundaries between any pair of pixels or blocks. In such case, the image quality around a boundary is not consistent with that around a boundary next thereto. In consideration thereof, the image quality parameter is controlled on a pixel (or block) basis so that a section between those two boundaries changes in image quality linearly (or gradually).

Figure 9:
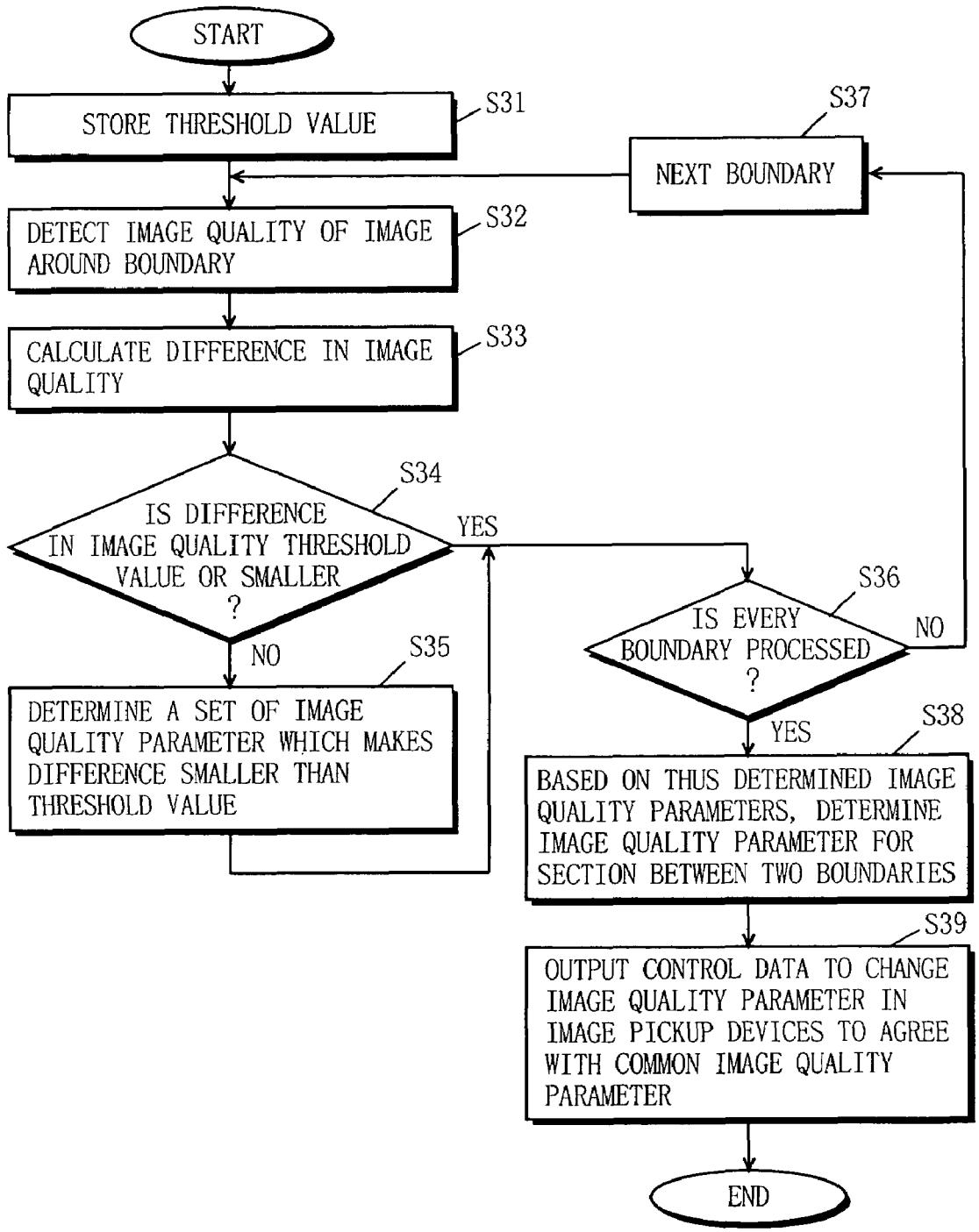
FIG. 9 is a flowchart showing the operation of the control device 3 of FIG. 1 in a fourth embodiment.

FIG. 9 is a flowchart showing the operation of the control device 3. In FIG. 9, the control device 3 stores in advance a threshold value, which is a difference of the image quality between two areas around the boundary (step S31).

Once received the merged image data from the display device 2 is received, the control device 3 first detects the image quality therein around a first boundary, which is observed between a pair of pixels or blocks (step S32).

Figure 18:
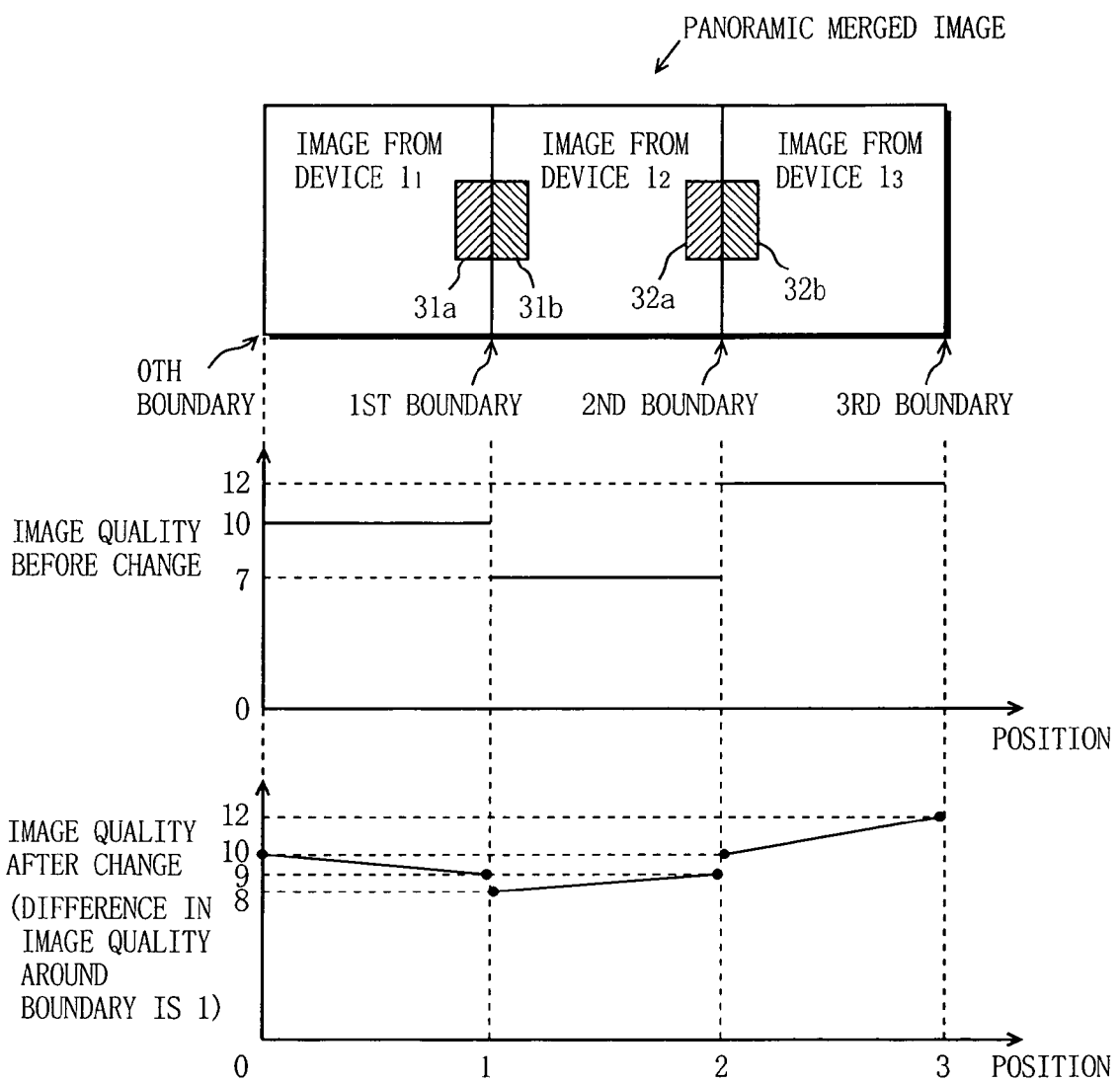
FIG. 18 is a diagram visually showing image quality control (to change image quality in a single image) carried out by the control device 3 in the fourth embodiment on a panoramic image generated by merging image data outputted from three image pickup devices $1_1$ to $1_4$ of FIG. 1.

FIG. 18 is a diagram visually showing image quality control carried out by the control device 3 in the fourth embodiment on a panoramic image, which is generated by merging image data outputted from three image pickup devices $1_1$ to $1_3$ of FIG. 1. In step S32, as shown in FIG. 18, detected is the image quality (e.g., brightness) of areas 31a and 31b around the first boundary. Herein, the image quality parameters of the areas 31a and 31b are presumed to be "10" and "7", respectively.

The control device 3 then calculates a difference in brightness, for example, between the image quality parameters detected in step S32 (step S33). Thus calculated difference is compared with the previously stored threshold value to see if the difference is equal to or smaller than the threshold value (step S34).

If determined No in step S34, the control device 3 changes the image quality parameters to make the difference equal to or smaller than the threshold value (step S35). Then, the procedure goes to step S36.

In the example of FIG. 18, since the image quality parameters are "10" and "7", a difference in image quality around the first boundary is "3". Assuming that the threshold value is "1", the control device 3 determines the difference is exceeding the threshold value, and accordingly changes the image quality parameters. For example, the image quality parameter for the area 31a is changed to "9", while that for the area 31b is changed to "8". This is surely not restrictive, and the image quality parameter for the area 31a may be changed to "8", but that for the area 31b may be left as it is.

If determined Yes in step S34, the control device 3 then determines whether every boundary has been subjected to processing (step S36).

If determined No in step S36, the next boundary (here, a second boundary) is selected for processing (step S37), and the procedure repeats the step S32 and onwards.

In the example of FIG. 18, detected is the image quality of areas 32a and 32b around the second boundary. Herein, the image quality parameters of the areas 32a and 32b are presumed to be "7," and "12", respectively. In this case, since the difference of the image quality parameters is "5", the control device 3 determines the value is exceeding the threshold (=1), and accordingly changes the image quality parameters. Herein, presumably, the image quality parameter for the area 32a is changed to "9", and that for the area 32b is changed to "10".

Such processing is repeated until every boundary in the panoramic image is through, and once determined Yes in step S36, the procedure goes to step S38, and then step S39.

In step S38, the control device 3 determines image quality parameters for a section between two boundaries based on the result in step S35, specifically, the image quality parameters for the boundaries from the first to the (n–1)th. In detail, a linear line (or a gradual curve) is drawn from the image quality parameter around for the first boundary to that around for the second boundary, and then along the line, image quality parameters are determined for a section therebetween on a pixel or block basis.

In the example of FIG. 18, the image quality parameter for a 0th boundary is "10", and that for the area 31a is "9". Accordingly, image quality parameters in a section between those two boundaries are determined by a linear line which is so drawn as to pass through two points of (0, 10), and (1, 9). For example, since an intermediate point between the points (0, 10) and (1, 9) is calculated as (0, 5, 9, 5), an image quality parameter for the intermediate point between the 0th and first boundary is determined as "9.5".

Here, the determination factor for the image quality parameters in a section is not limited to be such linearly line, and may be a gradual curve such as secondary function and log function.

A section between the first and second boundaries, and a section between the second and third boundaries are determined in the same manner as above.

In the next step S39, the control device 3 generates control data for output to each of the image pickup devices 1. With the control data, the image quality parameters which have been already set in the image pickup devices 1 are changed to agree with the image quality parameters determined in step S35 for the areas around boundaries, and the image quality parameters determined in step S38 for the sections. This is the end of the processing.

In the foregoing, in addition to the image quality parameters for the areas around boundaries, the control device 3 also determines those for the sections between the boundaries. This is not restrictive, and the image quality parameters for the areas around boundaries may be determined on the image pickup device 1 side.

If this is the case, the control device 3 outputs the image quality parameters determined in step S35 to each corresponding image pickup device 1. More specifically, the image quality parameters for the areas around the first boundary are outputted to the image pickup devices $1_1$ and $1_2$, the image quality parameters for the areas around the second boundary is outputted to the image pickup devices $1_2$ and $1_3$, and the image quality parameters for the areas around the (n–1)th boundary are outputted to the image pickup devices $1_{(n-1)}$ and $1_n$.

For example, in consideration of the image quality parameter for the area 31a, the image pickup device $1_1$ changes the image quality parameter for the section between the 0th and the first boundaries from "10" to "9". That is, the image quality parameter for the area 31a is reduced to be "9". Therefore, in the section between the 0th and first boundaries, the image quality parameters are so determined as to change linearly (or gradually).

Similarly, in consideration of the image quality parameter for the area 31a, the image pickup device $1_2$ changes the image quality parameter for the section between the first and second boundaries from "7" to "8". That is, the image quality parameter for the area 31b is increased to be "8". Also, in consideration of the image quality parameter for the area 31b, the image pickup device $1_2$ changes the image quality parameter for the section between the second and third boundaries from "7" to "9". That is, the image quality parameter for the area 32a is increased to be "9". Therefore, in the section between the first and second boundaries, the image quality parameters are so determined as to change linearly (or gradually).

The image pickup device $1_3$ performs image quality parameter change in the same manner. As a result, the image quality parameters around each boundary become equal to or smaller than the threshold value (=1), whereby boundaries in a panoramic image after merging look inconspicuous on the display device 2. Note that, the threshold value is not surely limited to 1, and may be any desired value such as "2" and "0.5". Or a difference in image quality may be set to "0", and if so, the image quality parameter for areas around a boundary coincide with each other.

In the second to fourth embodiments in the above, described are the techniques for achieving a merged image with consistent image quality through control on the image quality parameters in the image pickup devices 1. As a fifth embodiment next below, the image pickup devices 1 are controlled for a cutout area so that the amount of information about the merged image is controlled. Or as a sixth embodiment, the image pickup devices 1 are ON/OFF controlled so that power cutdown can be achieved.

(Fifth Embodiment)

Described in a fifth embodiment is a technique for controlling the image pickup devices 1 for an image cutout area to reduce the amount of information transmitted to the display device 2 about a merged image. Instead of reducing the amount of information, the image quality can be improved.

The image pickup system of the fifth embodiment is similar to that of FIG. 1 (or FIG. 2). Further, the image pickup device 1, the display device 2, and the control device 3 of FIG. 1 (or FIG. 2) are similar to those of FIGS. 3 to 6B.

The fifth embodiment is provided for describing the operation of the control device 3 to a further degree, and other components already appeared in the first embodiment are considered operationally the same, and not described unless otherwise specified.

Herein, the image pickup devices 1 are allowed to cutout an image only for a previously-set area for output. The previously-set cutout area is controlled by the control device 3, and the image pickup devices 1 accordingly follow the control.

FIG. 3 shows the structure of the control device 3. Herein, the program 304 stored in the ROM 303 is different from the one in the first embodiment, and so is the operation of the control device as shown in FIG. 10.

Figure 10:
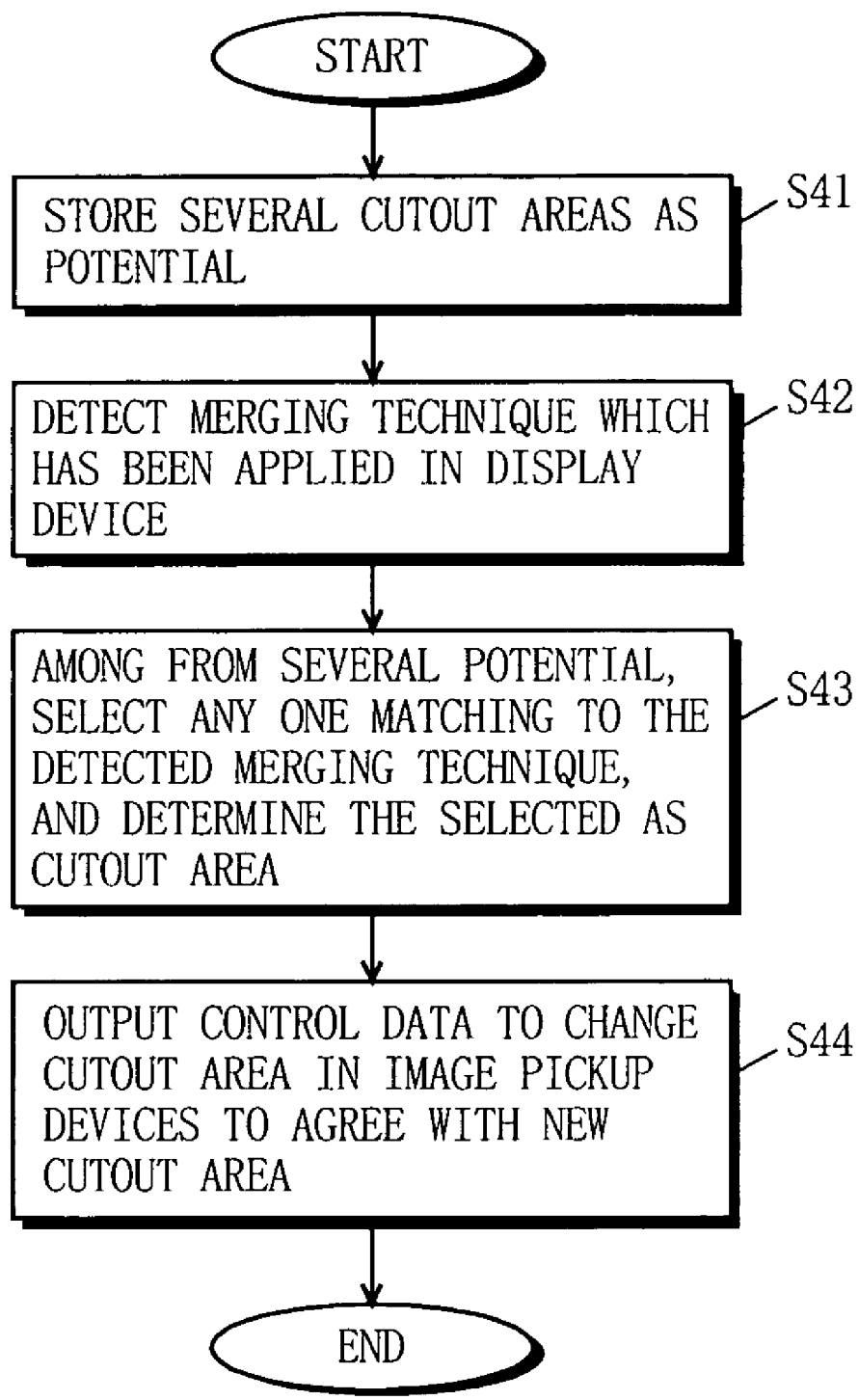
FIG. 10 is a flowchart showing the operation of the control device 3 of FIG. 1 in a fifth embodiment.

FIG. 10 is a flowchart showing the operation of the control device 3. In FIG. 10, the control device 3 stores in advance several cutout areas as potentials to have the image pickup devices 1 cutout their image data partially or entirely (step S41).

Here, presumably, stored are two potentials; one is a first cutout area which causes the image pickup devices 1 to cutout the image data in its entirety, and a second cutout area to cutout only a previously-set area.

As to the display device 2, stored are a panoramic image merging mode and a multi image merging mode, which are of merging image data from the image pickup devices 1. In the panoramic image merging mode, the image data is partially cut out (trimmed) and merged into a panoramic image. In the multi image merging mode, the image data from the image pickup devices 1 are arranged in an image (changed in size, if necessary).

Therefore, when the multi image merging mode is applied in the display device 2, each of the image pickup devices 1 needs to transmit the image data in its entirety to the display device 2. On the other hand, when the panoramic image merging mode is applied, the image pickup devices 1 need to transmit only the image data in a required area for a panoramic image to be generated. Accordingly, the amount of image data transmitted to the display device 2 can be reduced.

Referring back to the flowchart of FIG. 10. Based on the merging technique data from the display device 2, the control device 3 detects which merging technique has been applied in the display device 2 (the panoramic image merging mode or the multi image merging mode) (step S42). Then, the control device 3 selects any cutout area from among those potentials corresponding to the merging technique detected in step S42 (step S43). Thus selected cutout area is determined as a cutout area.

To be specific, with the multi image merging mode, the control device 3 selects a first cutout area (entire image data) which corresponds to the multi merged image. On the other hand, with the panoramic image merging mode, selected is a second cutout area (partial image data) which corresponds to the panoramic merged image.

The control device 3 then generates control data to change the cutout area already set in the image pickup devices 1 to the one determined in step S43. The control data is outputted to the image pickup devices 1 (step S44).

As an example, if the merging technique in the display device 2 is switched to the panoramic image merging mode during when the cutout area already set in the image pickup devices 1 is the first cutout area, the control device 3 determines the second cutout area as a new cutout area. Then, the control device 3 transmits the control data to the image pickup devices 1 to change the first cutout area to the second.

In response to the control data from the control device 3, the image pickup devices 1 each change its cutout area therein. Therefore, the image pickup devices 1 can each change its cutout area according to which merging technique the display device 2 has been applied.

In the foregoing, the control device 3 determines the cutout area responding to the notification provided by the display device 2. This is not restrictive, and a user may instruct the control device 3. If this is the case, in step S43, the control device 3 receives the user's instruction, selects the cutout area at the user's request from among those several potentials, and then determines thus selected area as a cutout area.

(Sixth Embodiment)

In a sixth embodiment, described in detail is a technique for ON/OFF controlling a power supply of each of the image pickup devices 1. With this technique, achieved is power cutdown and less information transmitted from the image pickup devices 1 to the display device 2. Alternatively, instead of reducing information, the image quality may be improved.

The image pickup system of the sixth embodiment is similar to that of FIG. 1 (or FIG. 2). Further, the image pickup device 1, the display device 2, and the control device 3 of FIG. 1 (or FIG. 2) are similar to those of FIGS. 3 to 6B.

The sixth embodiment is provided for describing the operation of the control device 3 to a still further degree, and other components already appeared in the first embodiment are considered operationally the same, and not described unless otherwise specified.

FIG. 3 shows the structure of the control device 3. Herein, the program 304 stored in the ROM 303 is different from the one in the first embodiment, and so is the operation of the control device as shown in FIG. 11.

Figure 11:
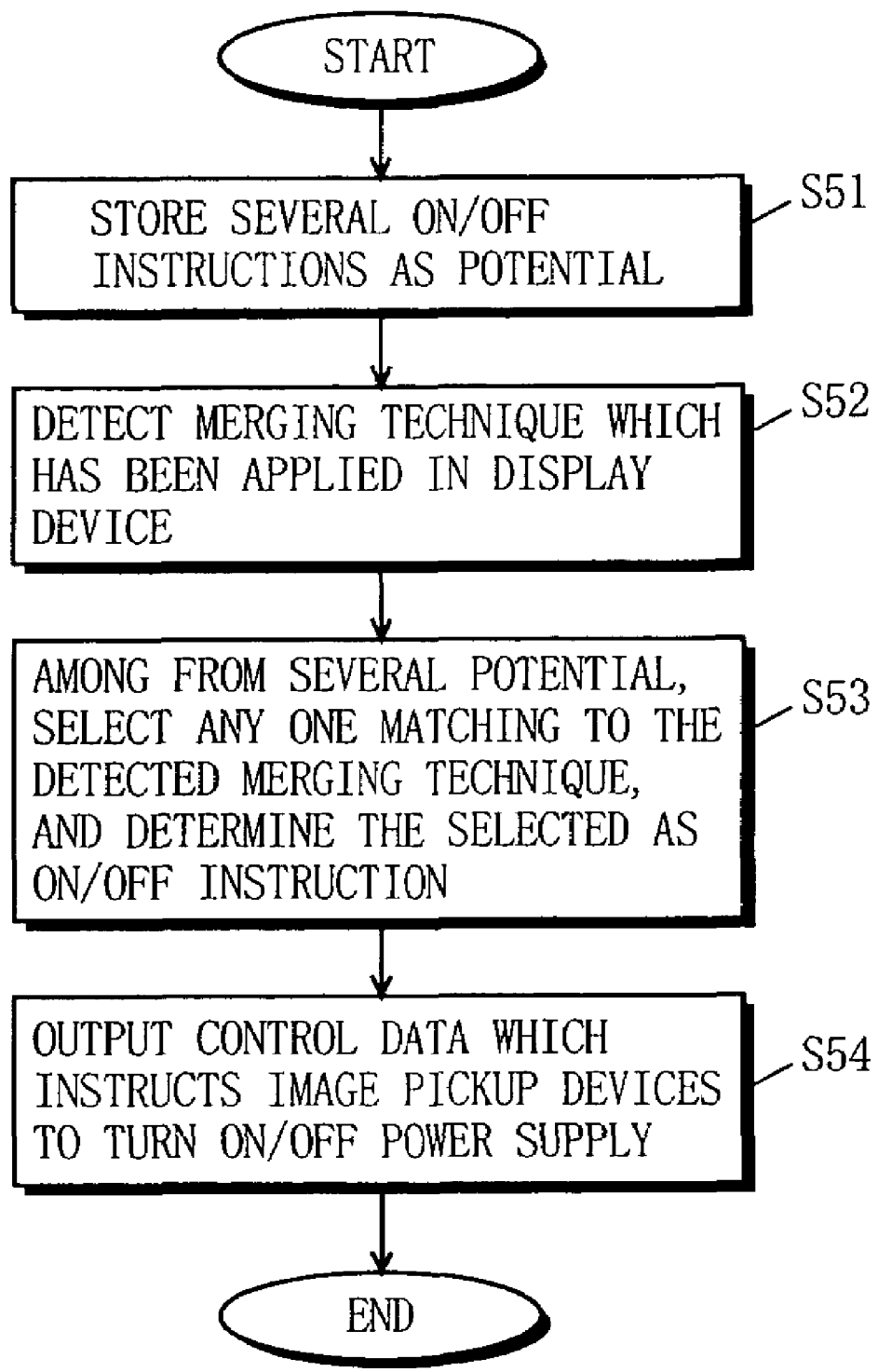
FIG. 11 is a flowchart showing the operation of the control device 3 of FIG. 1 in a sixth embodiment.

FIG. 11 is a flowchart showing the operation of the control device 3. In FIG. 11, the control device 3 stores in advance several instructions as potentials to turn ON/OFF the power supply of each of the image pickup devices 1 (step S51).

Stored herein, for example in FIG. 15, are a first ON/OFF instruction to turn ON every image pickup device $1_1$ to $1_4$, a second ON/OFF instruction to turn OFF the image pickup device $1_4$ but turn ON the rest, and a third instruction to turn OFF the image pickup device $1_2$ but turn ON the rest.

As for a merging technique to merge image data provided by the image pickup devices 1, the display device 2 can be switched among a multi image merging mode, a first half panoramic image merging mode, and a second half panoramic image merging mode.

In the multi image merging mode, every image data from the image pickup devices $1_1$ to $1_4$ is merged into a panoramic image. In the first half panoramic image merging mode, merged are the image data from three image pickup devices $1_1$ to $1_3$, which are mounted in the rear two-third of the vehicle. In the second half panoramic image merging mode, merged into a panoramic image are the image data from three image pickup devices $1_1$, $1_3$, and $1_4$, which are mounted in the front two-third of the vehicle.

As such, when the multi image merging mode is applied in the display device 2, every image pickup device $1_1$ to $1_4$ needs to be turned ON. On the other hand, with the first and second half panoramic image merging modes, power consumption is reduced by not turning ON all of those, that is, turning ON only three image pickup devices $1_1$ to $1_3$, or $1_1$, $1_3$, and $1_4$. With those modes, the information from the image pickup devices 1 to the display device 2 can be also reduced.

Referring back to the flowchart of FIG. 11, according to the merging technique data provided by the display device 2, the control device 3 detects which merging technique has been applied in the display device 2 (the multi image merging mode, the first front panoramic image merging mode, or the second half panoramic image merging mode) (step S52). Then, the control device 3 selects any ON/OFF instruction among those potentials corresponding to the merging technique detected in step S52. (step S53). Thus selected is determined as an ON/OFF instruction.

To be specific, if the multi image merging mode is informed, the control device 3 selects the corresponding first ON/OFF instruction (turn ON every image pickup device $1_1$ to $1_4$). With the first half panoramic image merging mode, selected is the corresponding second ON/OFF instruction to turn OFF the image pickup device $1_4$ but turn ON the rest. With the second half panoramic image merging mode, selected is the corresponding third ON/OFF instruction to turn OFF the image pickup device $1_2$ but turn ON the rest.

Then, the control device 3 generates control data indicating which ON/OFF instruction has been determined in step S53 for output to the image pickup deices 1 (step S54).

As an example, if the display device 2 is switched from the multi merging image mode to the first half panoramic image merging mode, the display device 2 determines the second ON/OFF instruction as a new ON/OFF instruction. Then, the control device 3 transmits such control data to the image pickup devices 1.

The image pickup devices 1 each follow the control data from the control device 3. In this manner, the image pickup devices 1 each turn ON/OFF its power supply according to the merging technique applied in the display device 2, thereby cutting down power by turning OFF any unwanted image pickup device 1.

In the foregoing, the control device 3 determines the ON/OFF instruction responding to the notification provided by the display device 2. This is not restrictive, and a user may instruct the control device 3. If this is the case, in steps S52 and S53, the control device 3 receives the user's instruction, selects the ON/OFF instruction at the user's request from among those several potentials, and then determines thus selected instruction as an ON/OFF instruction.

(Seventh Embodiment)

In a seventh embodiment, with an assumption that the image pickup devices 1 are mounted in a vehicle, described is a technique for controlling the image quality parameters in the image pickup devices 1 depending on in which state the vehicle is. For example, if the vehicle turns its light ON, the image pickup devices 1 are increased in sensitivity.

The image pickup system of the seventh embodiment is similar to that of FIG. 1 (or FIG. 2). Further, the image pickup device 1, the display device 2, and the control device 3 of FIG. 1 (or FIG. 2) are similar to those of FIGS. 3 to 6B.

The seventh embodiment is provided for describing the operation of the control device 3 to a further degree, and other components already appeared in the first embodiment are considered operationally the same, and not described unless otherwise specified.

Herein, as shown in FIG. 15, the vehicle is provided with a light 51 and a windshield wiper 52. Once the light 51 and windshield wiper 52 are turned ON, the control device 3 accordingly increases the brightness parameter (e.g., sensitivity) of the image pickup devices 1.

Also, the control device 3 can detect if the vehicle is going straight, turning left or right. For example, if it detects the vehicle is making a left turn, the control device 3 lowers the resolution of the image pickup devices $1_3$, which is mounted on the right side of the vehicle.

FIG. 3 shows the structure of the control device 3. Herein, the program 304 stored in the ROM 303 is different from the one in the first embodiment, and so is the operation of the control device as shown in FIG. 12.

Figure 12:
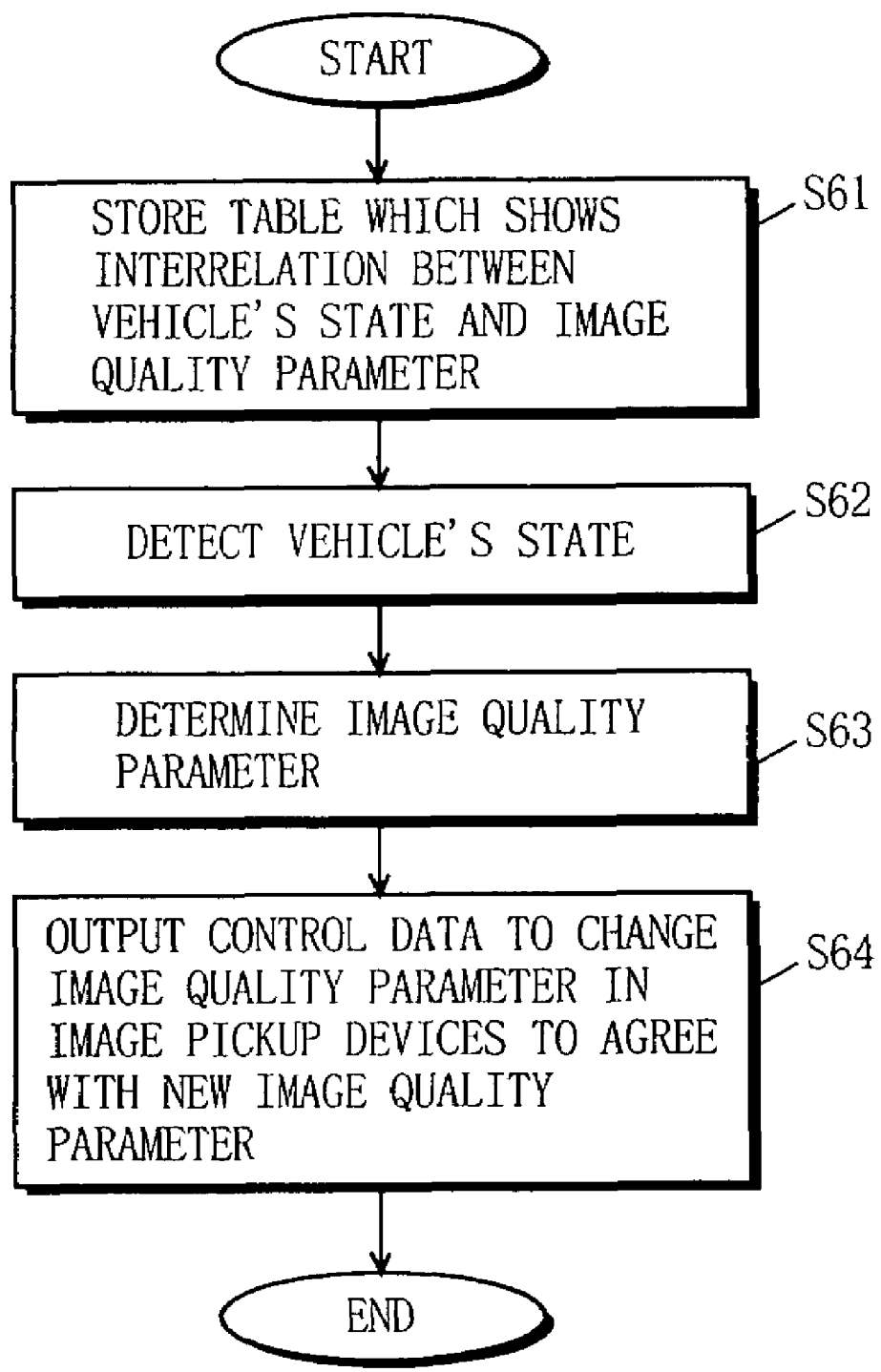
FIG. 12 is flowchart showing the operation of the control device 3 of FIG. 1 in a seventh embodiment.

FIG. 12 is a flowchart showing the operation of the control device 3. In FIG. 12, the control device 3 previously stores, exemplarily in the ROM 303, a table which shows the interrelation between the state of the vehicle and the image quality parameter (step S61).

In this example, stored is such table as shown in FIG. 19. In the table of FIG. 19, the state of vehicle includes four states of "light ON", "windshield wiper ON", "left turn" and "right turn". To each of those states, a corresponding image quality parameter (herein, brightness parameter and resolution) is provided.

This table shows, when the vehicle turns ON its light and windshield wiper, every image pickup device 1 becomes high in sensitivity. Note that, the high sensitivity herein means that the sensitivity is relatively high in consideration of the sensitivity when the light 51 and the windshield wiper 52 are both turned OFF. Also, when the vehicle is making a left turn, the image pickup device $1_1$ on the left side of the vehicle becomes high in resolution, but the image pickup device $1_3$ on the right side becomes low in resolution. Conversely, when the vehicle is making a right turn, the image pickup device $1_3$ on the right side of the vehicle becomes high in resolution, and the image pickup device $1_1$ on the left side becomes low in resolution. Note that, the high/low resolution herein means that the resolution is relatively high/low in consideration of the resolution when the vehicle is going straight.

Referring back to the flowchart of FIG. 12. The control device 3 first detects in which state the vehicle is (step S62). In consideration of the result obtained thereby, the control device 3 then accordingly determines the image quality parameter by referring to the stored table (step S63).

Figure 13A:
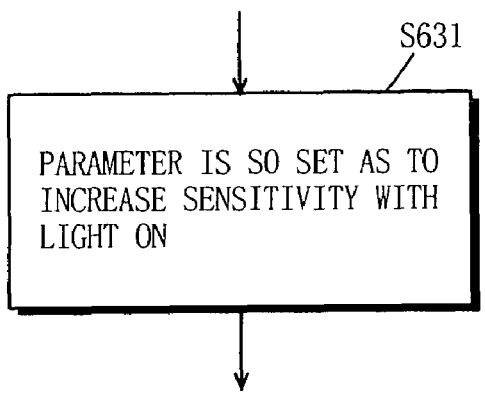
FIGS. 13A to 13C are diagrams showing step S63 of FIG. 12 in a specific manner.
Figure 13B:
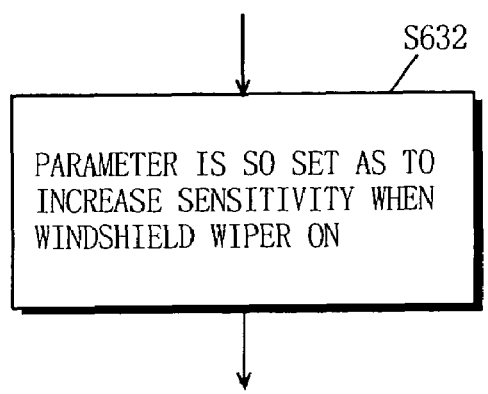
Figure 13C:
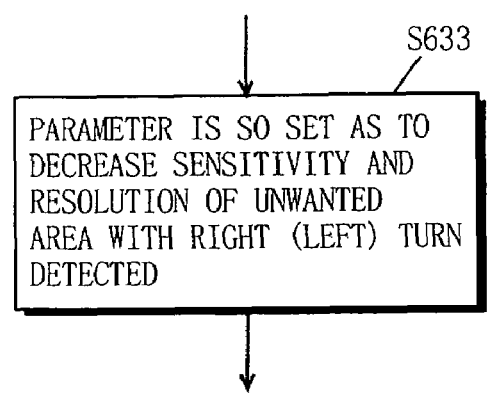

To be specific, as shown in step S631 of FIG. 13A, if detection made in step S62 is "light ON", every image pickup device 1 is made high in sensitivity. Similarly, as shown in step S632 of FIG. 13B, if detection made in step S62 is "windshield wiper ON", every image pickup device 1 is made high in sensitivity. As shown in step S633 of FIG. 13C, if detection made in step S62 is "left turn" or "right turn", image pickup devices 1 are changed in resolution depending on which area the image pickup device 1 is in charge. In detail, with "left turn", resolution becomes high for the left area but low on the right, and with "right turn", resolution becomes high for the right area but low on the left.

The control device 3 then generates control data to make the image quality parameter already set in the image pickup devices 1 agree with the image quality parameter determined in step S63. The control data is then outputted to the image pickup devices 1 (step S64).

The image pickup devices 1 then accordingly each change their image quality parameter. In this manner, the image quality parameter in the image pickup devices 1 can be controlled depending on in which state the vehicle is.

In the foregoing, the control device 3 controls the image pickup devices 1. This is not restrictive, and as shown in FIG. 14, the display device 201 may be provided with a setting function of image quality parameter, and the control device 3 accordingly controls the display device 201.

Figure 14:
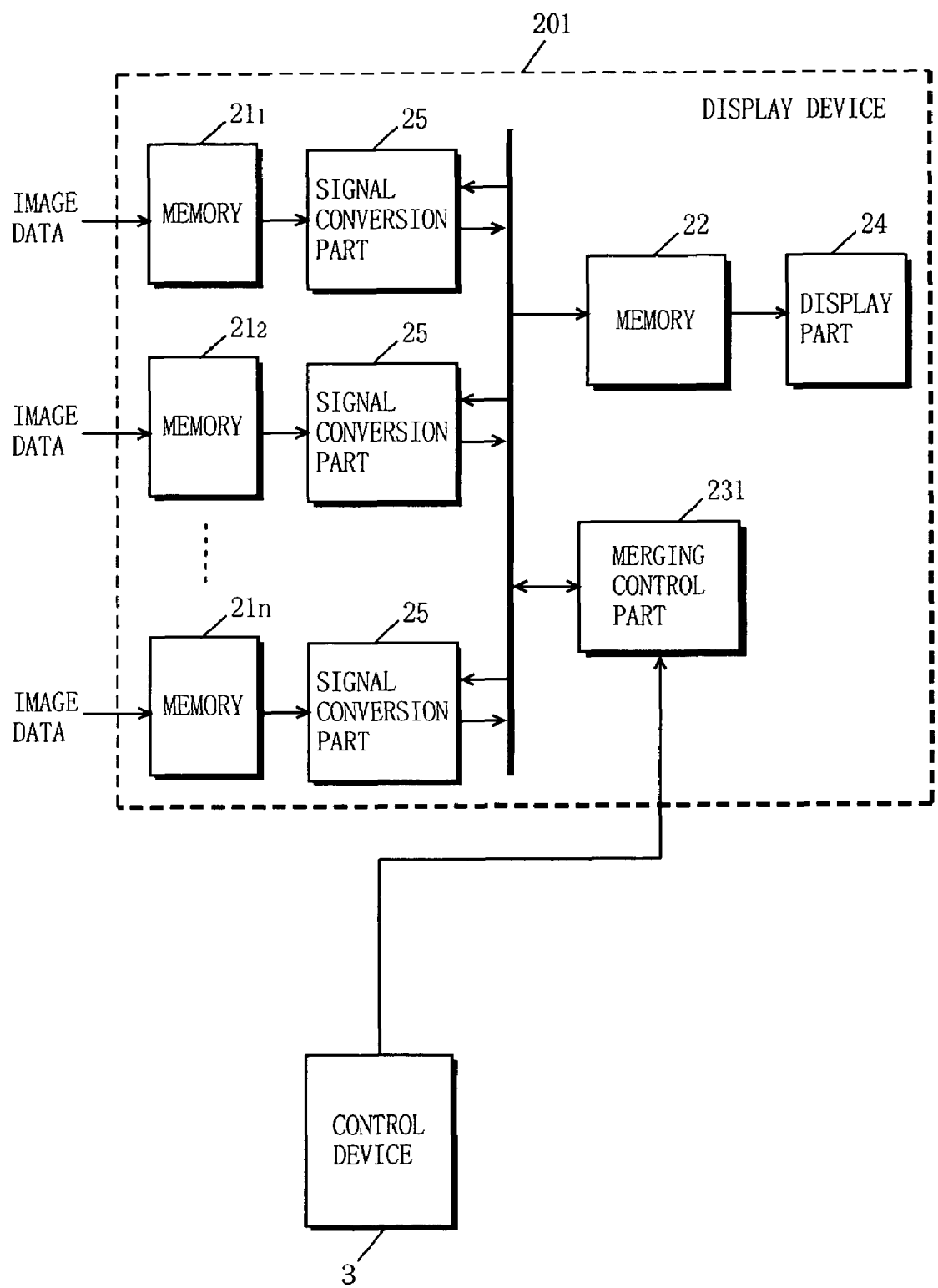
FIG. 14 is a block diagram showing other possible structure of the image pickup system of the present invention (a display device 201 is provided with a setting function of image quality parameter, and the control device 3 controls the image quality parameters set thereby)

In the example of FIG. 14, in the display device 201, each of the signal conversion parts 25 adjusts the image quality of the image data according to thus set image quality parameter. Then, in response to the control data from the control device 3, the already-set image quality parameter is accordingly changed.

Also in the foregoing, the control over image quality parameter and cutout area is performed when the image quality is not consistent or the merging technique has been changed. This is not restrictive, and such control may be performed when the image pickup system is turned ON, or at arbitrary time intervals such as once every several milliseconds, seconds, hours, or days, for example.

(Eighth Embodiment)

FIG. 20 is a block diagram showing the structure of a vehicle-mounted-type sensor system according to an eighth embodiment of the present invention. In FIG. 20, the vehicle-mounted-type sensor system is provided with a plurality of cameras 1001 for image pickup, a plurality of nodes (in this example, five nodes of $1002_1$ to $1002_5$) placed in each predetermined position in a vehicle 1000 for connection with the cameras 1001, a signal processing device 1003 for processing an image pickup signal from each of cameras 1001 and outputting a resultant image signal, a node 1004 for connection with the signal processing device 1003, and a monitor 1005 for displaying the image signal from the signal processing device 1003.

FIG. 20 exemplarily shows such first connection that the sensor system includes three standard-resolution cameras $1002_2$ to $1002_4$, and each of those is connected to nodes $1002_2$ to $1002_4$, respectively.

With two more standard-resolution cameras $1001_1$ and $1001_2$ and two more nodes $1002_1$ and $1002_2$ for connection thereto, the first connection may be changed to a second connection.

With replacement of the standard-resolution camera $1001_3$ connected to the node $1002_3$ with a high-resolution camera 1001', the first connection may be changed to a third connection.

Note that, what does the "connection" mean, and details about the first to third connections are left for later description. Herein, the first to third connections are no more than typical examples for easy understanding of characteristics of the present invention, and some more connections are possible. The differences among the first to third connections are also not restrictive, and some more difference may be considered.

FIG. 21 is a block diagram showing an exemplary structure of the camera 1001 (or 1001') of FIG. 20. In FIG. 21, the camera 1001 includes an image pickup part 1101, an image pickup processing part 1102, and a storage part 1103.

The image pickup part 1101 optically captures an image, and converts the image into an electrical signal for output as an image pickup signal. The image pickup processing part 1102 receives the image pickup signal from the image pickup part 1101, and processes the signal so to output as an image signal. The image signal is sent out onto a bus 1006 through the node 1002.

The storage part 1103 in advance stores a camera attribute 1104. The camera attribute 1104 is information indicating what attribute the camera 1001 has, and may be resolution (image size) and a frame rate, for example.

Once the camera 1001 is connected to the node 1002, the image pickup processing part 1102 reads the camera attribute 1104 from the storage part 1103 for notification to the node 1002.

Referring back to FIG. 20, the nodes 1002 for connection with a camera and the node 1004 for connection with a signal processing device are both connected to the ring-shaped bus 1006 for intercommunications therebetween. The nodes $1002_1$ to $1002_5$ for connection with the camera are each assigned a unique ID such as 1 to 5.

Figure 22:
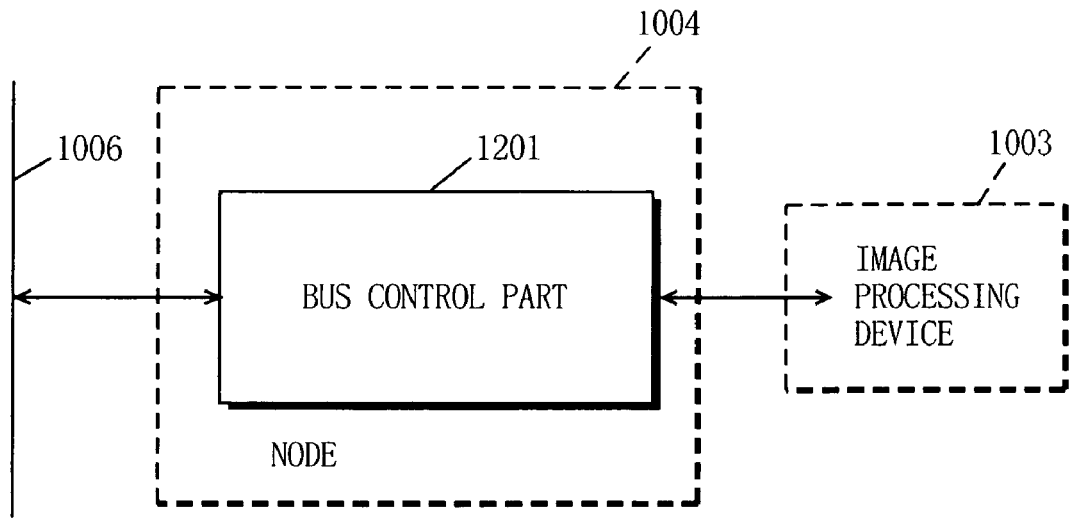
FIG. 22 is a block diagram showing an exemplary structure of a node 1004 of FIG. 20 for connection with a signal processing device.

FIG. 22 is a block diagram showing an exemplary structure of the node 1004 of FIG. 20 for connection with the signal processing device. In FIG. 22, the node 1004 includes a bus control part 1201. The bus control part 1201 controls the signal processing device 1003 connected to the node 1004 and the cameras 1001 connected to the bus 1006 through the node 1002 for communications therebetween. The control is done based on a protocol of the bus 1006. Here, since such protocol-based communications control is a well-known technology, and has no relevance to the characteristics of the present invention, no description is given here.

Figure 23:
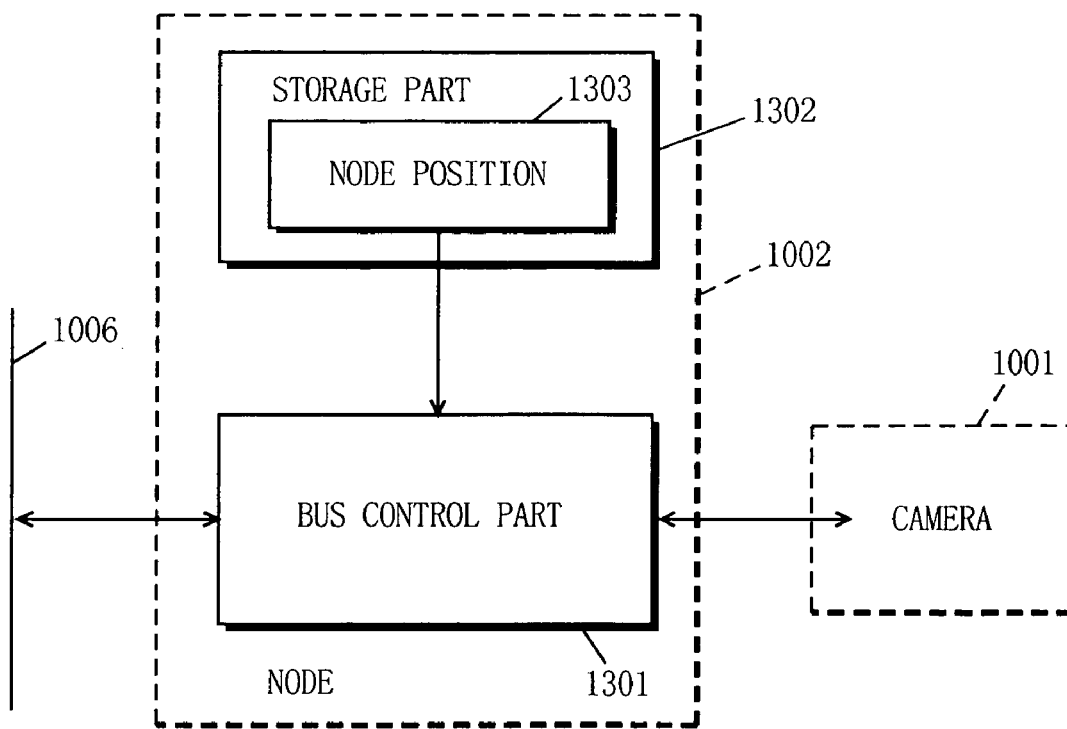
FIG. 23 is block diagram showing an exemplary structure of a node 1002 of FIG. 20 for connection with a camera.

FIG. 23 is a block diagram showing an exemplary structure of the node 1002 for connection with the camera. In FIG. 23, the node 1002 includes a bus control part 1301, and a storage part 1302. The bus control part 1301 controls the camera 1001 connected to the node 1002 and the signal processing device 1003 connected to the bus 1006 through the node 1004 for communications therebetween. The control is also based on the protocol of the bus 1006.

The storage part 1302 in advance stores a node position 1303. The node position 1303 is information indicating a position of the node 1002 on the vehicle 1000, and for example, includes 3D coordinates (x, y, z) having a specific point on the vehicle 1000 as its origin point.

Note herein that, the node 1002 is positionally fixed on the vehicle 1000, and thus stored may be the ID of the node 1002 (will be later described).

Once the camera 1001 is connected to the node 1002, the bus control part 1301 reads its node position 1303 from the storage part 1302. As already described, at this time, the camera 1001 notifies the camera attribute 1104, and the bus control part 1301 accordingly outputs the read node position 1303 together with the notified camera attribute 1104 to the bus 1006 through the node 1002.

Figure 24:
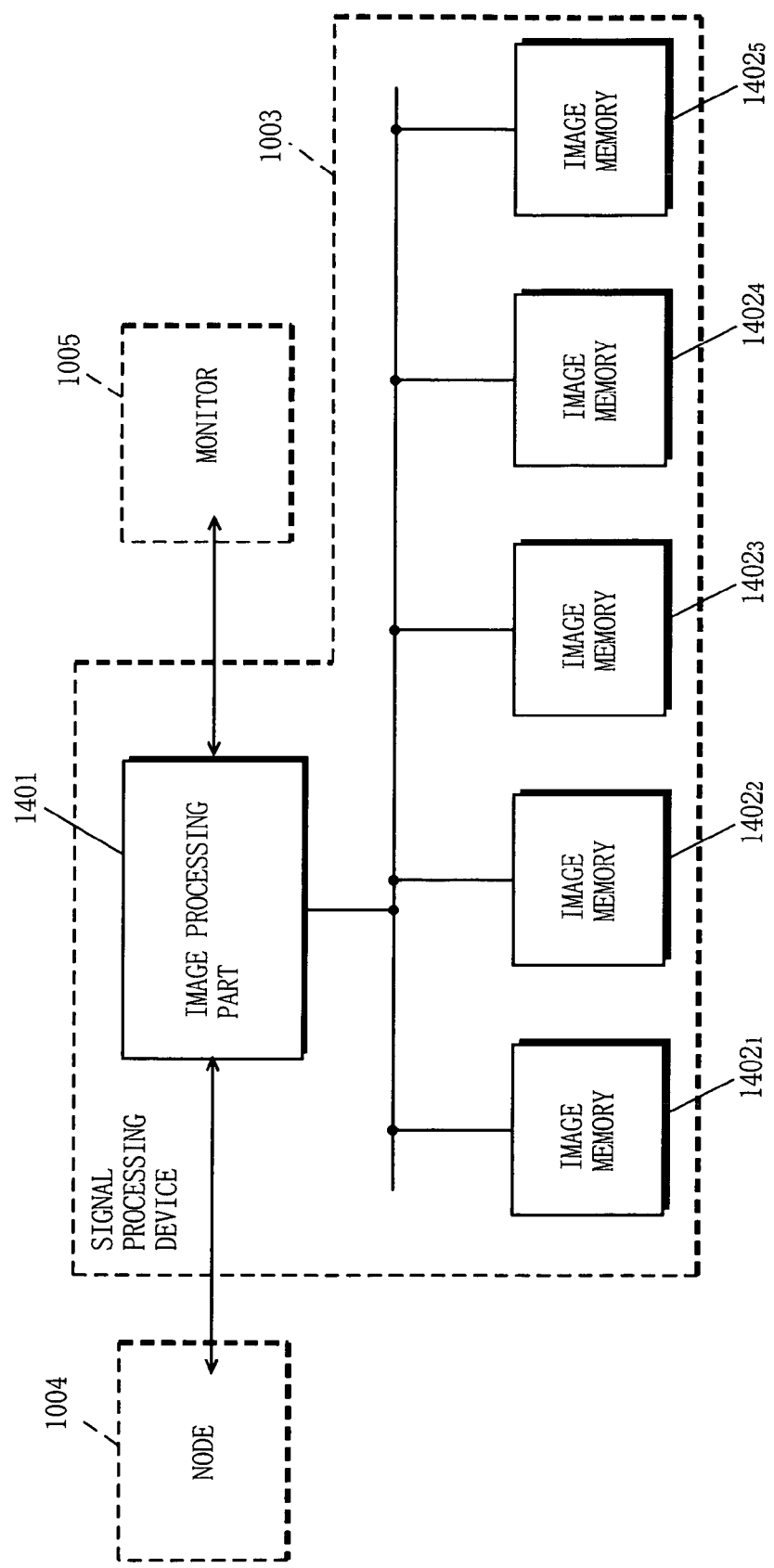
FIG. 24 is a block diagram showing an exemplary structure of a signal processing device 1003 of FIG. 20.

FIG. 24 is a block diagram showing an exemplary structure of the signal processing device 1003 of FIG. 20. In FIG. 5, the signal processing device 1003 includes an image processing part 1401, and five image memories $1402_1$ to $1402_5$.

The image processing part 1401 receives an image pickup signal from each of the cameras 1001 through the node 1004, and writes the signals into each corresponding image memory 1401. The image processing part 1401 also receives the node position 1301 and the camera attribute 1104 transmitted through each of the nodes 1002 via the node 1004. Thereafter, the image processing part 1401 reads the image pickup signal each from the image memories 1401 so as to perform image processing based on the received node positions 1303 and the camera attributes 1104. The resultant image signal is outputted to a monitor 1005.

The image processing is typically a processing for merging several image data into a panoramic image. For panoramic image merging, the image processing part 1401 needs to know in advance by which camera 1001 with what camera attribute the image data to be merged is picked up, and which area around the vehicle 1000 the image data covers.

In the conventional vehicle-mounted-type camera system, equipped in a predetermined position is a camera dedicated for the system, therefore the signal processing device 1003 only needs to store in advance the equipped position and the attribute thereof.

On the other hand, in the present vehicle-mounted-type camera system, the nodes 1002 are provided in the vehicle 1000 so that the cameras 1001 varying in attribute can be connected thereto. Accordingly, once the camera 1001 is connected, the node 1002 notifies its own position and the attribute of the camera 1001 to the signal processing device 1003 (specifically, the image processing part 1401 therein).

In this embodiment, the nodes 1002 are each positionally fixed in the predetermined position on the vehicle 1000. Therefore, by the image processing part 1401 storing a position table 1601 including IDs and positions of the nodes 1002 (see FIG. 26; later described), there only needs for the node 1002 to notify its own ID instead of its position.

Further, with such structure that the positions of the nodes 1002 are managed in the table on the side of signal processing device 1003, positional change of the nodes 1002 can be easily dealt by simply updating the position table 1601.

The image processing part 1401 in advance stores a connection table 1602 (see FIG. 26) including every possible combination of the node position 1303 and the camera attribute 1104. Further, for every combination included in the connection table 1602, a dedicated image processing program 1603 (see FIG. 26) is stored. That means, the number of the image processing programs 1603 stored in the image processing part 1401 is equal to that of the connections in the connection table 1602.

Here, instead of storing each different several image processing programs 1603, stored may be a single image processing program which includes a main routine for only a common processing for every connection, and subroutines for each different processing unique to every connection. In other words, this image processing program is composed of one main routine and several subroutines equal in number to the combinations in the connection table 1602. Such image processing program may reduce the storage capacity of the image processing part 1401 compared with storing each different several image processing programs 1603.

Described next is the operation of such structured vehicle-mounted-type camera system. In this example, the vehicle-mounted-type camera system is assumed to be in a first connection at shipment. In detail, in the camera system, as shown in FIG. 20, three nodes $1002_2$ to $1002_4$ are connected to the standard-image-quality cameras $1001_2$ to $1001_4$, and the nodes $1002_1$ and $1002_5$ are free from connection.

Figure 25:
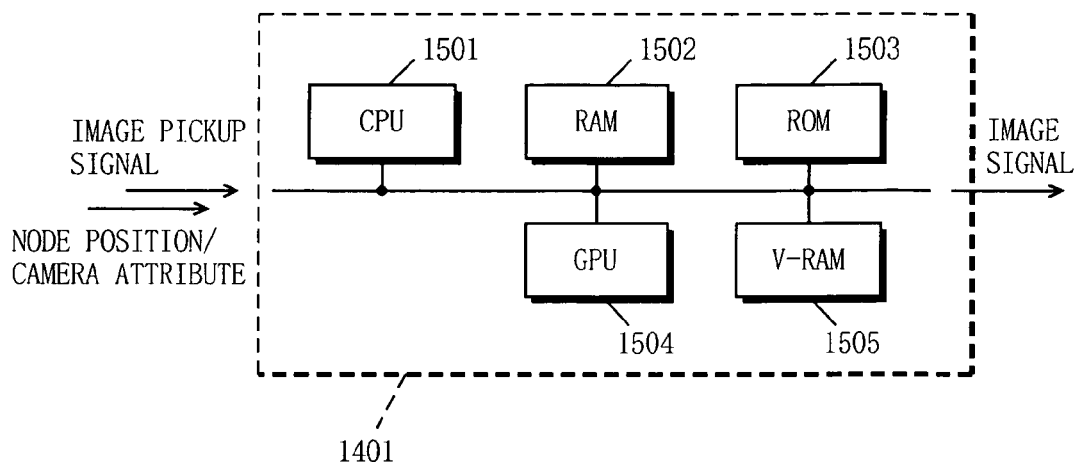
FIG. 25 is a block diagram showing an exemplary structure of an image processing part 1401 of FIG. 24.

FIG. 25 is a block diagram showing an exemplary structure of the image processing part 1401 of FIG. 24. In FIG. 25, the image processing part 1401 includes a CPU 1501, RAM 1502, ROM 1503, GPU 1504, and V-RAM 1505.

Figure 26:
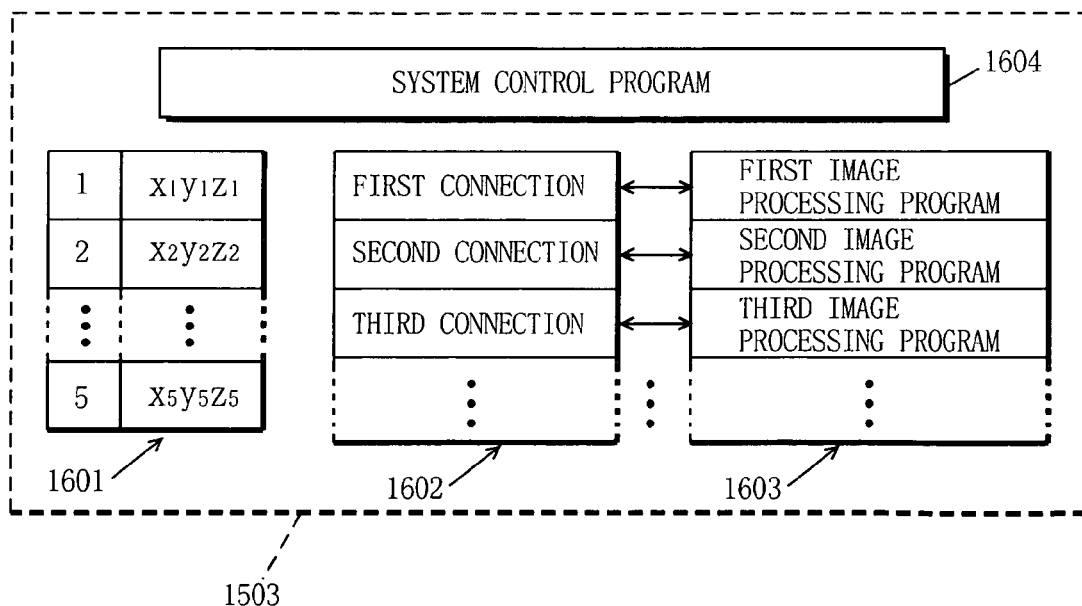
FIG. 26 is a memory map showing the storage contents of ROM 1503 of FIG. 25.

FIG. 26 is a memory map showing the storage contents of the ROM 1503 of FIG. 25. In FIG. 26, the ROM 1503 stores the position table 1601, the connection table 1602, several image processing programs 1603, and a system control program 1604.

The position table 1601 includes IDs {1, 2, . . . , 5} and positions {$(x_1, y_1, z_1)$, $(x_2, y_2, z_2)$, . . . , $(x_5, y_5, z_5)$} of the nodes $1002_1$ to $1002_5$.

The connection table 1602 includes every possible connection {(first connection), (second connection), . . . }. For example, in the first connection at shipment, three nodes $1002_2$ to $1002_4$ are each connected with the standard-resolution cameras $1001_2$ to $1001_4$, and the nodes $1002_1$ and $1002_5$ are free from connection.

A second connection is a state in which five nodes $1002_1$ to $1002_5$ are each connected with the standard-resolution cameras $1001_1$ to $1001_5$. That is, the driver newly purchases two standard-resolution cameras 1001 for connection with the nodes $1002_1$ and $1002_5$, which were free from connection.

A third connection is a state in which two nodes $1002_2$ and $1002_4$ are connected with the standard-resolution cameras $1001_2$ and $1001_4$, and the node $1002_3$ is with the high-resolution camera 1001'. That is, the driver additionally purchases one high-resolution camera 1001', and therewith, replaces the standard-image-quality camera $1001_3$ which was connected to the node $1002_3$.

Figure 27:
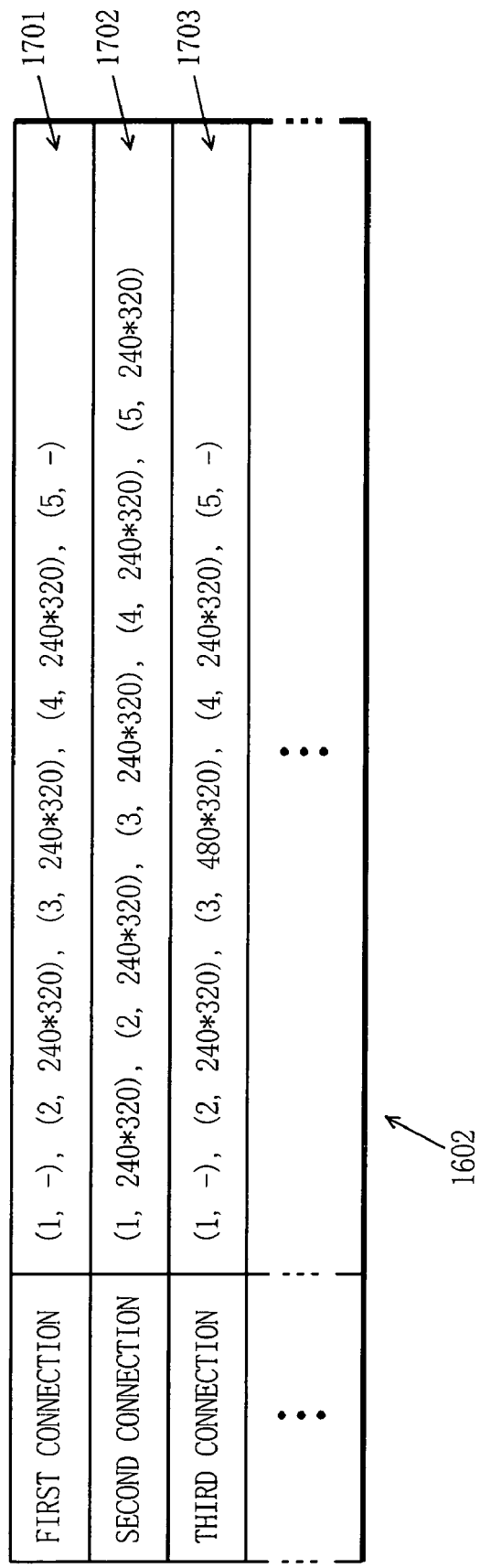
FIG. 27 is a diagram specifically showing the contents (e.g., first to third connections) of a connection table 1602 of FIG. 26.

FIG. 27 exemplarily shows the first to third connections in detail. In FIG. 27, an expression of (1, -) means that nothing is connected to the node $1002_1$ whose ID is "1". An expression of (2, 240*320) means that the node $1002_2$ whose ID is "2" is connected with a camera whose resolution is "240*320" (i.e., the standard-resolution camera 1001). An expression of (3, 480*320) means that the node $1002_3$ whose ID is "3" is connected with a camera whose resolution is 480*320 (i.e., the high-resolution camera 1001').

Figure 28:
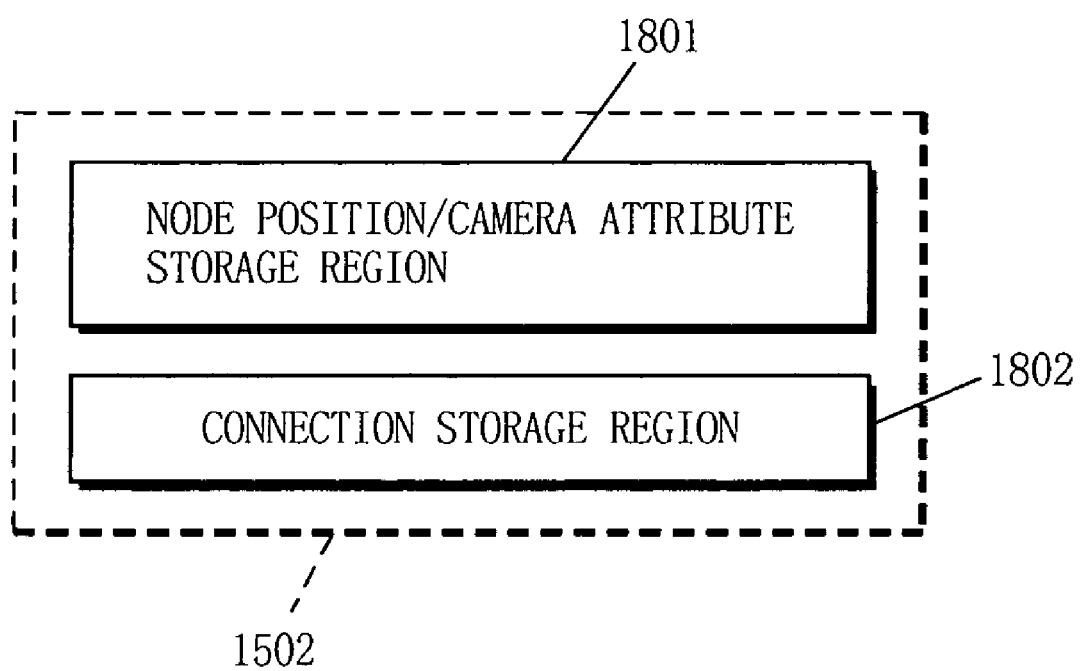
FIG. 28 is a memory map showing the storage contents of RAM 1502 of FIG. 25.

FIG. 28 is a memory map showing the contents of the RAM 1502 of FIG. 25. In FIG. 28, the RAM 1502 includes a node position/camera attribute storage region 1801 for storing the node position 1303 and the camera attribute 1104 forwarded from the image pickup nodes 1002, and a connection storage region 1802 for storing the detected connection.

Figure 29:
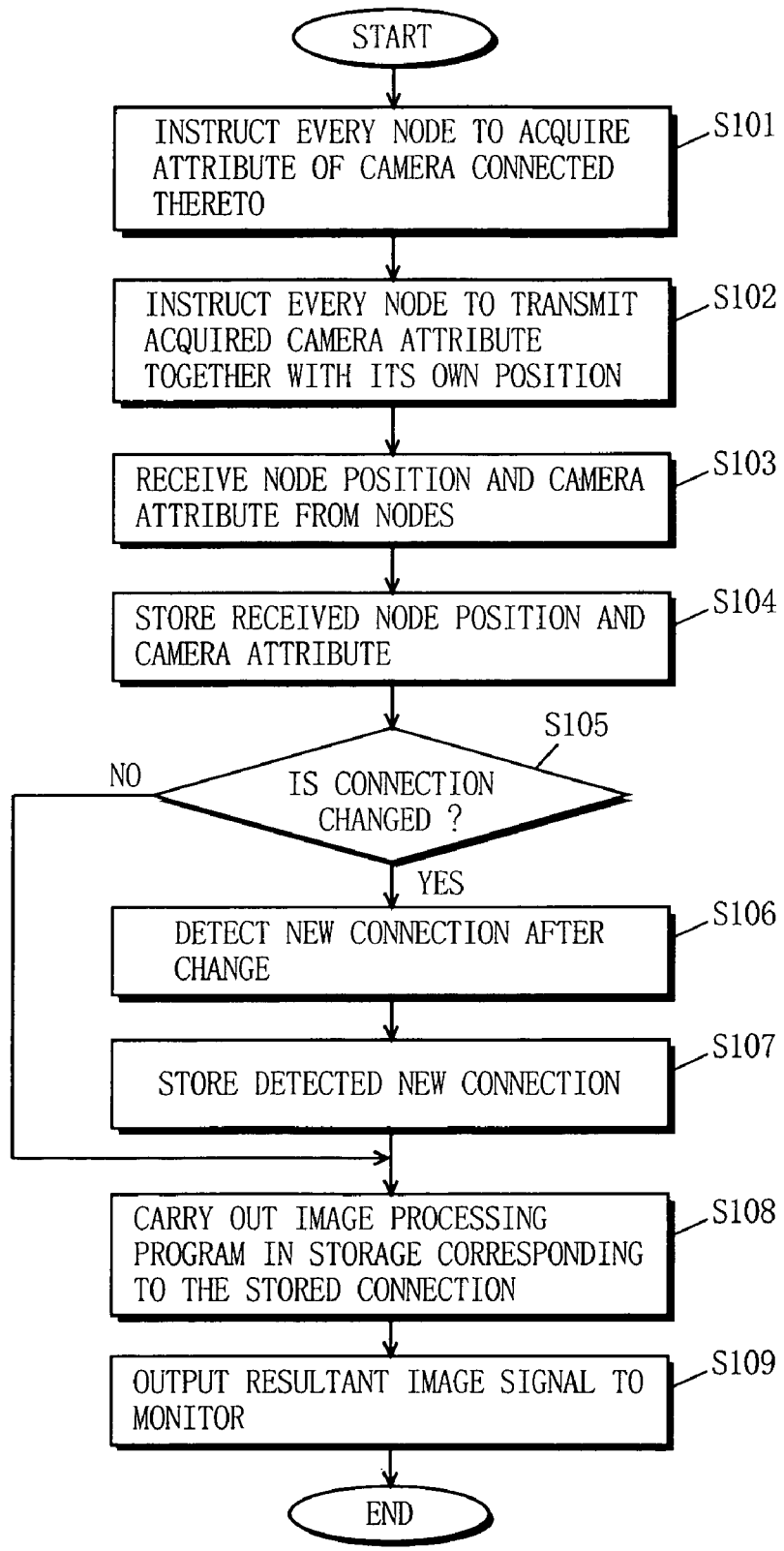
FIG. 29 is a flowchart showing system control/image processing carried out by the image processing part 1401 of FIG. 24.

In FIGS. 25, 26, and 28, the CPU 1501 operates according to the system control program 1604 stored in the ROM 1503 while using the RAM 1502 as a working area, rendering the image processing part 1401 carry out system control/program selection processing as shown in FIG. 29. Further, the CPU 1501 has the GPU 1504 process the image pickup signal read from each of the image memories 1402 according to one image processing program 1603 selected among from those stored in the ROM 1503. Therefore, the image processing part 1401 can perform the predetermined image processing such as processing for merging image pickup signals from several cameras 1001 into a panoramic image.

FIG. 29 is a flowchart showing the system control/image processing carried out by the image processing part 1401 of FIG. 5. In FIG. 29, the image processing part 1401 first instructs, through the node 1004, the nodes 1002 to acquire the attribute of the camera 1001 connected thereto (step S101). Although such instruction is made to every node 1002 all at once, this is not restrictive and may be made sequentially (i.e., polling).

Here, the timing for step S101 is typically when the system is activated. As an alternative manner, in addition to the timing at time of system activation, it may be repeated at predetermined time intervals. For example, the timing may be at time of system activation, and also every one minute thereafter.

In response to the instruction, the nodes 1002 each request the camera 1001 connected thereto to provide notification of its attribute. The cameras 1001 accordingly notify the camera attribute 1104 stored in the storage part 1103.

Next, the image processing part 1401 instructs, through the node 1004, each of the nodes 1002 to transmit its own position and the camera attribute 1104 (step S102).

In response to the instruction, the nodes 1002 each accordingly transmit the node position stored in the storage part 1302 and the acquired camera attribute 1104.

Then, the image processing part 1401 receives the node position 1303 and the camera attribute 1104 from each of the nodes 1002 through the node 1004 (step S103), and stores those in the node position/camera attribute storage region 1801 in the RAM 1502 (step S104).

Then, based on the node positions 1303 and the camera attributes 1104 received in step S103, the image processing part 1401 determines whether the connection has been changed (step S105).

Here, the determination in step S105 is performed as next below. That is, since the node position/camera attribute storage region 1801 carries the node positions 1303 and camera attributes 1104 which are previously stored therein, the image processing part 1401 compares those with the currently received node positions 1303 and the camera attributes 1104 to see if the connection has been changed.

Specifically, assuming that the previous node positions 1303 and the camera attributes 1104 stored in the node position/camera attribute storage region 1801 are the ones denoted by a reference numeral 1701 of FIG. 27, and the current node positions 1303 and the camera attributes 1104 as denoted by a reference numeral 1702, it means that the connection is changed from the first to the second.

Referring back to FIG. 29, if determined Yes in step S105, the image processing part 1401 refers to the connection table 1602 stored in the ROM 1503 so as to detect a new connection after change (step S106), and stored that in a connection storage region 1802 in the RAM 1502 (step S107). Then, the procedure goes to step S108.

If determined No in step S105, the procedure jumps to step S108.

In step S108, out of the image processing programs 1603 stored in the ROM 1503, the image processing part 1401 selects and carries out the one corresponding to the connection stored in the connection storage region 1802 of the RAM 1502. If no change is observed for the connection, carried out is the same image processing program 1603 as before, but if changed, carried out is the image processing program 1603, different from the one before, which corresponds to the new connection after change.

Figure 30A:
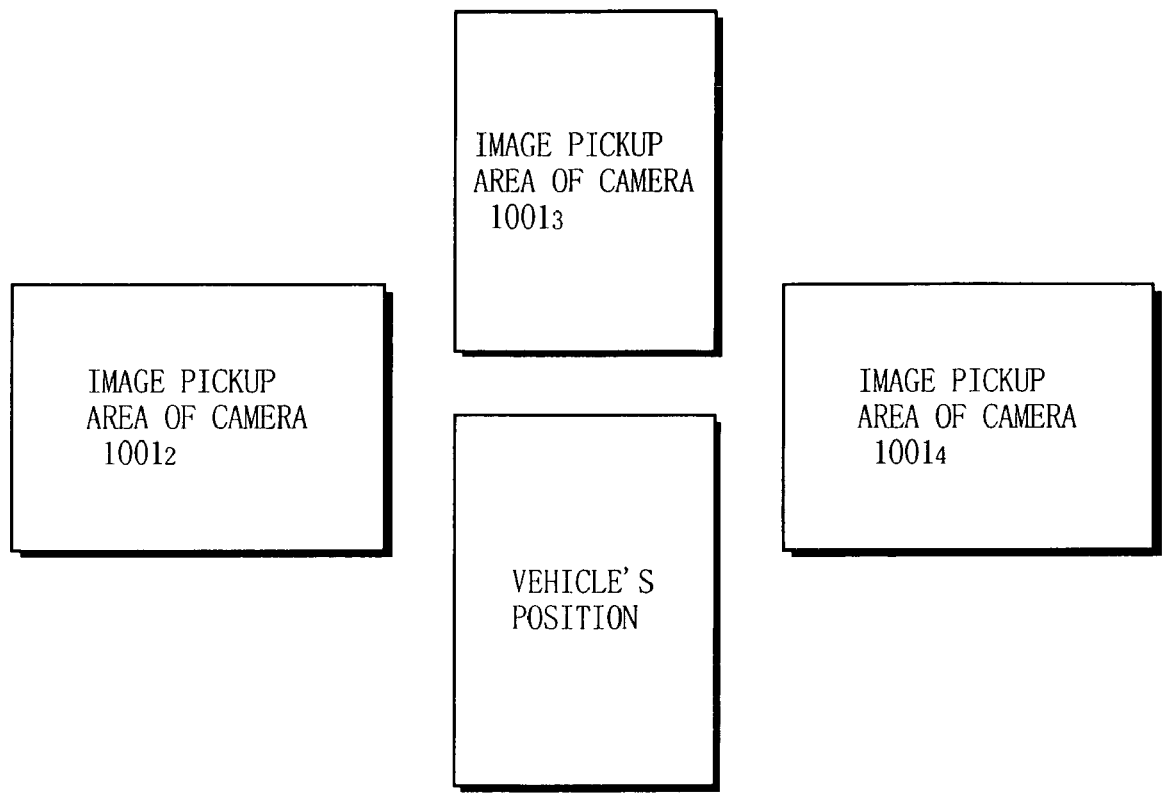
FIGS. 30A and 30B are diagrams showing, respectively, image pickup area when the system of FIG. 20 is in the first connection, and a resultant panoramic image to be displayed.
Figure 30B:
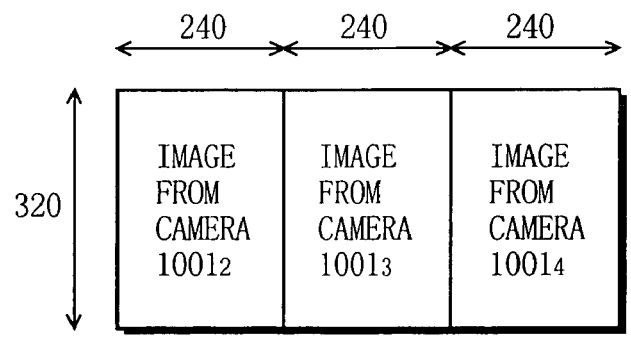

For example, if the system is in the first connection, three nodes of $1002_2$ to $1002_4$ are connected with the standard-resolution cameras $1001_2$ to $1001_4$, respectively, and the nodes $1002_1$ and $1002_5$ are free from connection. In such state, the image pickup area is as shown in FIG. 30A. A first image processing program 1603 is a program for merging such image pickup signals as shown in FIG. 30A into a panoramic image, and with the first image processing program 1603 carried out by the image processing part 1401, a panoramic image signal as shown in FIG. 30B is generated in the V-RAM 1505.

Figure 31A:
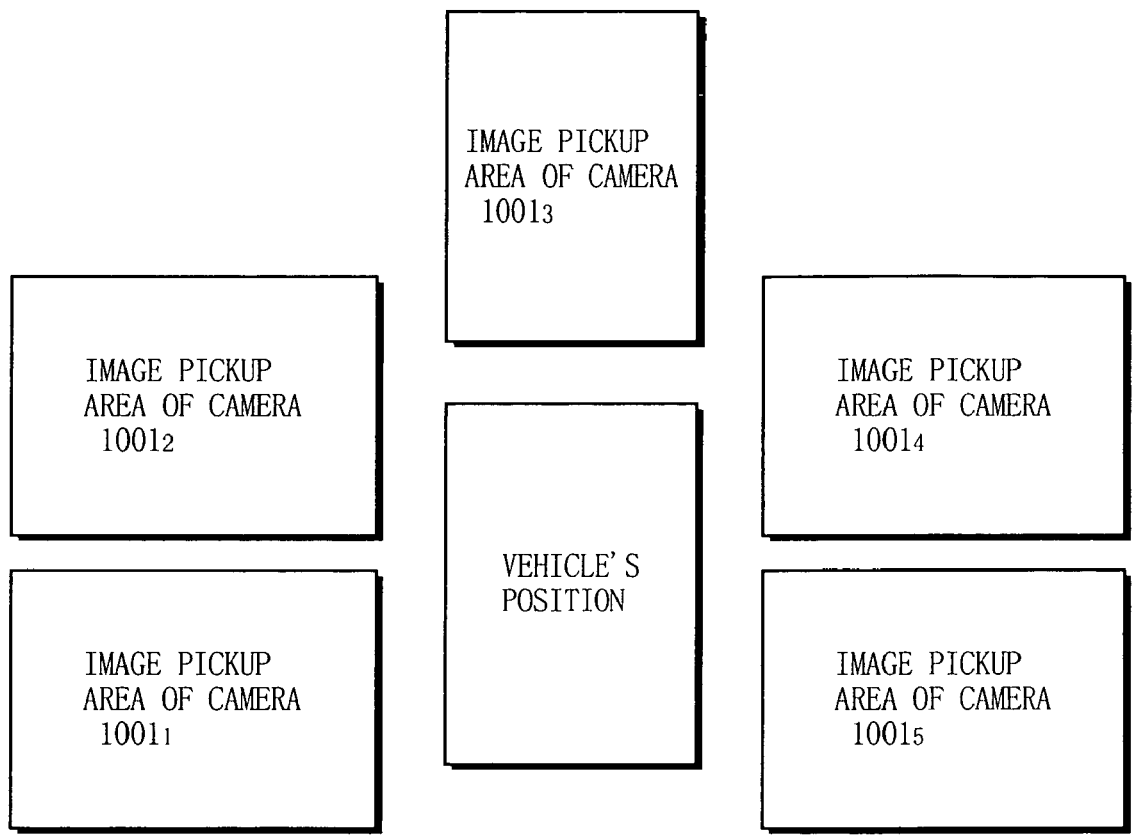
FIGS. 31A and 31B are diagrams showing, respectively, an image pickup area when the system of FIG. 20 is in the second connection, and a resultant panoramic image to be displayed.
Figure 31B:
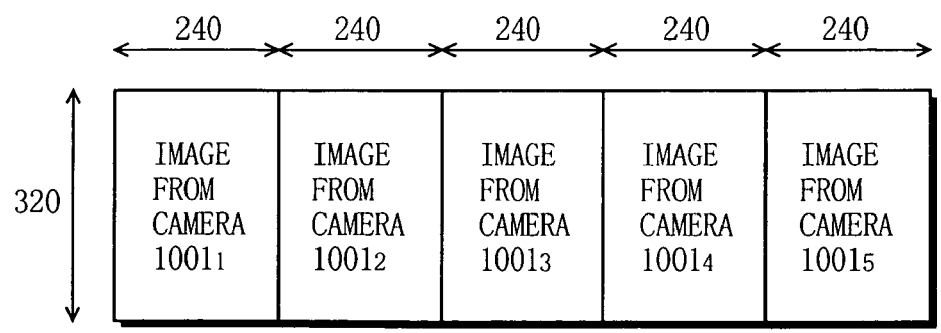

When the system is in the second connection, five nodes of $1002_1$ to $1002_5$ are connected with the standard-resolution cameras $1001_1$ to $1001_5$, respectively, and accordingly the image pickup area is as shown in FIG. 31A. A second image processing program 1603 is a program for merging such image pickup signals as shown in FIG. 31A into a panoramic image. The image processing part 1401 carries out such second image processing program 1603, and thus a panoramic image signal as shown in FIG. 31B is generated in the V-RAM 1505.

Figure 32A:
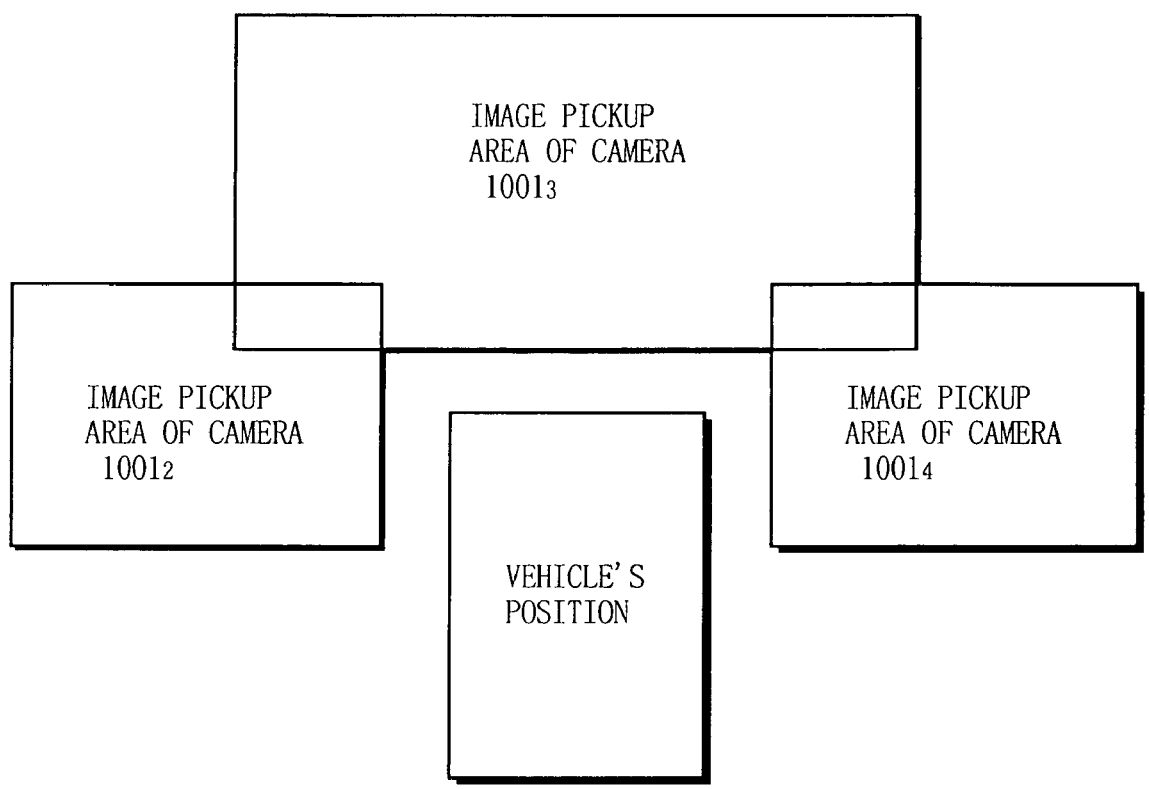
FIGS. 32A and 32B are diagrams showing, respectively, an image pickup area when the system of FIG. 20 is in the third connection, and a resultant panoramic image to be displayed.
Figure 32B:
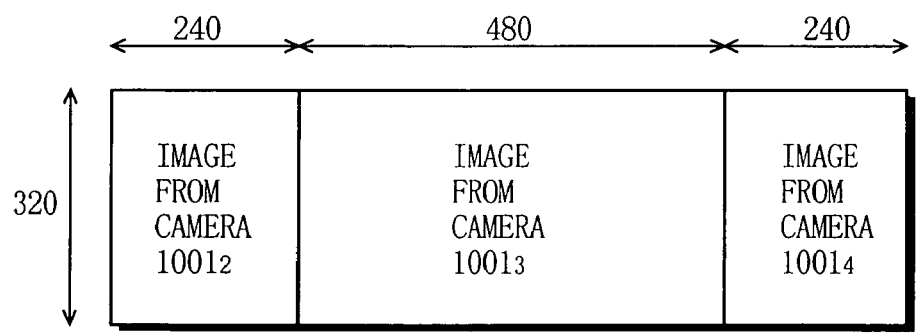

When the system is in the third connection, two nodes of $1002_2$ and $1002_4$ are connected with the standard-resolution cameras $1001_2$ and $1001_4$, respectively, the node $1002_3$ is connected with the high-resolution camera 1001', and the nodes $1002_1$ and $1002_5$ are free from connection. Thus, the image pickup area is as shown in FIG. 32A. A third image processing program 1603 is a program for merging such image pickup signals as shown in FIG. 32A into a panoramic image. The image processing part 1401 carries out such third image processing program 1603, and thus a panoramic image signal as shown in FIG. 32B is generated in the V-RAM 1505.

Referring back to FIG. 29. The image processing part 1401 then outputs the resultant image signal to the monitor 1005 (step S109). As such, the monitor 1005 displays a panoramic image corresponding to the connection, in detail, depending on which camera 1001 with what attribute is connected to the node 1002.

This is the operation of the vehicle-mounted-type camera system of the present invention.

Figure 33:
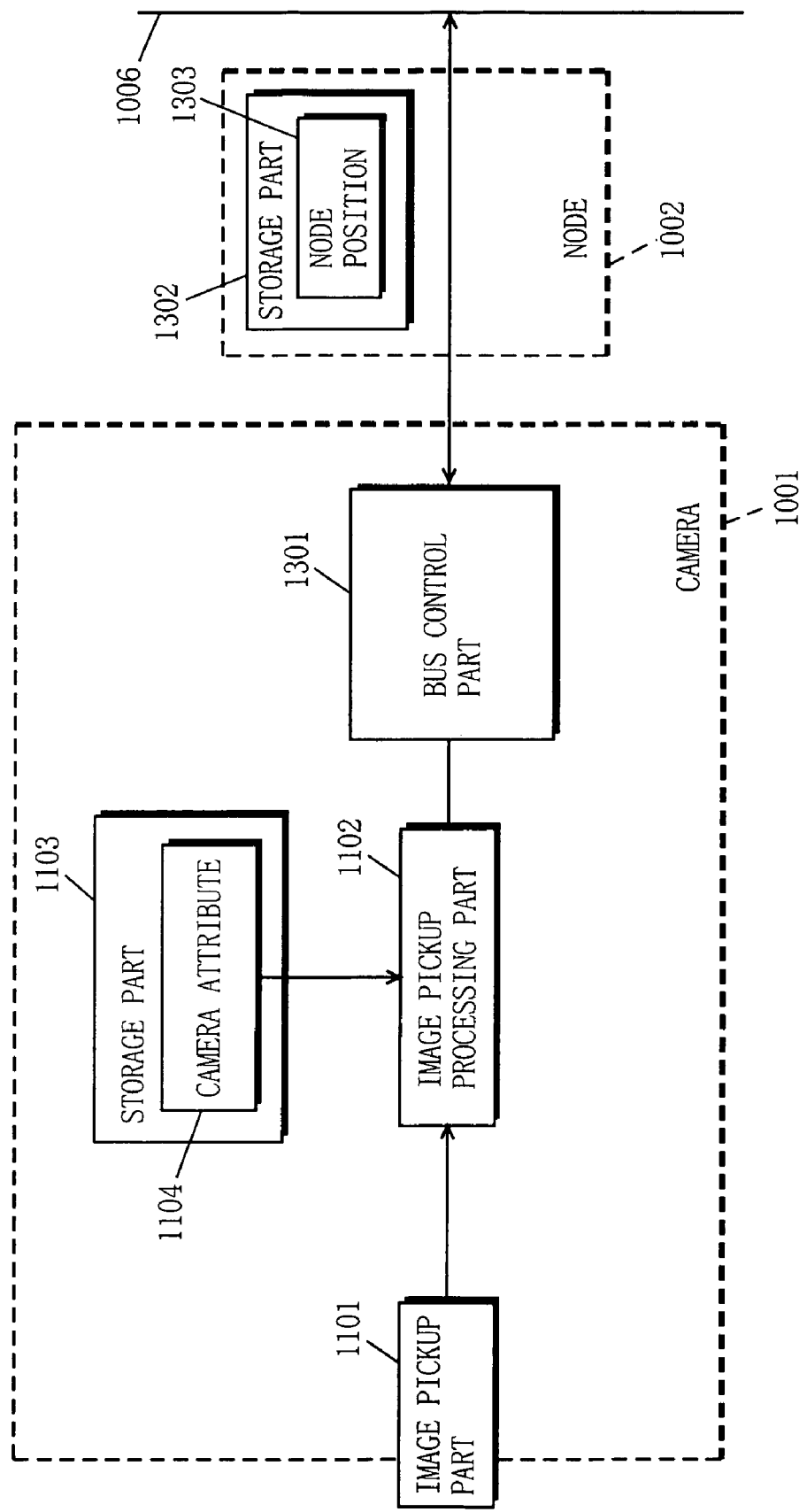
FIG. 33 is a diagram exemplarily showing another structure of the camera 1001 of FIG. 20, specifically, a bus control part 1301 is included not in the node 1002 but in the camera 1001.

Note that, in the present vehicle-mounted-type camera system, as shown in FIGS. 21 and 22, the bus control part 1301 is included not in the cameras 1001 but in the node 1002. This is not restrictive, and the bus control part 1301 may be included in the camera 1001 as shown in FIG. 33. If this is the case, the camera 1001 acquires the node position 1303 from the node 1002, and sends out the node position 1303 together with its own camera attribute 1104 onto the bus 1006.

Figure 34:
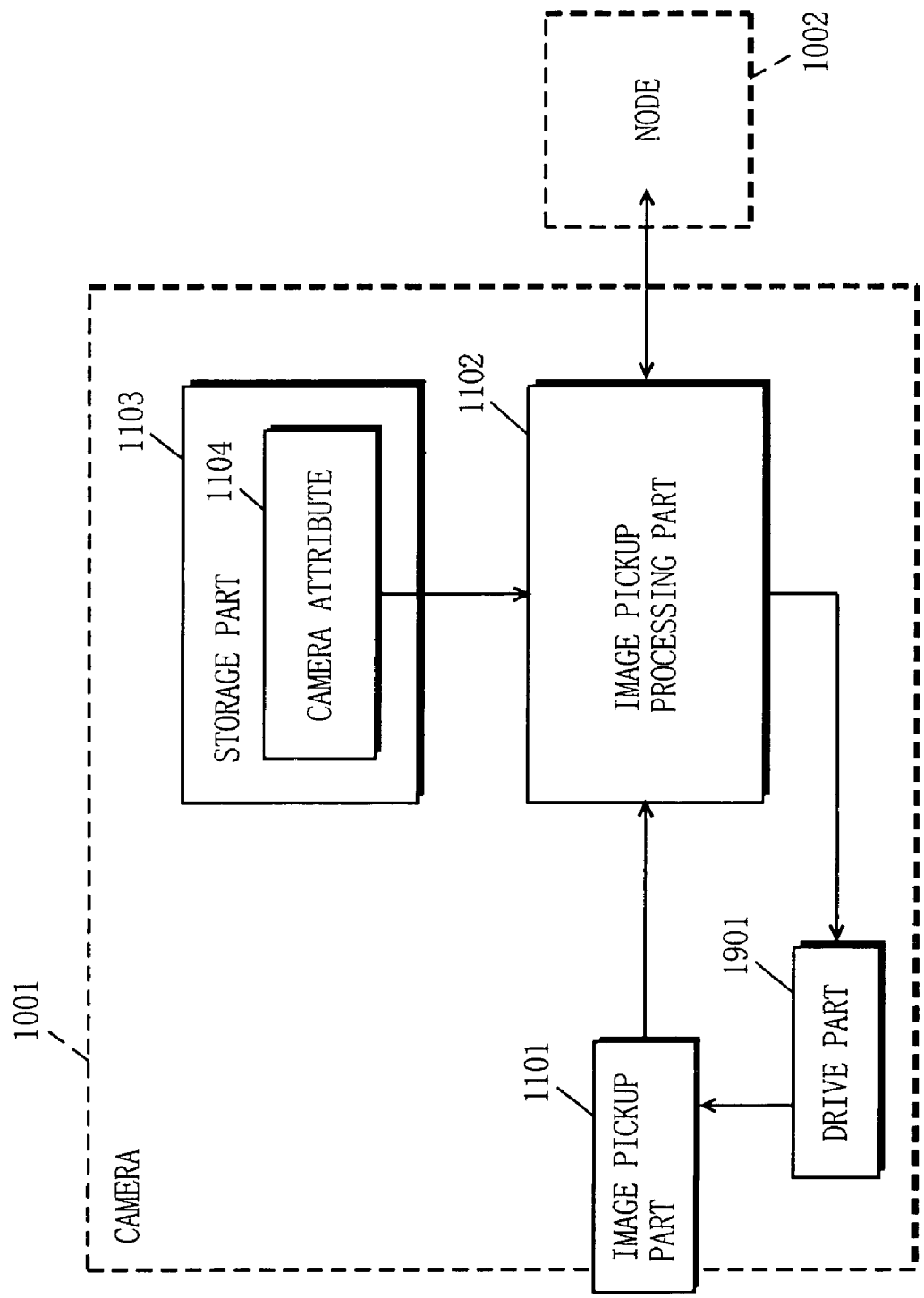
FIG. 34 is a diagram exemplarily showing still another structure of the camera 1001 of FIG. 20, specifically, the camera 1001 of FIG. 21 is additionally provided with a drive part 1901.
Figure 35:
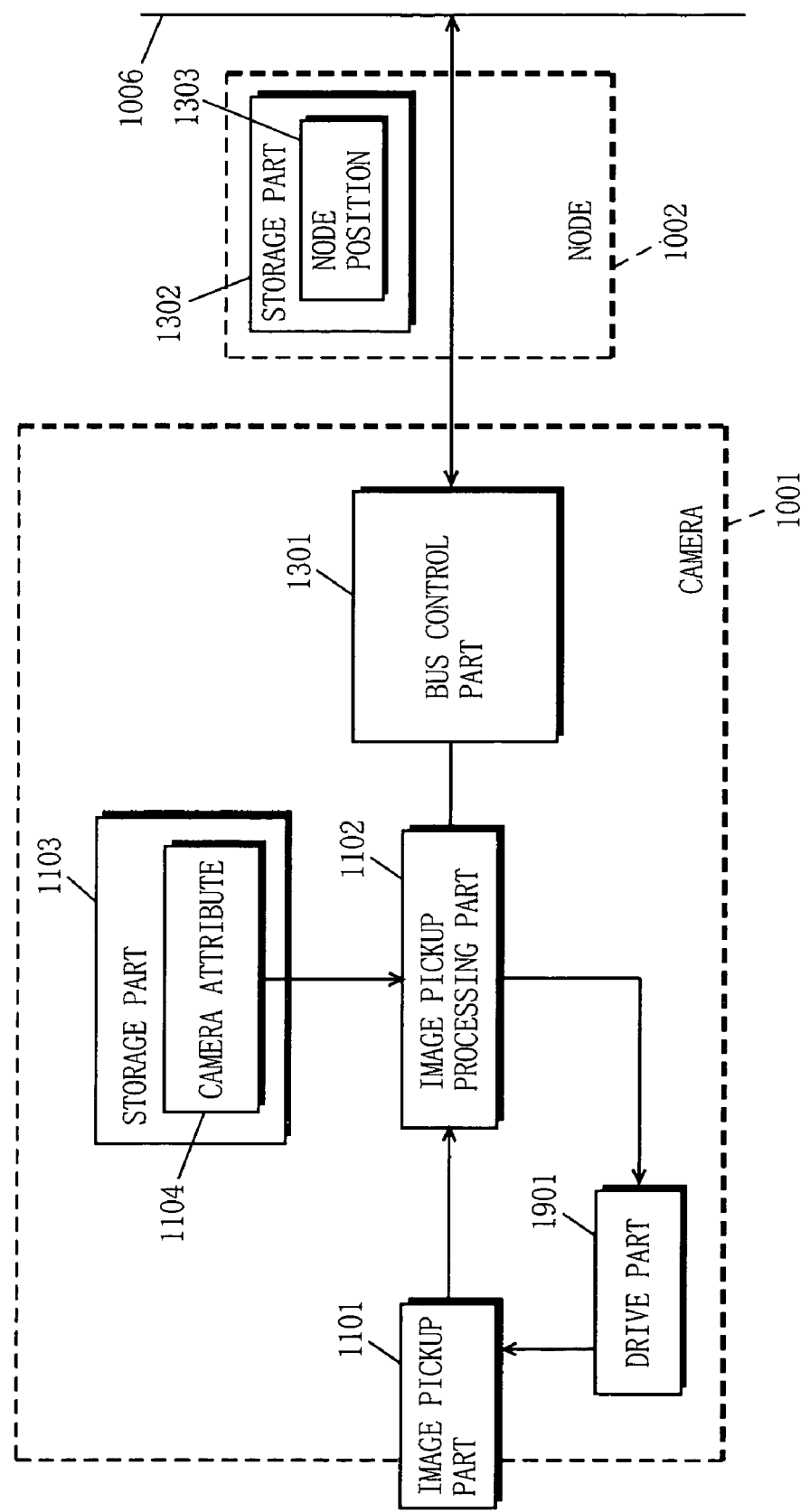
FIG. 35 is a diagram exemplarily showing still another structure of the camera 1001 of FIG. 20, specifically, the camera 1001 of FIG. 33 is additionally provided with the drive part 1901.

Alternatively, the camera 1001 of FIG. 21 may be additionally provided with a drive part 1901 for changing the orientation of the image pickup part 1101 (whereby the image pickup area by the camera 1001 is also changed). FIG. 34 shows another type of camera 1001 having the drive part 1901 additionally provided to the camera 1001 of FIG. 21. FIG. 35 shows still another type of camera 1001 having the drive part 1901 additionally provided to the camera 1001 of FIG. 33.

Figure 36:
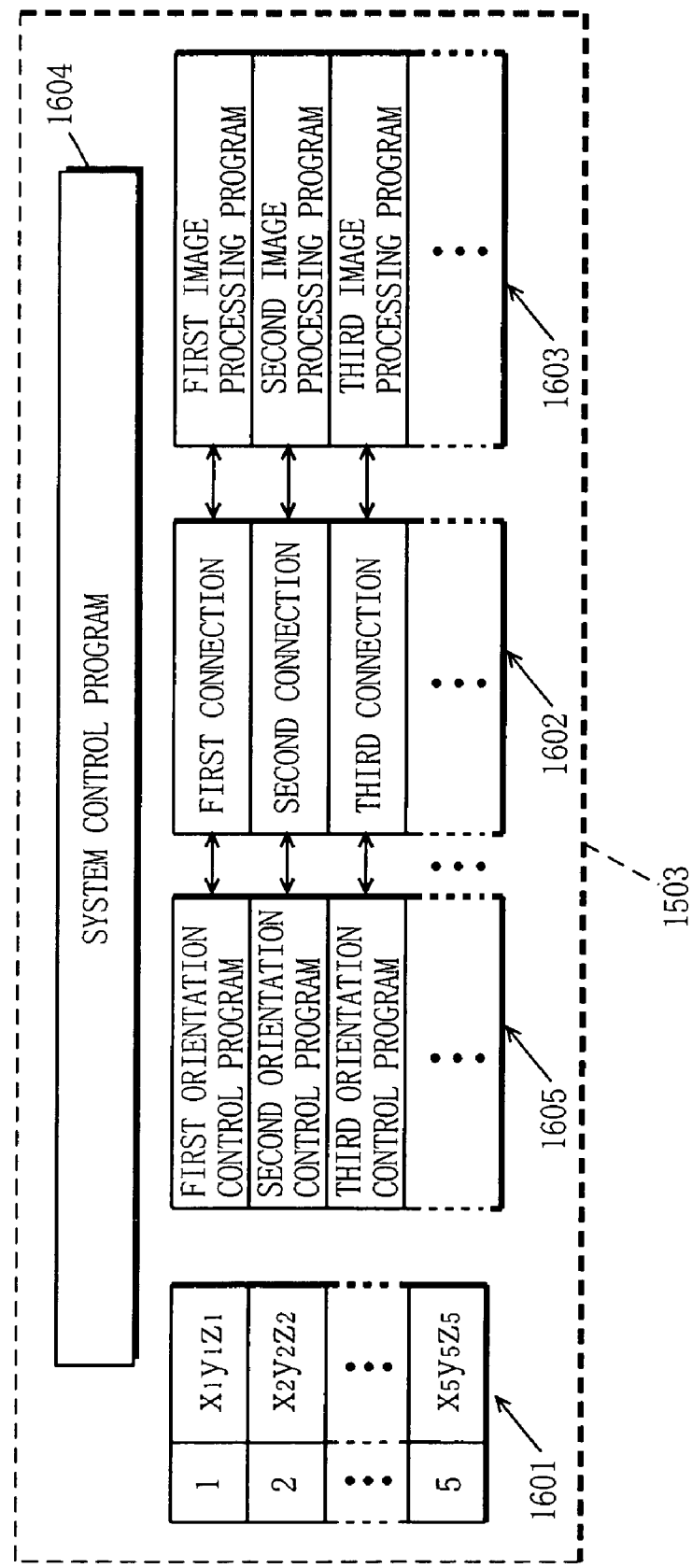
FIG. 36 is a diagram showing the storage content of ROM 1503 in the case that the camera 1001 of FIG. 20 is so structured as FIGS. 33 and 34, specifically, the drive part 1901 is included and an orientation control program 1605 is additionally included in the storage contents.

In FIGS. 34 and 35, response to the instruction made by the image processing part 1401 (see FIG. 24) in the signal processing device 1003 through the image pickup processing part 1102 in the camera 1001, the drive part 1901 changes the orientation of the image pickup part 1101. At this time, as shown in FIG. 36 (comparison with FIG. 26), the ROM 1503 additionally stores several orientation control programs for the image processing part 1401 to control the drive part 1901 to orient the image pickup part 1101 in a manner corresponding to the current connection.

In the foregoing, the typical camera attribute 1104 is presumed to be resolution, but may also be frame rate, sensitivity, compression mode, and the combination thereof. With those, the procedure shows no change, that is, first the connection is detected based on the node positions 1303 and the camera attributes 1104 from the nodes 1002, and then the image processing program 1603 corresponding to the connection is carried out. Note that, if several attributes are combined together, the number of the image processing programs 1603 to be prepared in advance is increased.

Also in the foregoing, described is the vehicle-mounted-type camera system which captures images of any obstacle observed in a predetermined range. Therein, instead of the cameras 1001, a detector (for example, infrared ray detector, ultrasonic detector) may be provided for detection of such obstacle. Alternatively, a temperature sensor, a luminance sensor, a gradient sensor (e.g., gyro) for sensing the temperature, luminance, gradient (e.g., a degree of inclination of a slope), and the like, in a predetermined range may be used.

Further, in the case that any device, such as the cameras 1001, detector, and sensor provided for sensing an environmental state in a predetermined region around the vehicle (i.e., picking up images, or simply detecting any obstacle. temperature, and the like) are collectively referred to as "sensor", realized is a vehicle-mounted-type sensor system for sensing in what environmental state a predetermined area around the vehicle 1000 is in by replacing the camera 1001 with a more-general-type sensor.

In such case, in the system of FIG. 20, the camera 1001 is replaced with a sensor (1001), and also the image processing part 1401 in the signal processing device 1003 is replaced with a sensor processing part (1401) for processing a result sensed by the sensor.

The sensor stores a sensor attribute (1104) for notification to the corresponding node 1002. Then, the node 1002 transmits its node position 1303 and the sensor attribute.

The sensor processing device in advance stores a plurality of sensor processing programs (1603) each corresponding to the connection, that is, which node 1002 is connected with what sensor with what attribute. The sensor processing device receives the node positions 1303 and the sensor attributes from each of the nodes 1002, detects the connection, and then carries out the sensor processing program corresponding to the detected result. Accordingly, displayed on the monitor 1005 is the result obtained by the processing by the sensor processing device, for example, a warning screen which warns the driver his/her approaching an obstacle.

Figure 37:
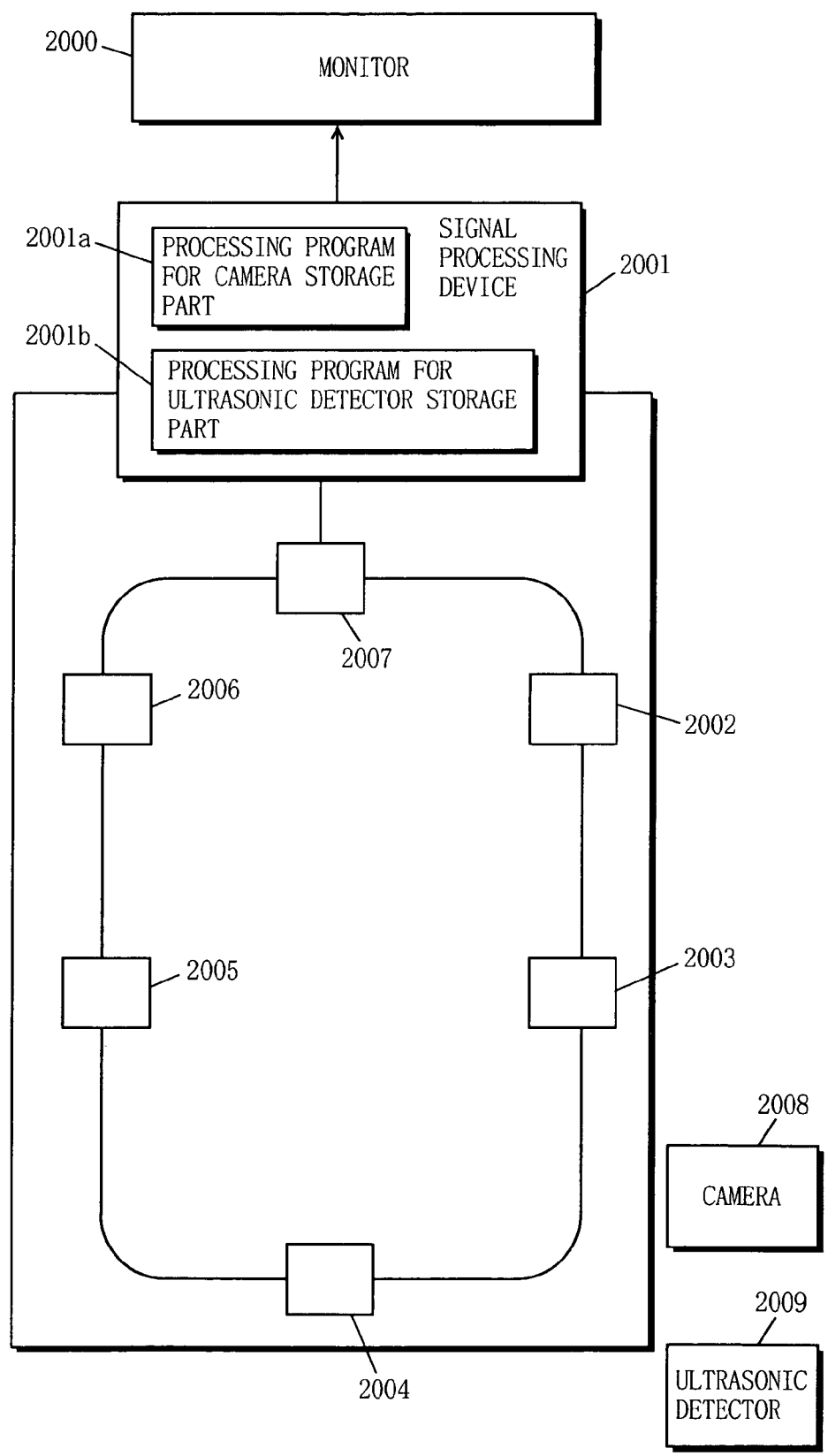
FIG. 37 is a diagram showing an exemplary vehicle-mounted-type sensor system including both the camera 1001 and an ultrasonic detector 2009 (here, the camera and the ultrasonic detector are collectively referred to as sensor)

In the above vehicle-mounted-type sensor system, the sensor may be either the camera 1001 or the detector as long as information indicating the type of the sensor is provided in advance. That is, the driver can select between the camera 1001 and the detector for use as the sensor at purchase. FIG. 37 shows an exemplary vehicle-mounted-type sensor system including both the camera 1001 and the detector.

In FIG. 37, the signal processing device 2001 includes a processing program storage part 2001a for a camera and a processing program storage part 2001b for an ultrasonic detector. The processing program storage part 2001a stores a plurality of processing programs for usage when the sensor is a camera 2008, while the processing program storage part 2001b stores a plurality of processing programs for usage when the sensor is an ultrasonic detector 2009.

The signal processing device 2001 first detects the connection based on the node positions 1303 and the sensor attributes from the nodes 2002 to 2006, then for every node, detects whether the camera 2008 or the ultrasonic detector 2009 is connected. If connected is the camera 2008, the signal processing device 2001 determines which processing program for the camera is to be carried out, and if connected is the ultrasonic detector, determined is the one selected from among those processing programs for the ultrasonic detector.

Still further, as such system shown in FIG. 37, both of the camera 2008 and the ultrasonic detector 2009 may be used. If this is the case, unlike the one in FIG. 35, the processing programs carried out by the signal processing device 2001 are provided for shared use between the camera and the ultrasonic detector. For example, the sensor processing part is provided with, in addition to the processing programs for a case where the camera 2008 is connected to the nodes 2002 to 2006, and the processing programs for a case where the ultrasonic detector 2009 is connected to the nodes 2002 to 2006, a processing program for a case where the camera 2008 is connected to the nodes 2003 to 2005 and the ultrasonic detector 2009 to the nodes 2002 and 2006, for example.

As described in the foregoing, in the present embodiment, every detectable connection and a plurality of processing programs each corresponding to the connection are previously in storage, and then based on node positions and sensor attributes of nodes, the current connection is detected so as to determine which processing program is corresponding thereto. In this manner, the driver becomes free from setting change even if his/her sensor is exchanged, and accordingly sensor exchange to another having a different attribute becomes easier.

Still further, a plurality of orientation control programs each corresponding to the connection may be previously stored. If so, for detection of the current connection, carried out are both the processing program and the orientation control program. Accordingly, the driver becomes also free from sensor orientation adjustment, rendering sensor exchange easier to a greater degree.

While the invention has been described in detail, the foregoing description is in all aspects illustrative and not restrictive. It is understood that numerous other modifications and variations can be devised without departing from the scope of the invention.

What is claimed is:

1. An image pickup system for concurrently picking up a plurality of images and merging the images into an image for display, said image pickup system comprising:
a plurality of image pickup devices each for performing image pickup according to an image quality parameter set therein to define image quality of a merged image;
a display device for receiving image data from each of said image pickup devices, and merging the image data for display; and
a control device for controlling each of said image pickup devices, wherein
said control device comprises:
determination means for determining whether the image quality of the merged image is consistent on said display device; and
image quality control means for controlling, when said determination means determines the image quality is not consistent, the image quality parameter set in each of said image pickup devices so that the image quality of the merged image becomes consistent on said display device, wherein
said image display quality control means selects the image quality parameter as at least one of sensibility and a number of pixels for said image pickup devices, and image cutout size, compression ratio, amplification ratio and color tint for merging in said display device.

2. The image pickup system according to claim 1, wherein said image quality control means previously stores a predetermined common image quality parameter, and changes the image quality parameter set in each of said image pickup devices to agree with the common image quality parameter.

3. The image pickup system according to claim 1, wherein said control device determines a common image quality parameter based on the image quality parameter set in each of said image pickup devices, and changes the image quality parameter to agree with the common image quality parameter.

4. The image pickup system according to claim 3, wherein said image quality control means calculates an average value of the image quality parameter set in each of said image pickup devices, and determines the average value or an approximate value thereof as the common image quality parameter.

5. The image pickup system according to claim 1, wherein
each of said image pickup devices is capable of performing image pickup according to the image quality parameter set therein for every pixel or block comprising several pixels,
said display device merges image data from each of said image pickup devices to generate a panoramic image, and
said image quality control means receives the panoramic image from said display device, and controls the image quality parameter set in each of said image pickup devices on a pixel or a block basis in such manner as to make image quality of a boundary in the panoramic image consistent.

6. The image pickup system according to claim 5, wherein said image quality control means
compares image quality of a pair of pixels or blocks having a boundary in between, and based on a result obtained thereby, determines an image quality parameter for the pixels or blocks, and
along a straight line or a gradual curve which passes through the determined image quality parameter for the boundary and an image quality parameter similarly determined for a next boundary, determines image quality parameters for pixels and blocks located between the boundary and the next boundary.

7. The image pickup system according to claim 1, further comprising a sensor for sensing around said image pickup devices, wherein
said image quality control means performs image quality parameter control based on a result sensed by said sensor.

8. The image pickup system according to claim 7, wherein
said sensor senses around said image pickup devices for brightness,
the image quality parameter includes a brightness parameter for defining brightness of an image, and
said image quality control means increases, when said sensor senses the brightness as not being high enough, the brightness parameter of each of said image pickup devices.

9. The image pickup system according to claim 1, wherein
each of said image pickup devices is mounted in a vehicle, and
said image quality control means detects a state of the vehicle, and based on the state, performs image quality parameter control.

10. The image pickup system according to claim 9, wherein
the vehicle is provided with a light,
the image quality parameter includes a brightness parameter for defining brightness of an image, and
said image quality control means increases, when the light is sensed as being ON, the brightness parameter of each of said image pickup devices.

11. The image pickup system according to claim 9, wherein
the vehicle is provided with a windshield wiper,
the image quality parameter includes a brightness parameter for defining brightness of an image, and
said image quality control means increases, when the windshield wiper is sensed as being ON, the brightness parameter of each of said image pickup devices.

12. The image pickup system according to claim 9, wherein
said image pickup devices are mounted on a front, a rear, a right side, and a left side of the vehicle,
the image quality parameter includes resolution, and
said image quality control means lowers, when the vehicle is sensed as making a left turn, a resolution of said image pickup device mounted on the right side of the vehicle.

13. The image pickup system according to claim 9, wherein
said image pickup devices are mounted on a front, a rear, a right side, and a left side of the vehicle,
the image quality parameter includes resolution, and
said image quality control means lowers, when the vehicle is sensed as making a right turn, a resolution of said image pickup device mounted on the left side of the vehicle.

14. An image pickup system for concurrently picking up a plurality of images and merging the images into an image for display, said image pickup system comprising:
a plurality of image pickup devices each for performing image pickup according to an image quality parameter set therein to define image quality of a merged image;
a display device for receiving image data from each of said image pickup devices, and merging the image data for display; and
a control device for controlling each of said image pickup devices, wherein
said control device comprises:
determination means for determining whether the image quality of the merged image is consistent on said display device; and
image quality control means for controlling, when said determination means determines the image quality is not consistent, the image quality parameter set in each of said image pickup devices so that the image quality of the merged image becomes consistent on said display device, wherein
each of said image pickup devices is capable of performing image pickup according to the image quality parameter set therein for every block comprising a plurality of pixels, and
said image quality control means controls the image quality parameter set in each of said image pickup devices on a block basis.

15. A control device for controlling a plurality of image pickup devices provided in an image pickup system in which a plurality of images are concurrently picked up and a display device merges the images into an image for display, wherein
each of the image pickup devices is provided with a function of performing image pickup according to an image quality parameter set therein to define image quality of an image,
said control device comprising:
determination means for determining whether image quality of a merged image is consistent on the display device; and
image quality control means for controlling, when said determination means determines the image quality is not consistent, the image quality parameter set in each of the image pickup devices so that the image quality of the merged image becomes consistent on the display device, wherein
said image quality control means selects the image quality parameter as at least one of sensibility and a number of pixels for the image pickup devices, and image cutout size, compression ratio, amplification ratio and color tint for merging in the display device.

16. A control method for controlling a plurality of image pickup devices provided in an image pickup system in which a plurality of images are concurrently picked up and a display device merges the images into an image for display, wherein
each of the image pickup devices is provided with a function of performing image pickup according to an image quality parameter set therein to define image quality of an image,
said control method comprising:
determining whether image quality of a merged image is consistent on the display device; and
controlling, when said determining determines the image quality is not consistent, the image quality parameter set in each of the image pickup devices so that the image quality of the merged image becomes consistent the said display device, wherein
said controlling comprises selecting the image quality parameter as at least one of sensibility and a number of pixels from the image pickup devices, and image cutout size, compression ratio, amplification ratio and color tint for merging in the display device.

17. A signal operable to instruct a computer included in a control device to perform a method for controlling a plurality of image pickup devices in an image pickup system in which a plurality of images are concurrently picked up and a display device merges the images into an image for display, wherein
each of the image pickup devices is provided with a function of performing image pickup according to an image quality parameter set therein to define image quality of an image,
said method comprising:
a determination operation of determining whether image quality of a merged image is consistent on the display device; and
an image quality control operation of controlling, when said determination operation determines the image quality is not consistent, the image quality parameter set in each of the image pickup devices so that the image quality of the merged image becomes consistent on the display device, wherein
said image quality control operation selects the image quality parameter as at least one of sensibility and a number of pixels for the image pickup devices, and cutout size, compression ratio, amplification ratio and color tint for merging in the display device.

18. A control device for controlling a plurality of image pickup devices provided in an image pickup system in which a plurality of images are concurrently picked up and a display device merges the images into an image for display, wherein
each of the image pickup devices is provided with a function of performing image pickup according to an image quality parameter set therein to define image quality of an image,
said control device comprising:
determination means for determining whether image quality of a merged image is consistent on the display device; and
image quality control means for controlling, when said determination means determines the image quality is not consistent, the image quality parameter set in each of the image pickup devices so that the image quality of the merged image becomes consistent on the display device, wherein
each of the image pickup devices is capable of performing image pickup according to the image quality parameter set therein for every block comprising a plurality of pixels, and
said image quality control means controls the image quality parameter set in each of the image pickup devices on a block basis.

19. A control method for controlling a plurality of image pickup devices provided in an image pick up system in which a plurality of image are concurrently picked up and a display device merges the images into an image for display, wherein
each of the image pickup devices is provided with a function of performing image pickup according to an image quality parameter set therein to define image quality of an image,
said control method comprising:
determining whether image quality of a merged image is consistent on the display device; and
controlling, when said determining determines the image quality is not consistent, the image quality parameter set in each of the image pickup devices so that the image quality of the merged image becomes consistent on the display device, wherein
each of the image pickup devices is capable of performing image pickup according to the image quality parameter set therein for every block comprising a plurality of pixels, and
said controlling comprises controlling the image quality parameter set in each of the image pickup devices on a block basis.

20. A signal operable to instruct a computer included in a control device to perform a method for controlling a plurality of image pickup devices in an image pickup system in which a plurality of images are concurrently picked up and a display device merges the images into an image for display, wherein
each of the image pickup devices is provided with a function of performing image pickup according to an image quality parameter set therein to define image quality of an image,
said method comprising:
a determination operation of determining whether image quality of a merged image is consistent on the display device; and
an image quality control operation of controlling, when said determination operation determines the image quality is not consistent, the image quality parameter set in each of the image pickup devices so that the image quality of the merged image becomes consistent on the display device, wherein
each of the image pickup devices is capable of performing image pickup according to the image quality parameter set therein for every block comprising a plurality of pixels, and
said image quality control operation controls the image quality parameter set in each of the image pickup devices on a block basis.

* * * * *